United States Patent [19]
Broedner et al.

[11] Patent Number: 5,812,796
[45] Date of Patent: Sep. 22, 1998

[54] SUPPORT STRUCTURES FOR AN INTELLIGENT LOW POWER SERIAL BUS

[75] Inventors: Walter F. Broedner, Saratoga; Anthony M. Fadell, Sunnyvale, both of Calif.

[73] Assignee: General Magic, Inc., Sunnyvale, Calif.

[21] Appl. No.: 517,003

[22] Filed: Aug. 18, 1995

[51] Int. Cl.⁶ .................................................. G06F 13/00
[52] U.S. Cl. .......................................... 395/283; 395/733
[58] Field of Search .................................. 395/750, 733, 395/306, 309, 283, 284, 285, 835, 839; 364/707

[56] References Cited

U.S. PATENT DOCUMENTS 5,119,496  6/1992  Nishikawa et al. ...................... 395/742
5,204,669  4/1993  Dorfe et al. ......................... 340/825.52
5,475,854  12/1995  Thomsen et al. ....................... 395/800

*Primary Examiner*—Glenn A. Auve
*Attorney, Agent, or Firm*—Skjerven, Morrill, MacPherson, Franklin & Friel LLP; Forrest E. Gunnison

[57] ABSTRACT

A low power, single master, variable clock rate, daisy-chainable, serial bus connects a bus dispatch (master) to a chain of one or more daisy-chained peripheral devices (slaves). The bus has a bidirectional serial data line, a bidirectional clock line, unidirectional interrupt line, power and ground lines. Each peripheral device includes a plurality of serial bus support structures. For example, the serial bus support structures can include an interrupt generation circuit, a power-on circuit, and a wake-up interrupt generation circuit, and a wake-up interrupt propagation circuit.

51 Claims, 30 Drawing Sheets

Microfiche Appendix Included
(2 Microfiche, 109 Pages)

MBICINT=0 ON PON
MBICINT=1 ON PARITY ERROR.

ENADNINT=ENABLE DOWNSTREAM INTERRUPT
LAST=PERIPHERAL ASSIGNED "LAST" STATUS
DNINT=DOWNSTREAM INTERRUPT.

ENAPERINT=ENABLE PERIPHERAL INTERRUPT
PERINT=PERIPHERAL INTERRUPT.

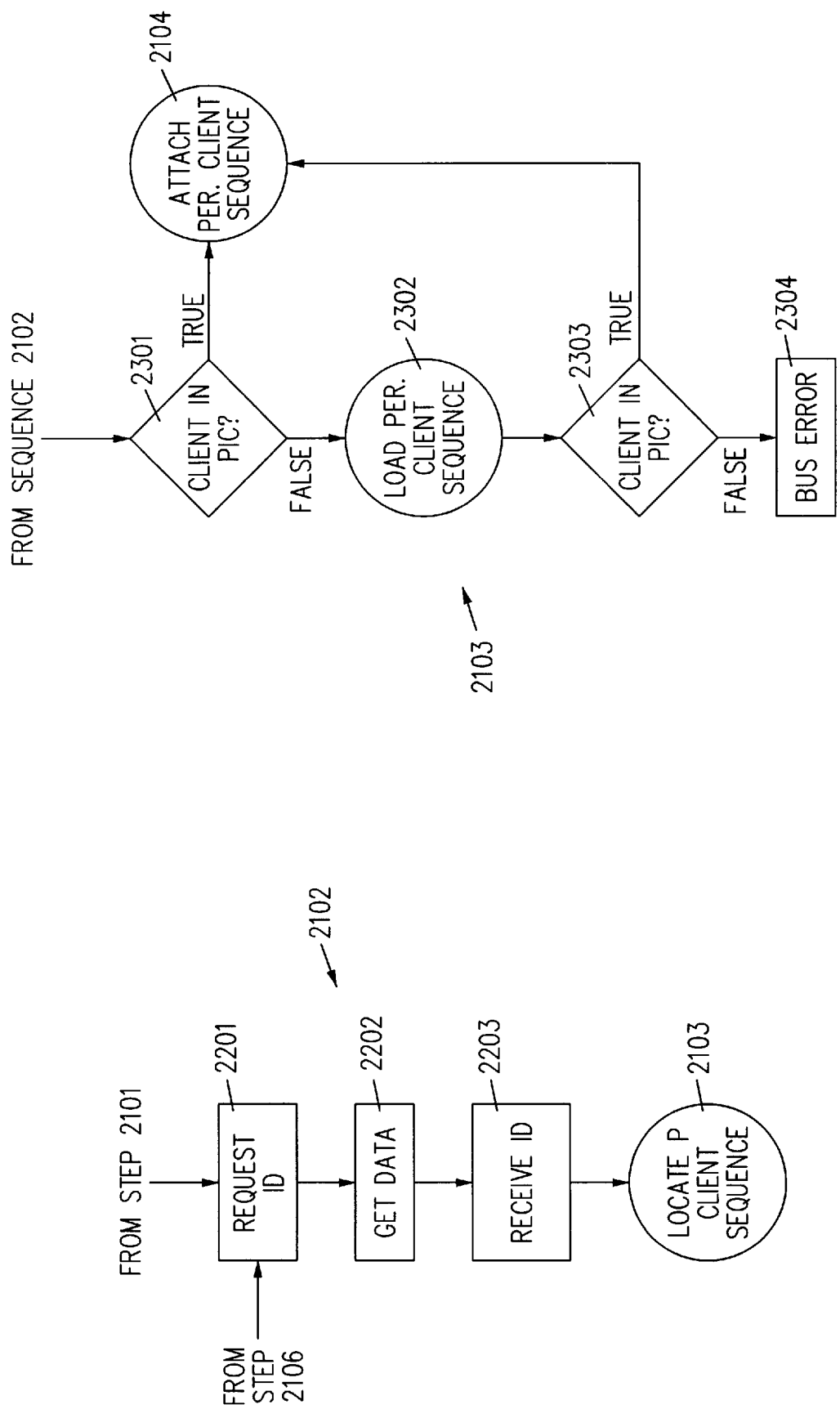

SUPPORT STRUCTURES FOR AN INTELLIGENT LOW POWER SERIAL BUS

REFERENCE TO MICROFICHE APPENDIX

Appendix A, which is a part of the present disclosure, is a microfiche appendix consisting of 2 sheets of microfiche having a total of 109 frames. Microfiche Appendix A is a listing of one embodiment of the bus dispatch control computer program of this invention, which is described more completely below, and is incorporated herein by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to digital serial bus technology and more particularly, to low power digital serial bus technology.

BACKGROUND OF THE INVENTION

Existing personal computers offer multiple external peripheral interfaces for attaching multiple peripheral devices to a host computer. An Apple Computer, Inc. Macintosh personal computer, for example, typically has (i) an Apple Desktop Bus interface for a keyboard and a mouse, (ii) a Small Computer System Interface (SCSI) for disk drives, and (iii) an RS-232/RS-422 interface for a printer and a modem. All three interfaces are necessary for the Macintosh personal computer because not any one of these standard interfaces can accommodate all the peripheral devices.

On a small, hand-held portable computer such as a so-called "PalmTop computer" or "Personal Communicator", however, providing several different external peripheral interfaces presents a number of problems. From a user's perspective, it is confusing to employ multiple different interfaces, each having its own protocol and connector. Further, there may not be an adequate amount of physical space on the PalmTop computer to provide numerous connectors and the power requirements of separate standard peripheral interfaces are onerous for battery powered hand-held computers. In addition, the cost of supporting multiple different external interface standards in terms of number of logic gates and number of connector terminals is significant when manufacturing for the consumer computer market.

Even if a host PalmTop computer were to use only one of the above standard interfaces to accommodate a limited set of peripheral devices, and even if this standard interface was redefined to require less power, such a conventional interface would either be low performance, e.g., the Apple Desktop Bus runs at about 10 KBits/second, or complex to use, e.g., SCSI requires configuring peripherals, attaching special terminators, and shutting down the computer for reconfiguration.

Alternatively, a new external interface standard called IEEE P1394 could be used. Although this new interface standard potentially satisfies some of the performance and ease-of-use requirements of a PalmTop computer peripheral interface, the interface nevertheless requires additional complex, non-standard, interface circuitry to the peripherals. Such complex interface circuitry would make it difficult for small, low volume peripheral manufacturers to make simple peripheral devices at low cost. Moreover, employing IEEE P1394 would also require the PalmTop host computer to incorporate an expensive support chip having approximately 20,000 gates.

Accordingly, a single, low power, easy-to-use, high performance, serial bus suitable for use on a hand-held PalmTop host computer with a wide variety of peripheral devices is needed.

SUMMARY OF THE INVENTION

In accordance with the principles of this invention, an intelligent daisy-chainable serial (IDCS) bus structure is used to connect one or more peripheral devices to a base station such as a palm-top computer. The IDCS bus supports a novel protocol wherein in a first mode of operation, information is clocked over a first channel using a clock signal on a second channel and in a second mode of operation, information is clocked over the second channel using a clock signal on the first channel. This protocol provides an efficient unambiguous method for distinguishing commands for IDCS bus operations from data transmitted over the IDCS bus.

The IDCS bus of this invention allows a user to easily attach a peripheral device to the base station without any knowledge of how either a computer, a peripheral device driver, or the peripheral device itself works. The IDCS bus supports hot plugging and removal of peripheral devices.

A bus dispatch unit within the base station detects when either a peripheral device has been added or removed from the IDCS bus and automatically reconfigures the IDCS bus appropriately. Specifically, upon detecting a change in the bus configuration, the bus dispatch unit automatically defines an address for each peripheral device on the IDCS bus and configures a software driver, sometimes called a peripheral client, for each peripheral device in the process of configuring the IDCS bus with the newly attached or detached peripheral device. A similar process is performed on power-up of the base station for any peripheral devices connected to the base station by the IDCS bus.

The IDCS bus of this invention is highly flexible and allows users to connect the base station to a diverse variety of peripheral devices, including other base stations, scanners, bar code readers, thermometers, printers, keyboards, cameras, mass storage, and other such peripheral devices. The IDCS bus does not require addition of complex interface circuitry to a peripheral device. Instead, the IDCS bus requires only a bus interface circuit that includes a bus interface integrated circuit, that is referred to herein as a MBIC, and a microcontroller. The bus interface circuit is standard independent of the peripheral device type. Alternatively, the bus interface circuit can be included within the microcontroller. Consequently, independent of the volume of peripheral devices of a particular type, the bus interface circuit and the microcontroller are the same as those used in other types of peripheral devices. Therefore, the low volume peripheral device seller is not faced with developing a complex non-standard part to interface the peripheral device with the IDCS bus of this invention.

The IDCS bus supports a broadband of communication frequencies and all commands to configure the IDCS bus are transmitted at the maximum frequency supported. Information passed to a particular microcontroller in a peripheral device is transmitted at a speed defined by the particular microcontroller.

In addition, failure of a microcontroller within a peripheral device does not affect operation of the IDCS bus. The bus interface circuit can be configured and operated without support from the peripheral device microcontroller. Specifically, the bus interface circuit can pass commands and data through the peripheral device even if the microcontroller is defective or the peripheral device is powered down because the bus interface circuit is powered at all times when the bus dispatch unit is active.

The bus dispatch unit, sometimes referred to simply as bus dispatch, within the base station includes the hardware and software subsystems that support the IDCS bus of this invention. The bus dispatch unit is the sole bus master of the IDCS bus for command and control purposes, i.e., the bus dispatch unit initiates all commands that result in data transfer. For example, in response to an appropriate command from the bus dispatch unit, each peripheral device on the IDCS bus can drive clock and data lines of the IDCS bus thereby providing data to bus dispatch unit. Each peripheral device, in this embodiment, is responsible for indicating to the bus dispatch unit that data transmission from the peripheral device is complete. The last peripheral device on the IDCS bus is referred to as a last peripheral device. All other peripheral devices on the IDCS bus, except the last peripheral device, are referred to as mid-peripheral devices. Specifically, the bus dispatch unit assigns each peripheral device on the IDCS bus one of a first status and a second status where a last peripheral device on the bus is assigned the second status and all other peripheral devices on the bus are assigned the first status.

Signals on the IDCS bus that travel in a direction from the last peripheral device towards the bus dispatch unit travel in an upstream direction. Conversely, signals that travel in a direction from the bus dispatch unit towards the last peripheral device travel in a downstream direction. Thus, upstream as used herein means towards the base station and downstream means away from the base station. Sometime, the base station is referred to as the host computer.

As indicated above, the bus dispatch unit in the base station controls operation of the IDCS bus using commands that are transmitted on the IDCS bus. A command is a message sent to a bus interface circuit in a particular peripheral device, or to the bus interface circuits in all the peripheral devices on the IDCS bus from the bus dispatch unit directing either the bus interface circuit or a microcontroller in the peripheral device to perform an operation.

A command is sent to a peripheral device when the peripheral device is in an idle mode, either a mid-idle mode or a last-idle mode depending on the status of the peripheral device. Commands issued by the bus dispatch unit are propagated downstream to each of the bus interface circuits and are acted upon by each bus interface circuit and/or peripheral device in a manner appropriate for that peripheral device. The particular action taken depends both upon the state of the bus interface circuit and the destination address within the command.

In this embodiment, each command includes two bytes. A first byte identifies the peripheral device for which the command is intended via an address and a second byte includes an op code that identifies the operation to be performed. There are four types of command sequences, hardware commands, software commands, command send and command get. Commands send and get are software commands, but are considered separately because the command sequences for commands send and get are different from the command sequences for the other software commands. Hardware commands are intended for a bus interface circuit in a particular peripheral device and are not passed along to the peripheral device's microcontroller.

Thus, hardware commands are sent as a single command word consisting of two bytes both of which are read and interpreted by the bus interface circuit in the addressed peripheral device. Hardware commands are sent at the maximum IDCS bus speed, e.g., 14.75 Mbps.

Software commands are commands intended for a peripheral device's microcontroller. Software commands also are sent in one two byte command word with the exception of commands send and get, which involve data transactions and thus follow different sequences. The bus interface circuit reads the command word, and if the bus interface circuit (MBIC) determines that the command word is a software command for its microcontroller, the MBIC passes only the second byte of the command word that contains a command code to the microcontroller.

The IDCS bus of this invention is fully interrupt driven. Peripheral devices send interrupts over a bus interrupt line to get the attention of the bus dispatch unit. When the bus dispatch unit senses an interrupt, the bus dispatch unit performs an interrupt poll, to determine the source and the nature of the interrupt. Interrupts are serviced by the bus dispatch unit once the current command cycle is complete. An interrupt signals that peripheral devices require servicing. For example, an interrupt can indicate when a peripheral device has been attached or detached from the IDCS bus, and when an IDCS bus error occurred.

In this embodiment of the invention, the IDCS bus includes five lines that are used to carry a clock signal, a data signal, an interrupt, power, and a ground. Each bus interface circuit is powered by the voltage on the power supply line in the IDCS bus. Driving the bus interface circuits with a common supply voltage assures that the voltage levels used by buffers within the bus interface circuits are the same. The voltage on the power supply line preferably is not used to power any other electronics in the peripheral devices. However, a peripheral device can sample the voltage level on the power supply line in the IDCS bus to control the peripheral device's power supply and/or to provide a status for the peripheral device's microcontroller. Each peripheral device, in this embodiment, has a local power supply that provides a local power supply voltage for the peripheral device unless the complete power requirements of the peripheral device can be met by the allocation of power from the IDCS bus power supply to the peripheral device.

Signals on the data line, the clock line and the interrupt line in the IDCS bus are each buffered in each bus interface circuit on the IDCS bus. Signals on the power line and the ground line pass through the bus interface circuit unbuffered.

Hence, according to the principles of this invention, transmitting bus commands and data over a serial bus, e.g., the IDCS bus, is accomplished by transmitting commands and data over first and second wires of the serial bus and transmitting interrupt signals over a third wire of the bus. A bus power supply voltage is supplied over a fourth wire of the serial bus, and a bus ground is supplied via a fifth wire of the serial bus.

The commands, data, and interrupt signals on the first, second, and third lines respectively are buffered in each peripheral device on the serial bus. The buffers are powered by the bus power supply voltage on the fourth wire.

The commands and data are transmitted over the first and second wires of the serial bus differently. A command is transmitted by transmitting a command clock signal over the first wire, and transmitting the command over the second wire. Data is transmitted by transmitting the data over the first wire, and transmitting a data clock signal over the second wire where only one of a command and data is transmitted over the first and second wires at a time.

Data is transmitted starting with most significant bit and ending with least significant bit. At the data transmission source, data is generated on the rising edge of the clock signal on the clock line. At the destination or slave, data is sampled on the falling of the clock signal on the clock line. The inactive state of the signals on both the clock and data lines is low in this embodiment.

When a command is transmitted over the second wire of the IDCS bus, a plurality of bits of the command are transmitted with a predetermined state, e.g., a plurality of bits are set. In one embodiment, the first and second bits of the command are transmitted with the predetermined state.

In addition to transmitting a plurality of bits in the command with a predetermined state, a plurality of address bits are transmitted in the command where the address bits identify a peripheral device that is to receive the command. Also, a software command bit is transmitted in the command where upon the software command bit having a predetermined state, a portion of the command is passed to a microcontroller in the peripheral device.

The MBIC in each peripheral device on the IDCS bus is coupled to the first and second bidirectional signal lines in the IDCS bus and includes a first buffer circuit that is coupled to the first and second bidirectional signal lines. A second buffer circuit is coupled to the first buffer circuit, and a control circuit is coupled to the first and second buffer circuits. The bus interface circuit also includes a third buffer circuit coupled to the first buffer circuit In a first mode of operation, the control circuit passes signals on the first and second bidirectional signal lines through the first and second buffer circuits. In a second mode of operation, the control circuit passes signals on the first and second bidirectional signal lines through the first buffer circuit to the third buffer circuit, and configures the second buffer circuit to terminate the first and second bidirectional signal lines. The control circuit passes signals from the first buffer circuit to the third buffer circuit only upon receiving a command with an address for the peripheral device, and with a predetermined bit having a predefined state. First and second peripheral device signal lines are coupled to the third buffer circuit, which are bidirectional signal lines.

The interrupt line of the IDCS bus is also coupled to the control circuit of the MBIC. The control circuit includes an interrupt logic circuit that is coupled to the interrupt line. A peripheral device interrupt line also is coupled to the interrupt logic circuit. The interrupt line includes an upstream interrupt line that transports an interrupt signal from the interrupt logic circuit to the base station and a downstream interrupt line where the downstream interrupt line transports an interrupt signal from another peripheral device to the interrupt logic circuit.

The interrupt logic circuit selectively inverts an interrupt signal on the downstream interrupt line. Specifically, when a MBIC is in the last peripheral device on the IDCS bus, the interrupt logic circuit inverts an interrupt signal on the downstream interrupt line.

The MBIC control circuit also includes a command logic circuit coupled to the first buffer circuit wherein the command logic circuit detects transmission of a command over the first and second bidirectional lines. The MBIC control circuit also includes a bus state control logic circuit coupled to the first, second and third buffer circuits. The bus state control logic circuit controls operation of the MBIC.

The bus dispatch unit can power-on a peripheral device on the serial bus. A terminal of a bus interface circuit is connected to a power supply circuit of the peripheral device wherein upon application of a first voltage level on the terminal, the power supply circuit is off, and upon application of a second voltage level on the terminal the power supply circuit is on. The bus dispatch unit issues a power-on command over the IDCS bus to the bus interface circuit and in response to the power-on command, the bus interface circuit generates the second voltage level on the terminal so that the peripheral device is powered-on.

In this embodiment, a peripheral device power on circuit is also coupled to the bus interface integrated circuit. The power on circuit includes a bus interface integrated circuit having a plurality of terminals for coupling to a serial bus and a peripheral power on terminal, a standby power supply line, and a switch having a first terminal coupled to the standby power supply line, a second terminal coupled to a reference voltage, and a third terminal coupled to the peripheral power on terminal. When a first voltage is applied to the peripheral power on terminal by the bus interface integrated circuit, the first switch terminal is connected to second switch terminal by the first voltage on the third terminal. Otherwise, the first switch terminal and the second switch terminal are disconnected. An inverter in the peripheral device power on circuit has an input terminal connected to the first switch terminal and an output terminal wherein the output terminal is connected to a power supply line for the peripheral device. In one embodiment, the switch includes a transistor having a first lead connected to the first switch terminal, a second lead connected to the second switch terminal, and a third lead connected to the third switch terminal. The transistor is preferably a field effect transistor having a gate connected to the third lead.

When the IDCS bus is powered-down, a self-powered peripheral device can power-up the bus by issuing a wake-up interrupt to the bus dispatch unit using a wake-up interrupt propagation structure. The wake-up interrupt propagation structure uses the bus power supply line, the down stream interrupt line, and the upstream interrupt line. The bus interface integrated circuit has a down interrupt in terminal coupled to the downstream interrupt line and an upstream interrupt out terminal coupled to the upstream interrupt line. The bus interface integrated circuit passes a signal on the down stream interrupt in terminal to the upstream interrupt out terminal when power is applied to the bus power supply line. A gate in the wake-up interrupt propagation structure has a first input terminal connected to the downstream interrupt line, a second input terminal connected to the power supply line, and an output line connected to the upstream interrupt line. When a voltage upon the bus power supply line has a first state, the gate passes a signal on the downstream interrupt line through the gate to the upstream interrupt line and so bypasses the bus interface integrated circuit. When the voltage upon the bus power supply line has a second state, the gate blocks passage of the signal on the downstream interrupt line through the gate to the upstream interrupt line.

In one embodiment, a wake-up interrupt generation structure is also coupled to the bus interface integrated circuit of a self-powered peripheral device. The wake-up interrupt generation structure also uses the bus power supply line, the down stream interrupt line and the upstream interrupt line. The bus interface integrated circuit has a down interrupt in terminal coupled to the downstream interrupt line and an upstream interrupt out terminal coupled to the upstream interrupt line. The bus interface integrated circuit passes a signal on the downstream interrupt in terminal to the upstream interrupt out terminal when power is applied to the bus power supply line. A microcontroller having a wake-up interrupt generation terminal is also a part of the wake-up interrupt generation circuit.

Within the wake-up interrupt generation circuit, a gate has a first input terminal coupled to the wake-up interrupt generation terminal, a second input terminal connected to the bus power supply line, and an output line coupled to the upstream interrupt line. When a voltage upon the bus power supply line has a first state, the gate passes a signal from the wake-up interrupt generation terminal through the gate to the upstream interrupt line. When the voltage upon the bus power supply line has a second state, the gate blocks passage of the signal from the wake-up interrupt generation terminal through the gate to the upstream interrupt line. Thus, the microcontroller can generate a wake-up interrupt to the bus dispatch unit.

Another circuit included with the bus interface integrated circuit is a serial bus support circuit, sometimes called an interrupt generation circuit. The serial bus support circuit utilizes the power supply line. The downstream interrupt line is coupled to the power supply line wherein upon connection of a downstream peripheral device to the downstream interrupt line, the downstream interrupt line has a first level, and upon disconnection of the downstream peripheral device from the downstream interrupt line, the downstream interrupt line has a second level. The serial bus support circuit also uses the upstream interrupt line. The bus interface integrated circuit with a downstream interrupt in terminal is coupled to the downstream interrupt line, and an upstream interrupt out terminal is coupled to the upstream interrupt line. The bus interface integrated circuit passes a signal on the downstream interrupt in terminal to the upstream interrupt out terminal so that upon the downstream peripheral device being disconnected from the downstream interrupt line, the second level on the downstream interrupt line is propagated to the upstream interrupt line so as to automatically generate an interrupt by the serial bus support circuit upon disconnection of the downstream peripheral device from the peripheral device.

The serial bus support circuit includes a resistive element having a first lead connected to the power supply line, and a second lead connected to the downstream interrupt line so as to couple the downstream interrupt line to the power supply line. A first inverter has an input terminal connected to the downstream interrupt line, a line connected to the power supply line, and an output terminal. A second inverter has an input terminal connected to the output terminal of the first inverter, a line connected to the power supply line, and an output terminal connected to the downstream interrupt in terminal of the bus interface integrated circuit. A third inverter has an input terminal connected to the upstream interrupt out terminal of the bus interface integrated circuit, a line connected to the power supply line, and an output terminal. A fourth inverter has an input terminal connected to the output terminal of the third inverter, a line coupled to the power supply line, and an output terminal connected to the upstream interrupt line.

Thus, when all of the above circuits are included within a self-powered peripheral device, the peripheral device includes a serial bus support structure that has a power supply line; a downstream interrupt line; a pull-up resistive element connected to the downstream interrupt line; a first inverter having an input terminal connected to the downstream interrupt line; and an output terminal; a second inverter having an input terminal connected to the output terminal of the first inverter; and an output terminal; a bus interface circuit having a downstream interrupt in terminal connected to output terminal of the second inverter; and an upstream interrupt out terminal; a third inverter having an input terminal connected to the upstream interrupt out terminal; and an output terminal; a fourth inverter having an input terminal connected to the output terminal of the third inverter; and an output terminal; an upstream interrupt line connected to the output terminal of the fourth inverter; a wake-up interrupt propagation circuit having an input line connected to the downstream interrupt line; and an output line connected to the upstream interrupt line; and a wake-up interrupt generation circuit having an output line connected to the upstream interrupt line.

BRIEF DESCRIPTION OF THE DRAWINGS

FIG. 22 is a process flow diagram for one embodiment of the Get peripheral ID sequence within the peripheral configuration sequence of this invention.

FIG. 23 is a process flow diagram for one embodiment of the locate peripheral client sequence within the peripheral configuration sequence of this invention.

FIG. 27 is a process flow diagram of one embodiment of the start IRQ Poll sequence within the service bus sequence of this invention.

DETAILED DESCRIPTION

In accordance with this invention, an intelligent daisy-chainable serial (IDCS) bus structure is used to connect one or more peripheral devices to a base station such as a palm-top computer. The IDCS bus supports a novel protocol wherein in first mode of operation, information is clocked over a first channel using a clock signal on a second channel and in a second mode of operation, information is clocked over the second channel using a clock signal on the first channel. As explained more completely below, this protocol provides an efficient unambiguous method for distinguishing commands for the IDCS bus operations from data transmitted over the IDCS bus.

Figure 1:
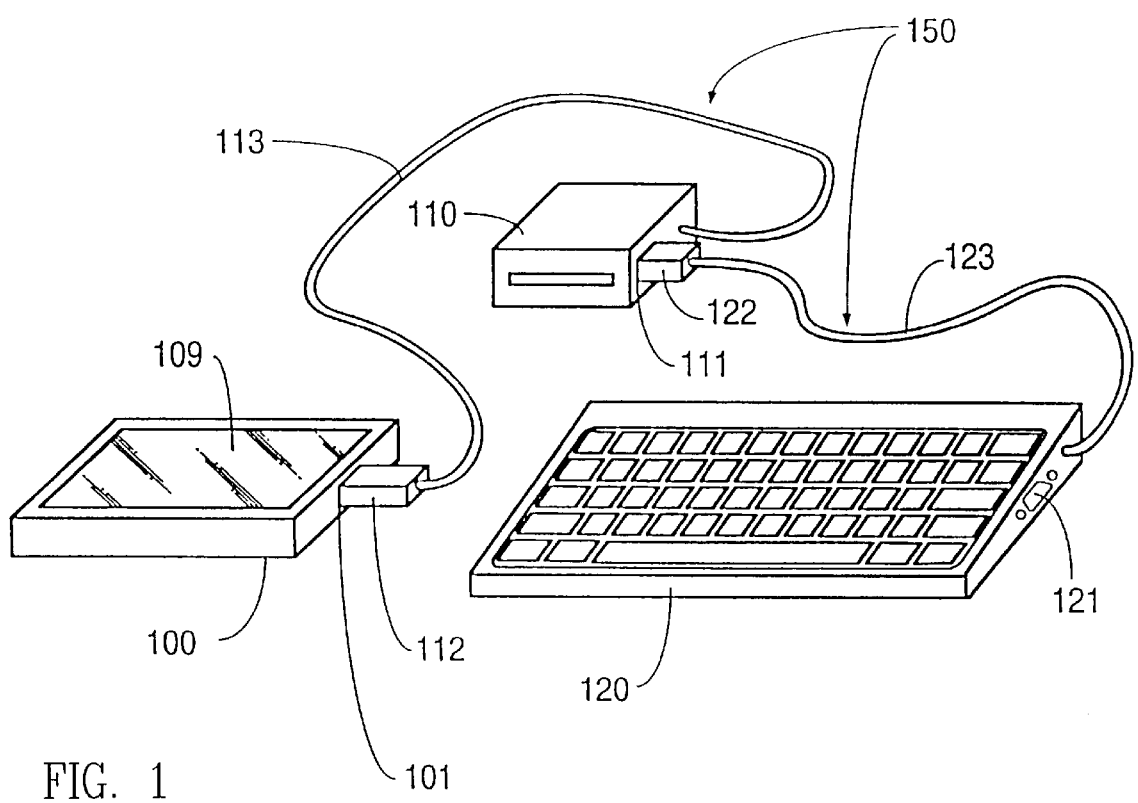
FIG. 1 is a perspective view of one embodiment according to the present invention of an operating bus having a host computer and two peripheral devices.

In one embodiment, as shown in FIG. 1, IDCS bus 150 connects base station 100 to between one and six serially-connected peripheral devices, e.g., peripheral devices 110 and 120. Specifically, base station 100, which is a battery-powered hand-held computer with a touchscreen 109, has a connector 101 capable of accepting a connector 112 on cable 113 from peripheral device 110. In another embodiment, peripheral device 110 is attached directly to base station 100 via connector 101, i.e., without cable 113. Base station 100 is the host computer for IDCS bus 150.

To couple a second peripheral device, e.g. peripheral device 120, to base station 100, a second cable 123 with connector 122 is connected to a connector 111 of peripheral device 110. Since only two peripheral devices 110 and 120 are used in this example, connector 121 of peripheral device 120 is not used. The serial connection of peripheral devices 110, 120, as illustrated in FIG. 1, is commonly referred to as daisy-chaining.

IDCS bus 150 of this invention starts in base station 100 and extends through connector 101, connector 112, cable 113, peripheral device 110, connector 111, connector 122, cable 123, and peripheral device 120 to connector 121. Within devices 110 and 120 is an integrated circuit (not shown in FIG. 1) that controls transmission of messages and data either through the peripheral device to another peripheral device on IDCS bus 150 or to a microcontroller (not shown in FIG. 1) within the peripheral device. Thus, as shown in FIG. 1, each peripheral on IDCS bus 150 contains two interface connectors, an upstream connector that is electrically closer to base station 100, and a downstream interface connector that is electrically closer to a downstream peripheral device, or in the case of the last peripheral device, e.g. peripheral device 120, is unused. The integrated circuit in last peripheral device 120 is configured to block transmission of signals to the downstream interface connector, i.e., the integrated circuit terminates IDCS bus 150 in peripheral device 120.

IDCS bus 150 of this invention allows the user to easily attach a peripheral device to base station 100 without any knowledge of how either a computer, a peripheral device driver, or the peripheral device itself works. IDCS bus 150 supports hot plugging and removal of peripheral devices. A bus dispatch unit, that is described more completely below, in base station 100 detects when either a peripheral device has been added or removed from IDCS bus 150 and reconfigures IDCS bus 150 appropriately. The bus dispatch unit automatically defines an address for each peripheral device on IDCS bus 150 and configures a software driver, sometimes called a peripheral client, for each peripheral device in the process of configuring IDCS bus 150 with the newly attached or removed peripheral device.

IDCS bus 150 is highly flexible and allows users to connect base station 100 to a diverse variety of peripheral devices, including other base stations, scanners, bar code readers, thermometers, printers, keyboards, cameras, mass storage, and other such peripheral devices.

IDCS bus 150 does not require addition of complex interface circuitry to a peripheral device. Instead, as described more completely below, IDCS bus 150 requires only an interface circuit, that is standard independent of the peripheral device type, and a microcontroller. Alternatively, the interface circuit can be included within the microcontroller.

Consequently, independent of the volume of peripheral devices of a particular type, the interface circuit and the microcontroller are the same as those used in other types of peripheral device. Therefore, the low volume peripheral device seller is not faced with developing a complex non-standard part to interface the peripheral device with IDCS bus 150.

IDCS bus 150 supports a broadband of communication frequencies and all commands to configure IDCS bus 150 are transmitted at the maximum frequency supported. In addition, failure of a microcontroller within a peripheral device does not affect operation of IDCS bus 150. The interface circuit can be configured and operated without support from the peripheral device microcontroller.

In addition to IDCS bus 150 of this invention, the bus structure of this invention also supports conventional communication protocols for computer peripheral devices and computers, power input for recharging batteries in base station 100, and telephone connections. However, these features are not essential to IDCS bus 150 and IDCS bus 150 can be implemented and used without any one or all of these features. In one embodiment, a passive serial bus adapter is used to convert the low voltage signals on IDCS bus 150 to the higher voltage signals used by conventional passive serial interfaces, such as the RS-232 serial interface or the RS-422 serial interface, which are typically not daisy-chained. Thus, for example, in a conventional RS-232 serial interface only a single passive adapter is allowed at base station 100. Although telephony adapters are daisy-chained, only one device in a telephone daisy chain is allowed to be operational at a given time, i.e. there is no provision for bus contentions.

Charger peripherals inherently cannot be daisy-chained. A battery charger must be connected either directly to connector 101 of base station 100 without the use of cable 113 or to a peripheral device that is connected directly to connector 101. Thus, no IDCS bus cable ever carries the charger level currents and no peripheral devices pass through the charger level voltages and currents. Hence, in this configuration, cables 113, 123 carry only signal levels associated with IDCS bus 150 and so IDCS bus operates with low power supply voltages, e.g., 3.3 volts.

PERIPHERAL DEVICE CONFIGURATIONS SUPPORTED BY IDCS BUS

Figure 2A:
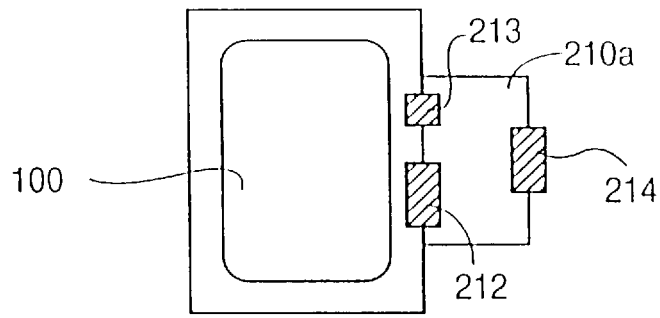
FIGS. 2A–2H are diagrams showing examples of various bus configurations according to the principles of this invention.

As explained above, previously, interconnection of a variety of peripheral devices to a computer required multiple peripheral device interfaces. In contrast, the peripheral device interface of this invention and the IDCS bus protocol can be used to support a wide variety of peripheral devices as illustrated in FIGS. 2A to 2H. For example, FIG. 2A shows base station 100 connected to a snap-on peripheral device 210A. In this interconnection configuration, peripheral device 210A connects directly to the body of base station 100 and so no cable is required. A screw may be provided on peripheral device 210A to securely connect snap-on peripheral device 210A to base station 100. In FIG. 2A, both connector 212 and a two terminal tip and ring connector 213, couple peripheral device 210A to base station 100. Snap-on peripheral devices include, for example, modems, scanners, CD-ROM players, radio frequency links, and tricorder sensor arrays. Note that snap-on peripheral device 210A is a pass-through peripheral device and so has connector 212 coupled to connector 214.

Figure 2B:
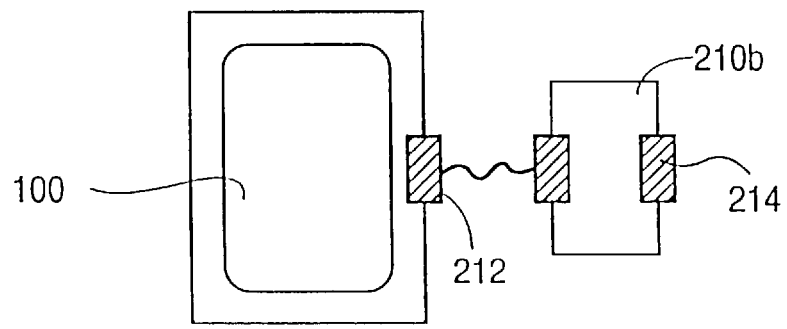

FIG. 2B shows base station 100 connected to a cabled peripheral device 210B. Cabled peripheral devices may include, for example, ASCII keyboards, film printers, CD-ROM juke boxes, laser printers, and transmitters. Note that cabled peripheral device 210B is also a pass-through peripheral device having connector 212 coupled to connector 214.

Figure 2C:
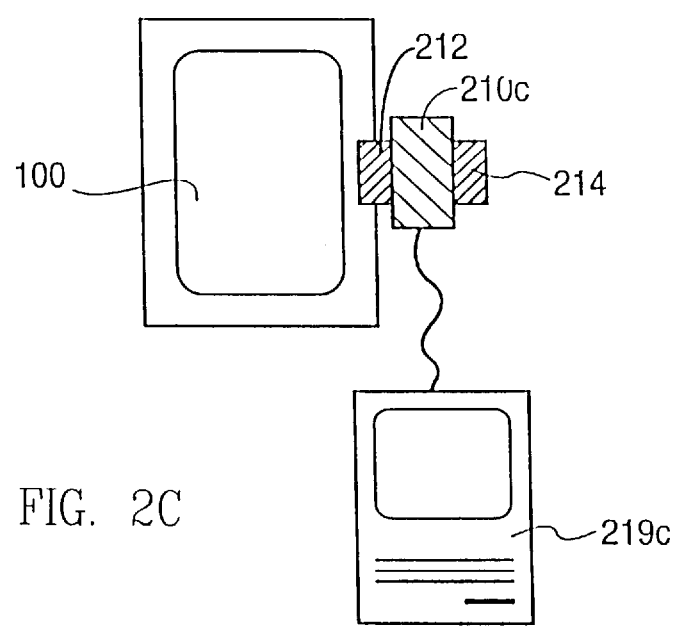

FIG. 2C illustrates base station 100 connected to a computer 219C, such as a Macintosh personal computer, via a passive RS-422 serial adapter 210C. Level shifters are provided in adapter 210C to shift the voltage levels on the serial lines of connector 212 to RS-422 signal levels and visa versa. In view of the following disclosure and the standard for the RS-422 serial interface, this level shift circuitry required in adapter 210C will be apparent to those skilled in the art. In addition to the level shift capability, adapter 210C also supports other peripheral devices that are coupled to IDCS bus 150 via connector 214.

Figure 2D:
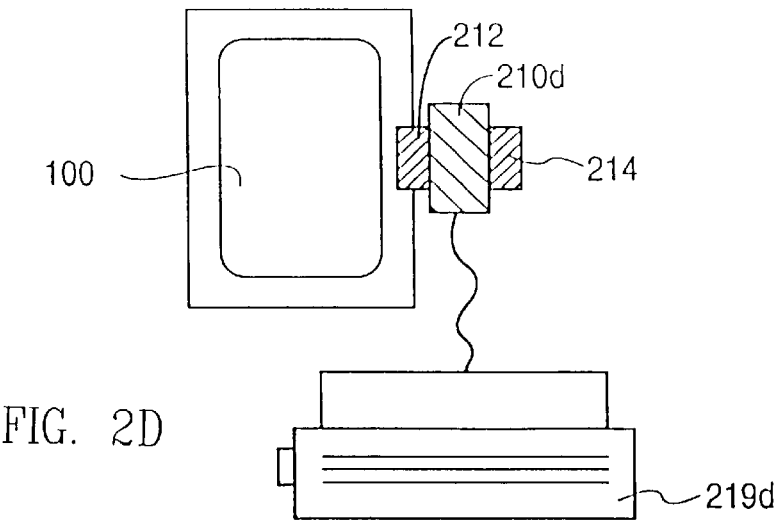

FIG. 2D shows base station 100 connected to a serial printer 219D via a passive RS-232 serial adapter 210D. Level shifters are provided in adapter 210D to shift the voltage levels on the serial lines of connector 212 to RS-232 signal levels and visa versa. In view of the following disclosure and the standard for the RS-232 serial interface, this level shift circuitry required in adapter 210D will be apparent to those skilled in the art. For example, a single supply RS-232 level shifter such as that sold by Maxim of 120 San Gabriel Drive, Sunnyvale, Calif. 94086-9892 as Maxim 231 could be used. Again, note that adapter 210D in addition to the level shift capability also can support additional peripheral devices that are connected to IDCS bus 150 via connector 214. While adapters for the RS-422 and RS-232 serial interfaces are illustrated in FIGS. 2C and 2D, the IDCS bus 150 of this invention can transmit signals for any serial interface so long as the voltage levels of the serial interface are appropriately adjusted.

Figure 2E:
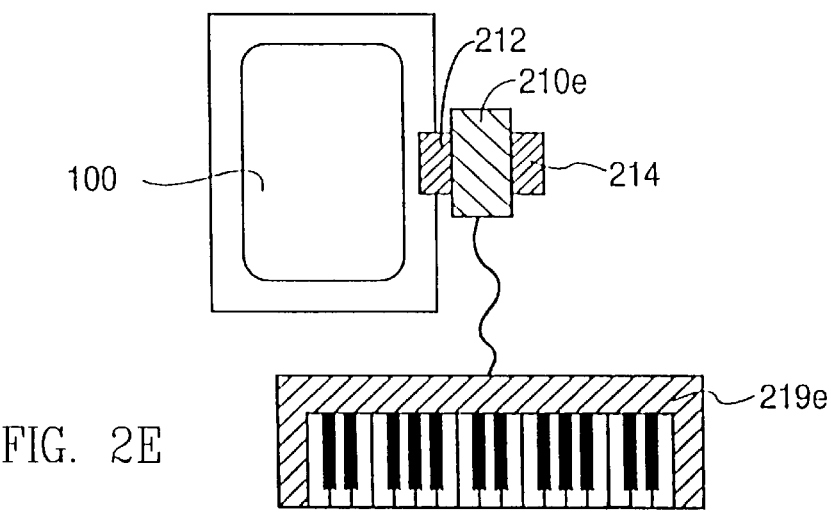

In FIG. 2E base station 100 is connected to a musical keyboard peripheral 219E via an intelligent serial adapter 210E. Communication between adapter 210E and peripheral 219E may utilize virtually any serial protocol including MIDI.

Figure 2F:
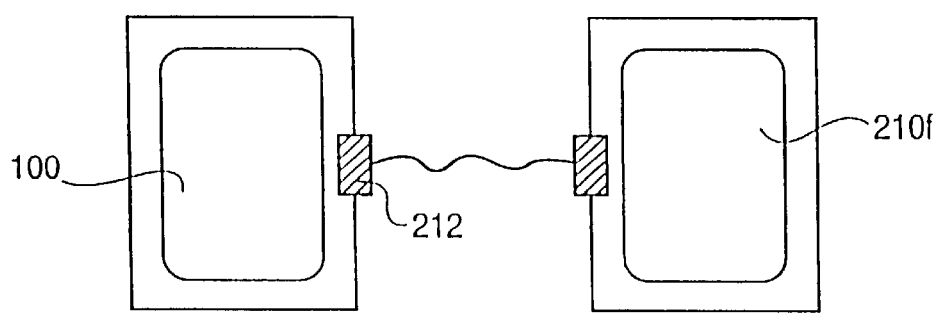

FIG. 2F illustrates base station 100 cabled to another base station 210F using IDCS bus 150 of this invention.

Figure 2G:
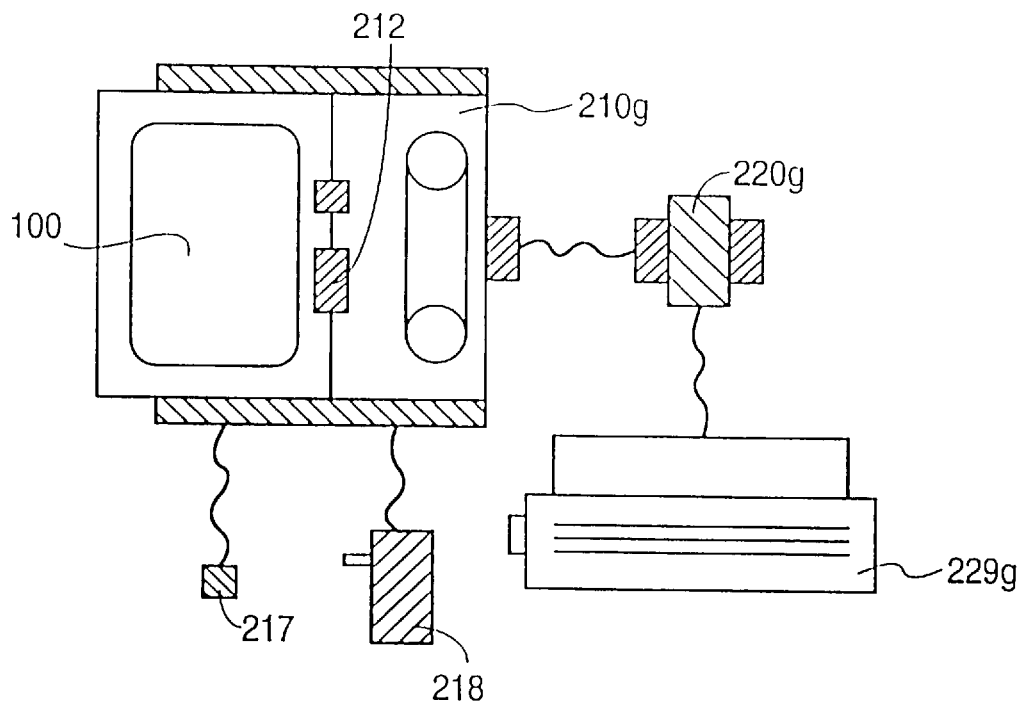

FIG. 2G shows base station 100 connected to a snap-on pass-through telephone dock peripheral device 210G. A battery charger 218, which is connected to telephone dock 210G, supplies power to base station 100 through telephone dock 210G and through connector 212, which connects telephone dock 210G to base station 100. A printer 229G is the last peripheral on IDCS bus 150 in this embodiment. Printer 229G is connected to telephone dock 210G via an intelligent RS-232 adapter 220G. Intelligent RS-232 adapter 220G allows more complex printer protocols and buffering to be utilized without burdening base station 100 with those tasks. An RJ11 telephone jack 217 is provided on telephone dock 210G to connect the telephone dock to a telephone landline plug (not shown).

Figure 2H:
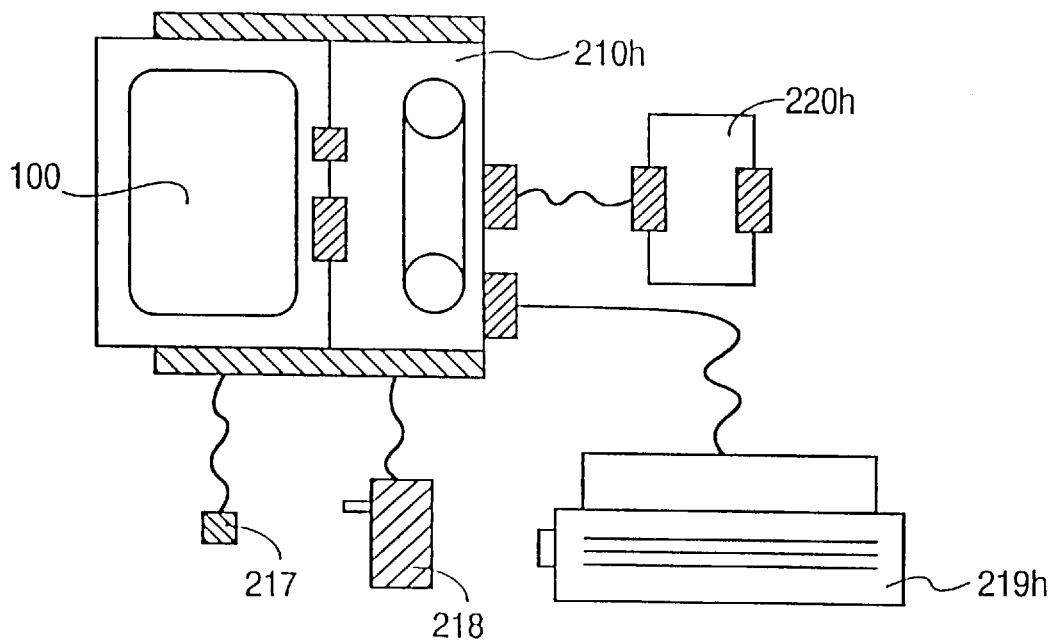

FIG. 2H shows base station 100 connected to a snap-on telephone dock unit 210H. Telephone dock unit 210H splits the passive serial port signals of the bus from other bus signals. Accordingly, telephone dock unit 210H functions as a peripheral device on bus 150 coupled to another peripheral device 220H, while at the same time having a printer 219H connected directly to telephone dock unit 210H via an RS-232 cable.

Referring back to FIG. 1, since chargers and passive serial adapters are connected directly to base station 100, novel low power IDCS bus 150 of this invention is used to communicate between peripherals 110, 120 and base station 100. To further describe the features and capability of IDCS bus 150 of this invention, several terms are defined so that a common terminology is used herein.

IDCS BUS NOMENCLATURE

Figure 3:
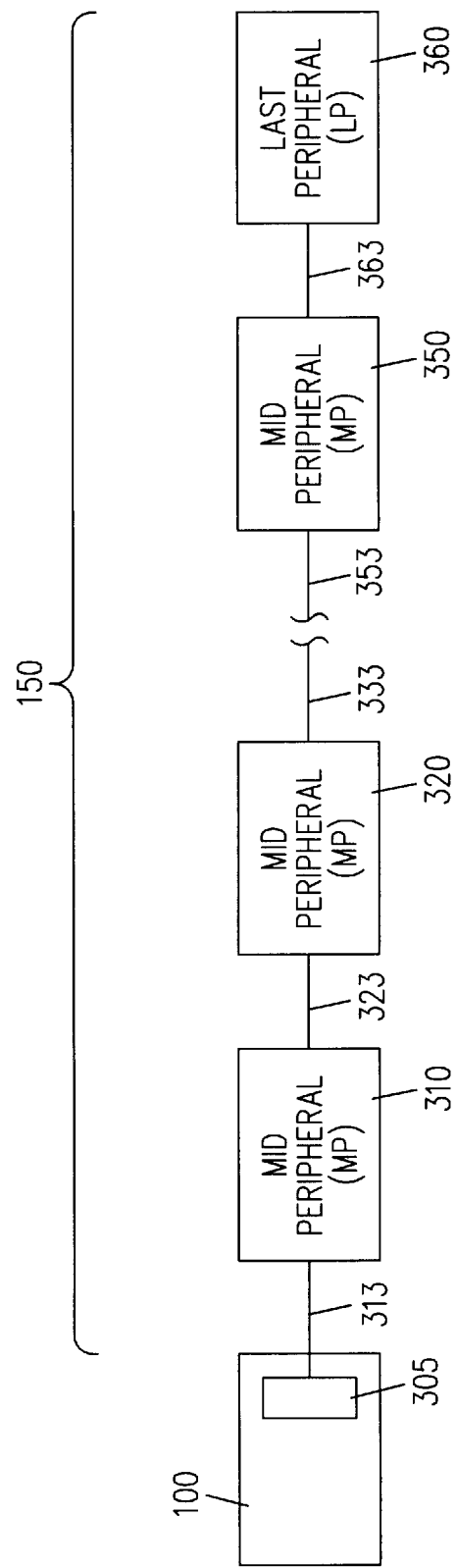
FIG. 3 is a block diagram of the intelligent daisy chain serial bus of this invention.

As illustrated in FIG. 3, base station 100 is daisy chained to a plurality of peripheral devices, up to six peripheral devices 310, 320, . . . , 350 and 360 using IDCS bus 150 of this invention via cables 313, 323, . . . , 353 and 363 respectively. Base station 100 has a bus dispatch 305 that includes the hardware and software subsystems that support IDCS bus 150 of this invention. Bus dispatch 305 is the sole bus master of the IDCS bus for command and control purposes, i.e., bus dispatch 305 initiates all commands that result in data transfer. For example, in response to an appropriate command from bus dispatch 305, each peripheral device 310, 320 . . . , 360 on IDCS bus 150 can drive clock and data lines of IDCS bus 150 thereby providing data to bus dispatch 305. Each peripheral device, in this embodiment, is responsible for indicating to bus dispatch 305 that data transmission from the peripheral device is complete.

Peripheral device 360 is the last peripheral device in the daisy chain and so is referred to as the last peripheral device. All peripheral devices 310, 320 . . . , 350, except last peripheral device 360, are referred to as mid-peripheral devices. Cable 363 carries signals from last peripheral 360 towards bus dispatch 305 in an upstream direction and signals from bus dispatch 305 towards last peripheral 360 in the downstream direction.

Bus dispatch 305 of base station 100 controls the operation of IDCS bus 150 using commands to the peripheral devices 310 through 360. A command is a message sent to a peripheral device from bus dispatch 305 directing a peripheral device to perform an operation. A command is sent to a peripheral device when the device is in idle mode, i.e., when the peripheral device is waiting for the next command from bus dispatch 305.

A peripheral device is in a command mode when the peripheral device is responding to a command received from bus dispatch 305. A peripheral device is in a transparent mode when the peripheral device is not looking for a command from bus dispatch 305. In the transparent mode, any pattern of bits can be transmitted over IDCS bus 150 without any peripheral device in the transparent mode misinterpreting the pattern of bits as a command. In other words, in the transparent mode, the peripheral device functions as a signal conduit for peripheral devices in the downstream and upstream directions.

An address is a unique identification (ID) number for a peripheral device on IDCS bus 150. This address is assigned by bus dispatch 305 when the peripheral device is added to IDCS bus 150. A participating peripheral is the peripheral device addressed in a command address field. Start of transmission (SOT) and End of transmission (EOT) commands are messages used to indicate the start and end of transmissions. When the end of transmission message is received by a peripheral device in a command cycle, the message signals the end of activity. When the end of transmission signal is sent by a peripheral device, the message signals to bus dispatch 305 that the peripheral device has finished its portion of the command cycle. A command cycle is the sequence of events starting with bus dispatch issuing a command and ending when bus dispatch or a peripheral device signals EOT.

BASIC FEATURES OF IDCS BUS 150

Figure 4:
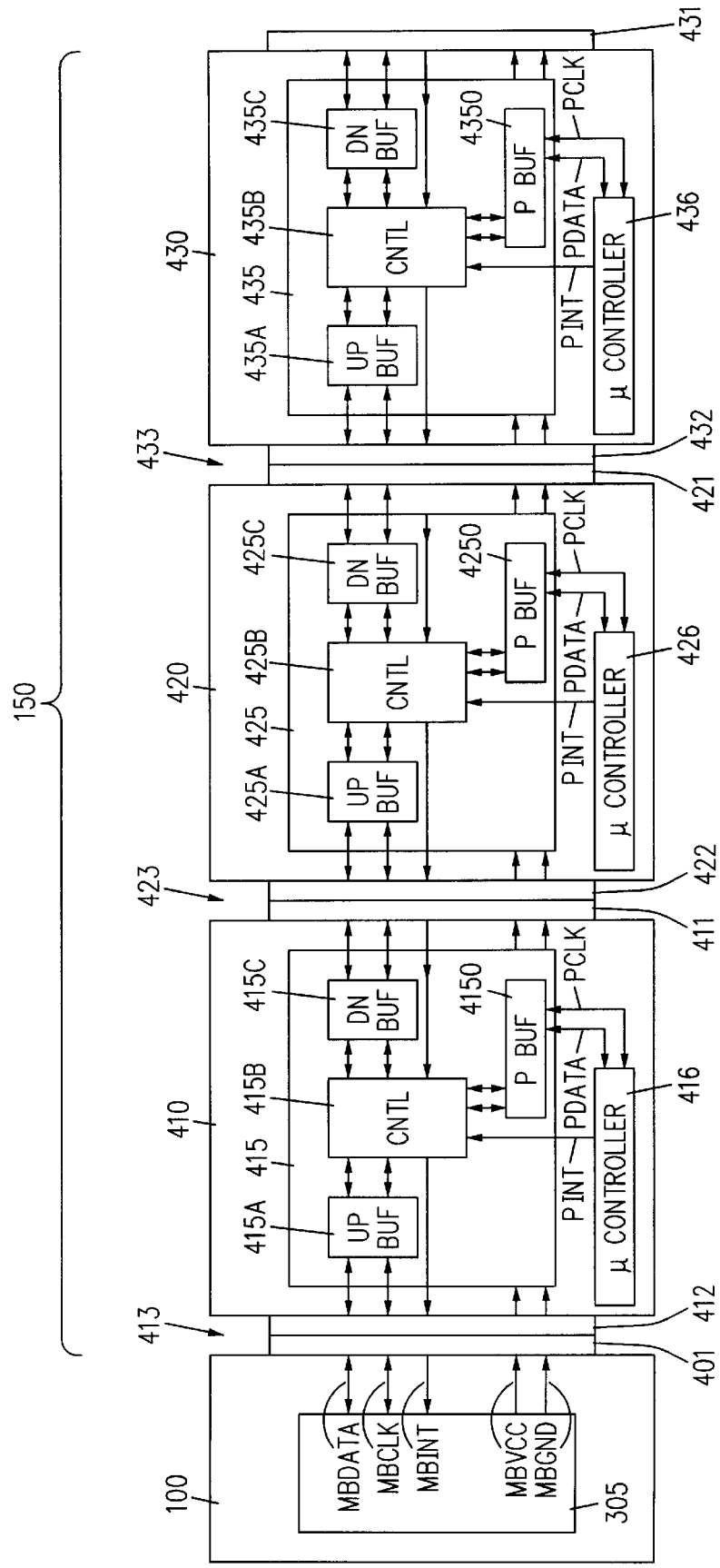
FIG. 4 is more detailed block diagram of the intelligent daisy chain serial bus of this invention.

FIG. 4 is a more detailed illustration of IDCS bus 150 of this invention interconnecting base station 100 and peripheral devices 410, 420, and 430. For the number of address bits implemented in this embodiment, IDCS bus 150 supports up to six peripheral devices. However, the features of the invention can be adequately described using peripheral devices 410, 420 and 430. Moreover, the particular number of peripheral devices on IDCS bus 150 is illustrative only of the principles of this invention and is not intended to limit the invention to the particular number of peripheral devices described herein.

Each peripheral device 410, 420 and 430 includes an identical bus interface integrated circuit, i.e., Magic Bus Interface Circuit (MBIC) 415, 425, and 435, respectively. Thus, a description of the operation of any one of MBICs 415, 425, and 435 is directly applicable to the other MBICs.

Base station 100 is connected to bus connector 401 by a first bi-directional signal line MBDATA, a second bi-directional signal line MBCLK, and unidirectional interrupt line MBINT. IDCS bus power supply voltage MBVCC and signal ground MBGND are also connected to bus connector 401. In this embodiment, power supply line MBVCC carries a power supply voltage of 3.3 volts±10% at 45 mA maximum. However, in view of this disclosure, IDCS bus 150 can be implemented using a wide variety of power supply voltages, because the principles of this invention are independent of the power supply voltage level used.

Each of peripheral devices 410 to 430 are shown as being identical with respect to operation on IDCS bus 150. The requirements for support of IDCS bus 150 are identical for each peripheral device, but the functions performed by peripheral devices 410, to 430 are most probably different. For example, peripheral device 410 can be a scanner, peripheral device 420 a printer, and peripheral device 430 a non-volatile data storage device. Since herein only IDCS bus 150 is of interest, for the purpose of disclosing IDCS bus 150, each peripheral device, unless otherwise explicitly noted, is assumed to be identical with respect on operation on IDCS bus 150.

Specifically, each peripheral device 410, 420, 430 has a MBIC 415, 425, 435, respectively, coupled to an upstream bus connector 412, 422 and 421, respectively, a downstream bus connector 411, 421 and 431, respectively, and a microcontroller 416, 426 and 436, respectively. In this embodiment, connectors 401 and 412 form a direct connection 413. Similarly, connectors 411 and 422 form direct connection 423 and connectors 421 and 423 form direct connection 433. In another embodiment, connections 413, 423, and 433 could be made by a cable as shown in FIG. 1.

The independence of the bus support interface within a peripheral device from the type of peripheral device means that a low volume peripheral device manufacturer is not required to use other than the novel parts described herein. Therefore, the novel structure of this invention can be widely used without each peripheral device manufacturer incurring the cost of designing a part for interfacing to IDCS bus 150.

MBIC 415 includes a set of upstream buffers 415A, a set of downstream buffers 415C and a set of peripheral device buffers 415D. Control circuit 415B configures these three sets of buffers. In one embodiment, control circuit 415B analyzes the information on lines MBDATA and MBCLK, from upstream buffer circuit 415A and determines whether to pass the information through peripheral device 410 to downstream connector 411, or to direct all or part of the information to microcontroller 416 through peripheral buffer circuit 415D. Control circuit 415B includes a bus state control logic circuit, an interrupt logic circuit, and a command logic circuit, as explained more completely below.

In another embodiment, MBIC 415 does not include control circuit 415B and the various sets of buffers are controlled by microcontroller 416. The information on IDCS bus 150 is provided to microcontroller 416 and used by microcontroller 416 to configure MBIC 415 appropriately. A specification for one embodiment of such a configuration is presented in Microfiche Appendix A, which is incorporated herein by reference in its entirety.

Peripheral device 410, in this embodiment, has a local power supply that provides a local power supply voltage VCC. MBIC 415 is powered by the voltage on power supply line MBVCC in IDCS bus 150. Driving MBICs 415, 425, and 435 with a common supply voltage assures that the voltage levels used by buffers within MBICs 415, 425, and 435 are the same. The voltage on power supply line MBVCC preferably is not used to power any other electronics in peripheral devices 410, 420, and 430. However, a peripheral device can sample the voltage level on line MBVCC to control the peripheral device's power supply and/or to provide a status for the peripheral device's microcontroller. The amount of current that peripheral device 410 is allowed to draw from line MBVCC is limited to a maximum of 6 mA when IDCS bus 150 is fully loaded. This maximum current draw is based on a bus load that includes a passive serial peripheral device requiring 5 mA plus six peripheral devices on IDCS bus 150, each of which can draw 6 mA without compromising power to the other peripheral devices on IDCS bus 150. MBIC 415 is designed to draw 5 mA when operating at 14.75 Mhz and 100 $\mu$A when in standby mode.

Signals on data line MBDATA, clock line MBCLK and interrupt line MBINT are each buffered by MBICs 415, 425 and 435 at each connection point along IDCS bus 150. Signals on power line MBVCC and ground line MBGND pass through MBICs 415, 425 and 435 unbuffered. In some embodiments, connections 413, 423 and 433 are shielded cables with lines MBDATA and MBGND forming a first twisted pair, and lines MBCLK and MBVCC forming a second twisted pair. In this embodiment, the maximum length of a cable is about one meter.

Communications between bus dispatch 305 and peripheral devices 410, 420 and 430 are called messages. All messages take place within the structure of serial peripheral interface command cycles, that are described more completely below. In this embodiment, commands are differentiated from raw data in that when a command is to be transmitted, the functions of clock line MBCLK and data line MBDATA are reversed, i.e., data line MBDATA carries a clock signal and clock line MBCLK carries a data signal. Herein, a command refers to a particular sequence of data, that is described more completely below, and is separate and distinct from raw data which is referred to simply as data.

Commands sent by bus dispatch 305 either configure a MBIC or initiate operations with a peripheral device. In this embodiment, each command includes two bytes. A first byte identifies the peripheral device for which the command is intended and a second byte includes an op code that identifies the command.

Commands issued by bus dispatch 305 are propagated downstream on IDCS bus 150 to each of MBICs 415, 425, and 435, and are acted upon by each peripheral device in a manner appropriate for that peripheral device. The particular action taken by a peripheral device depends both upon its state and the destination address within the command.

All transfers of information, e.g. data, over IDCS bus 150 are initiated by bus dispatch 305. If a peripheral device needs to transfer data to bus dispatch 305, peripheral device 410, 420 or 430 must first interrupt bus dispatch 305 via a unidirectional interrupt on its respective line MBINT and then wait for a command from bus dispatch 305 before starting the data transfer.

During a command cycle, a peripheral device may either receive data, transmit data, or transparently relay data to downstream or upstream peripheral devices depending on the direction of transfer. All upstream peripheral devices, e.g. MBICs 415, 425 in peripheral devices 410, 420, must cooperate for a data transfer from a downstream peripheral device, e.g., peripheral device 430, to bus dispatch 305. To ensure cooperation, each MBIC on IDCS bus 150 incorporates a plurality of predefined states that are described more completely below. Signal transmissions over IDCS bus 150 are implemented using a serial peripheral interface protocol (SPI), that is also described in greater detail below.

Each of MBICs 415, 425, and 435 in peripheral device 410, 420 and 430 on IDCS bus 150, regardless of whether its address is present in the command, monitors commands on IDCS bus 150 to determine the origination and destination of the transaction. Specifically, MBICs 415, 425, 435 of peripheral devices 410, 420, 430, respectively, recognize when the peripheral device containing the MBIC is being addressed and take appropriate actions. Conversely, if peripheral device 410, 420, or 430 is not being addressed, the MBIC in the peripheral device and the peripheral device itself do not participate in a transaction, except the MBIC acts as a relayer of signals up or down IDCS bus 150. Such a peripheral device operates in a transparent mode until the command is finished, and then enters the appropriate idle mode, i.e. mid-idle or last-idle for a mid-peripheral device and a last-peripheral device, respectively.

Figure 5A:
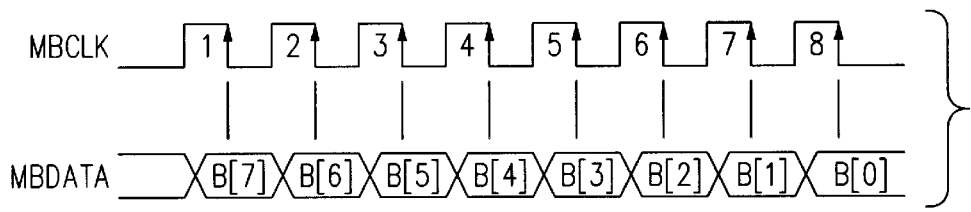
FIG. 5A illustrates transmission of data over IDCS bus 150 according to the principles of this invention.

All command and data transfers between bus dispatch 305 and peripheral devices 410, 420 and 430 are performed using the SPI protocol. In this embodiment, the SPI protocol is a half-duplex, synchronous-serial two wire protocol. For a data transfer (FIG. 5A), the clock signal on line MBCLK and data on line MBDATA are provided simultaneously by the data source, which is either bus dispatch 305 or one of peripheral devices 410, 420 and 430, through its respective MBIC 415, 425 or 435.

Data is transmitted starting with most significant bit B[7] and ending with least significant bit B[0]. At the data transmission source, data is generated on the rising edge of the clock signal on line MBCLK. At the destination or slave, data is sampled on the falling of the clock signal on line MBCLK. The inactive state of the signals on both lines MBCLK and MBDATA is low. In some embodiments, signal MBCLK has a symmetrical duty cycle clock with a frequency within a frequency range of approximately 115 Khz to 14.75 Mhz.

Figure 5B:
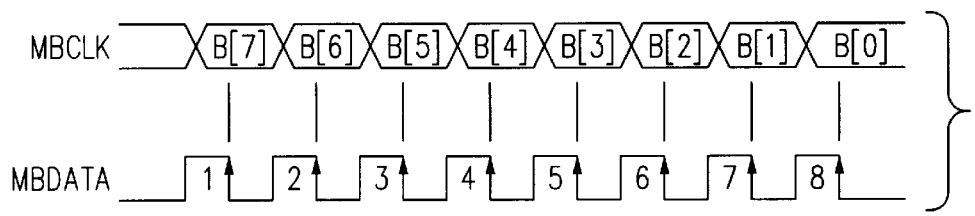
FIG. 5B illustrates transmission of a command over IDCS bus 150 according to the principles of this invention.

IDCS bus 150 accommodates a single bus master at a time, with all other bus members being slaves. The clock and data are generated by the sole master of the bus. In normal IDCS bus operations, the voltage on line MBDATA does not cycle from a low voltage to a high voltage and back to a low voltage again without a clock rising edge transition occurring on clock line MBCLK. Conversely, commands are transmitted over IDCS bus 150 by holding line MBCLK at a high voltage (FIG. 5B) and cycling the voltage level on line MBDATA to clock the various bits of the command, i.e., the functions of lines MBDATA and MBCLK are reversed from the functions for data transmission.

OVERVIEW OF BUS DISPATCH OPERATION

Figure 6:
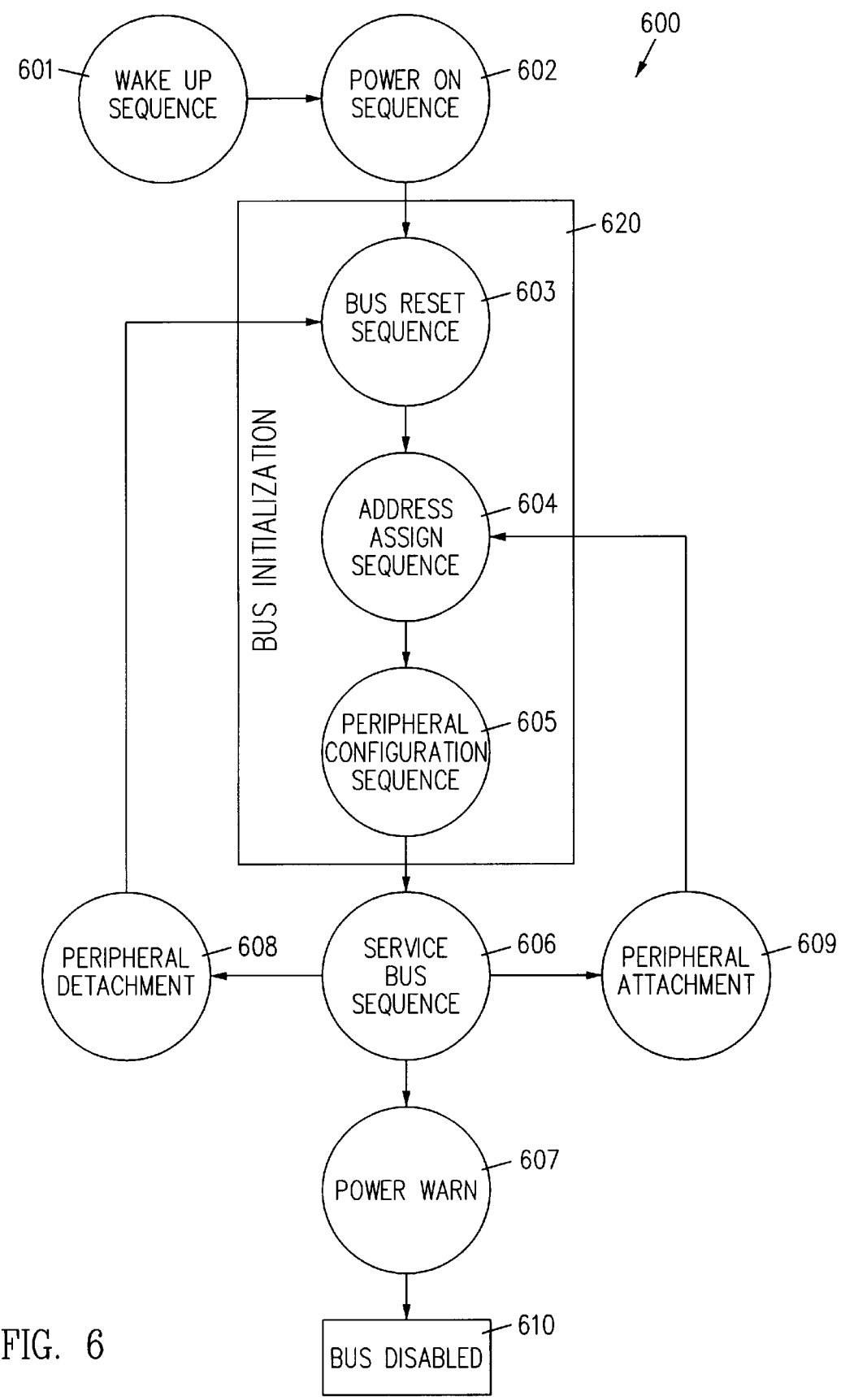
FIG. 6 is a flow diagram for the operation of bus dispatch 305.

FIG. 6 is a process diagram 600 of one embodiment of the operation of bus dispatch 305. The order of sequences 601 to 610 is necessary to assure that MBICs 415, 425, and 435 are in proper states to respond to commands from bus dispatch 305. Specifically, the reliability of IDCS bus 150 is insured, because sequences 601 to 610 assure that peripheral devices attached to IDCS bus 150 are initialized and responding properly before commands and data are sent onto IDCS bus 150. When bus dispatch 305 determines that activity on IDCS bus 150 has remained quiescent for a predetermined time interval, bus dispatch shuts down IDCS bus 150 and turns off the voltage on line MBVCC, i.e., bus dispatch 305 places IDCS bus 150 in a powered-down sleep mode.

In wake-up sequence 601, one of the self-powered peripheral devices on IDCS bus 150 toggles the signal level on line MBINT, e.g., asserts an active signal on line MBINT for at least 100 nanoseconds (ns). In response to the pulse on line MBINT to bus dispatch 305, bus dispatch 305 enters power-on sequence 602. Alternatively, bus dispatch 305 enters power-on sequence 602 during the power-on process of base station 100. In power-on sequence 602, bus dispatch 305 applies power to IDCS bus 150 and then checks whether peripheral devices are attached to bus dispatch 305. If peripheral devices are attached, processing transfers from power-on sequence 602 to bus initialization sequence 620.

Bus initialization sequence 620, in this embodiment, includes bus reset sequence 603, address assign sequence 604, and peripheral configuration sequence 605. In bus reset sequence 603, bus dispatch toggles the IDCS bus power supply voltage MBVCC and then confirms that at least one peripheral device is attached to bus dispatch 305. If a peripheral device is attached, processing transfers from bus reset sequence 603 to address assign sequence 604.

In address assign sequence 604, bus dispatch 305 assigns all the peripheral devices on IDCS bus 150 addresses. In this embodiment, peripheral device 410, i.e., the peripheral device closest to bus dispatch 305, is assigned identification-number/address 110 (decimal 6), and peripheral device 420, the peripheral device next closest to bus dispatch 305, is assigned with identification number 101, and so forth. Sometimes, peripheral device 410 is referred to as the first peripheral device on IDCS bus 150.

In this embodiment, only a MBIC has knowledge of its own peripheral device's address on IDCS bus 150. Thus, the user, in attaching peripheral devices to IDCS bus 150, does not need to worry about the order in which the particular peripheral devices are arranged and needs to know nothing concerning the relative location of the peripheral device on IDCS bus 150.

Further, bus dispatch 305 can configure IDCS bus 150 without any of microcontrollers 416, 426 and 436 being active. So long as a peripheral device's MBIC, e.g. MBIC 415, is functional, a malfunctioning microcontroller, e.g. microcontroller 416, does not prevent other functional peripheral devices 420 or 430 downstream from communicating with bus dispatch 305 either in bus initialization sequence 620 or in subsequent operation.

After bus dispatch 305 assigns an address to each of peripheral devices 410 to 420, bus dispatch 305 transitions to peripheral configuration sequence 605. In peripheral configuration sequence 605, each peripheral device informs bus dispatch 305 of its characteristics. The information provided typically includes the type (function) of peripheral device, the manufacturer, and the model number. In addition, each peripheral device 410 either identifies an existing software device driver, sometimes called a peripheral client, in bus dispatch 305, or is capable of downloading a software device driver to bus dispatch 305. From the perspective of a user, peripheral device 410 is simply attached to base station 100 and it works.

When bus initialization sequence 620 is completed, i.e, each peripheral device has been assigned an address, the peripheral device has been identified, and a driver for the peripheral device has been found. MBICs 415, 425 and 435 in peripheral devices 410, 420, and 430, respectively, are each in an idle mode and processing transfers to service bus sequence 606.

In service bus sequence 606, bus dispatch 305 services interrupts on line MBINT and transmits and receives data in response to directions from peripheral clients in base station 100. When there is no activity on IDCS bus 150 and each of peripheral devices 410 to 430 is in the idle mode, the upstream and downstream buffers in each mid-peripheral MBIC are configured to pass information downstream from bus dispatch 305. Interrupt signals flow only from peripheral devices 410, 420, and 430 to bus dispatch 305, i.e., upstream only, and so buffers on line MBINT pass a signal upstream to bus dispatch 305.

Peripheral devices 410 and 420, as mid-peripheral devices, must cooperate in transfer of commands and data to any downstream peripheral, and in transfer of commands, data, and interrupt signals upstream to bus dispatch 305. Conversely, last peripheral device 430 may not participate in transfer of commands and data downstream, but when a new peripheral device is connected to peripheral device 430 via IDCS bus 150, peripheral device 430 must be capable of functioning as a mid-peripheral device.

A command sequencer within bus dispatch 305 is responsible for packaging a command into the appropriate sequences and queuing the command in a FIFO circuit within bus dispatch 305 for transmission over IDCS bus 150. In this embodiment, there are four types of command sequences, hardware commands, software commands, command Send and command Get. Commands Send and Get are software commands, but, as explained more completely below, are considered separately because the command sequences for commands Send and Get are different from the command sequences for the other software commands. Hardware commands are intended for a MBIC in a particular peripheral device and are not passed along to the peripheral device's microcontroller. In the embodiment described below, hardware commands are sent as a single command word consisting of two bytes both of which are read and interpreted by the MBIC in the addressed peripheral device. Hardware commands are sent at the maximum IDCS bus speed, e.g., 14.75 Mbps.

Software commands are commands intended for a peripheral device's microcontroller. Software commands also are sent in one two byte command word with the exception of commands Send and Get, which involve data transactions and thus follow different sequences. The MBIC, e.g., MBIC 415, reads the command word, and if MBIC 415 determines that the command word is a software command for its microcontroller 416, MBIC 415 passes only the second byte of the command word that contains a command code to microcontroller 416.

Bus dispatch 305 uses command Send to inform a peripheral device that bus dispatch 305 is about to transmit data to the peripheral device. Command Send may be transmitted over IDCS bus 150 at two different speeds. The first byte in the command is intended only for MBICs 415 to 435 and so is sent at the maximum bus speed. The second byte is passed to the microcontroller and so the second byte is transmitted at a speed compatible with the microcontroller as is the subsequent data.

Command Send is followed directly on IDCS bus 150 by the data packet or packets and then an end of transmission command EOT to the addressed peripheral device that tells the peripheral device that the transaction is completed. Each command Send must be transmitted in this sequence to ensure proper gating by MBICs 415, 425 and 435 of lines MBDATA and MBCLK.

Command Get is used by bus dispatch 305 to inform a peripheral device to send data to bus dispatch 305. The command Get sequence begins with the issuance of command Get by bus dispatch 305. Command Get also may be transmitted over IDCS bus 150 at two different speeds. The first byte in the command is intended only for MBICs 415 to 435 and so is sent at the maximum bus speed. The second byte is passed to the microcontroller and so the second byte is transmitted at a speed compatible with the microcontroller.

When the addressed peripheral device receives command Get, the peripheral device responds by sending a start of transmission command SOT that configures IDCS bus 150 to transmit data from the peripheral device to bus dispatch 305. Start of transmission command SOT is followed by data packets which are followed by an end of transmission command EOT that tells each MBIC on IDCS bus 150 and bus dispatch 305 that the transaction is completed.

End of transmission command EOT, is generated by bus dispatch 305 at the end of each bus transaction. A command logic circuit, which is described more completely below, in each of MBICs 415, 425 and 435 continuously monitors lines MBDATA and MBCLK for command EOT. Each peripheral device 410, 420 and 430 is therefore able to detect the end of all bus transactions.

IDCS bus 150 is fully interrupt driven. Peripheral devices send interrupts over line MBINT to get the attention of bus dispatch 305. When bus dispatch 305 senses an interrupt, bus dispatch 305 performs an interrupt poll, as described more completely below, to the determine the source and the nature of the interrupt. Interrupts are serviced by bus dispatch 305 once the current command cycle is complete. Interrupts signal when a peripheral device requires servicing, e.g, when an action initiated by a command is completed, or when data packets are ready for transmission. Interrupts also indicate when a peripheral device has been attached or detached from IDCS bus 150 and when an IDCS bus 150 error occurred.

Bus dispatch 305 adheres to a fairness protocol which insures that all peripheral devices receive equal priority on IDCS bus 150. Bus dispatch 305, in one embodiment, implements the fairness protocol using a first-in-first-out memory (FIFO) that is divided into two slots, i.e., a low priority slot for commands, and a high priority slot for interrupts. Commands are processed in the order in which the commands are received in the low priority slot, but a command is not handled until interrupts are serviced. Upon completion of each command cycle, bus dispatch 305 first checks the high priority slot for interrupts received. If the high priority slot is empty, bus dispatch 305 determines whether interrupt line MBINT is high indicating that an interrupt is on IDCS bus 150. If interrupt line MBINT is high, bus dispatch 305 performs an Interrupt-Poll sequence. Conversely, bus dispatch 305 processes the oldest command in the low priority slot. Interrupt polling, as described more completely below, is conducted by bus dispatch 305 in a round robin fashion such that no peripheral device has priority for interrupt servicing.

Thus, interrupts from peripheral devices are serviced between command cycles as they occur. If an interrupt and a command are received simultaneously by bus dispatch 305, the interrupt is serviced first. If real-time mode is enabled, interrupts are serviced at regular intervals at a latency time specified by the peripheral device. Bus dispatch 305 sets the command cycle length for IDCS bus 150 based on the lowest latency interrupt response time of the peripheral devices on IDCS bus 150.

CONNECTION OF A PERIPHERAL DEVICE

If only peripheral devices 410 and 420 are on IDCS bus 150, MBIC 425 shuts off signal transmission on lines MBDATA and MBCLK to bus connector 421 because peripheral device 410 is a mid-peripheral device and peripheral device 420 is the last-peripheral device on IDCS bus 150, in this example. With signal transmission to bus connector 421 shut off by MBIC 425, peripheral device 430 can be connected to bus connector 421 under one of three conditions.

The first condition is when base station 100 is configured so that the power supply voltage to IDCS bus 150 is turned off, i.e., IDCS bus 150 is asleep. In this case, the peripheral device is initialized in bus initialization 620, as described above.

The second condition is when peripheral devices 410 and 420 are in the idle mode and the third condition is when active communications are occurring on IDCS bus 150. In both of those conditions, bus dispatch 305 is in service bus sequence 606.

When peripheral device 430 is connected at the end of the daisy chain to bus connector 421, MBIC 435 is isolated from the signals on bi-directional lines MBDATA and MBCLK. The act of connecting peripheral device 430 to bus connector 421 supplies the bus power from connector 421 to MBIC 435 which in turn provides a signal indicating that bus power is available to microcontroller 436.

The act of docking peripheral device 430 to peripheral device 420 results in an interrupt being sent to bus dispatch 305 if IDCS bus power supply voltage MBVCC is on. Note that herein the line carrying the bus power supply voltage and the bus power supply voltage have the same reference numeral for convenience. This convention is also used for other lines and terminals that are described herein. MBIC 435 in peripheral device 430 configures peripheral device 430 so that downstream connector 431 is terminated. Thus, signals are not radiated from connector 431 in the process described below.

If peripheral devices 410 and 420 are in the idle mode, bus dispatch 305, upon receipt of the interrupt signal from peripheral device 430, performs an Interrupt-Poll sequence within service bus sequence 606. When bus dispatch 305 determines that neither peripheral device 410 nor peripheral device 420 generated the interrupt, processing transfers to peripheral attachment sequence 609.

In peripheral attachment sequence 609, bus dispatch 305 configures peripheral device 420 as a mid-peripheral device. Specifically, bus dispatch 305 sends command Assign Mid-Peripheral to last addressed peripheral device 420 on IDCS bus 150 and so the last addressed peripheral device functions as a mid peripheral. As explained above, as a mid peripheral device 420, MBIC 425 enables the downstream signal lines to allow bus dispatch 305 to communicate with newly attached peripheral 430. Bus dispatch 305 then transfers processing to address assign sequence 604. Peripheral device 430 is assigned an address in sequence 604 and then peripheral configuration sequence 605 configures bus dispatch 305 to support peripheral device 430 on IDCS bus 150.

If active communications are occurring on bus 150 when the interrupt signal is received from peripheral device 430, bus dispatch 305, at an appropriate later time, performs the interrupt poll sequence, and takes peripheral device 430 through the peripheral attachment sequence 609 in the same matter as just described when peripheral devices 410 and 420 were idle.

DISCONNECTION OF A PERIPHERAL DEVICE

Any one of peripheral devices 410, 420, 430, can be disconnected from IDCS bus 150 at any time without causing a catastrophic failure of IDCS bus 150. Thus, any peripheral device can be removed when IDCS bus 150 is in any one of the three sequences described above for connecting peripheral device 430.

When a peripheral device is removed during a power down or sleep period, all peripheral devices connected to IDCS bus 150 are re-registered when bus dispatch 305 powers up IDCS bus 150 in sequence 602 and then performs bus initialization sequence 620. The disconnection of a peripheral device that occurred at power down or during the sleep period is detected during the re-registration process.

If all peripheral devices 410, 420 and 430 are in the idle mode when the disconnection occurs, the peripheral device immediately upstream from the disconnection is notified by the signal level on line MBINT and in turn sends an interrupt to bus dispatch 305. Bus dispatch 305, in response to the interrupt, performs an Interrupt-Poll sequence. Since a peripheral device has not generated the interrupt, an interrupt-poll error occurs and bus dispatch 305 transitions through peripheral detachment sequence 608 to bus initialization sequence 620 which reconfigures IDCS bus 150 in view of the disconnection.

If data is being transmitted on IDCS bus 150 when disconnection of a peripheral device involved in the transmission occurs, a communication time-out occurs and bus dispatch 305 cancels the transaction. Bus dispatch 305, in response to the interrupt generated by the disconnection, reconfigures IDCS bus 150 in view of the disconnection by transitioning through peripheral detachment sequence 608 to bus initialization sequence 620, as described above. Thus, disconnection of a peripheral device from IDCS bus 150 requires no action by the user to reconfigure or terminate the bus. All of these actions are performed automatically.

During a normal power down of IDCS bus 150 by bus dispatch 305, bus dispatch 305 notifies each peripheral device 410, 420, 430 of the power shut down in power warn sequence 607 and MBICs 415, 425, 435 establish safe, non-contentious bus conditions. Similarly, if IDCS bus power supply voltage MBVCC starts to fall into a range that can not support bus operations, bus dispatch 305 enters power warn sequence 607 to notify each attached peripheral device of the pending power down. Upon completion of power warn sequence 607, IDCS bus 150 enters a bus disabled state 610. For an unexpected power down of IDCS bus 150, each microcontroller 416, 426, 436 monitors the power supply voltage to the respective MBIC 415, 425, 435, and shuts down the peripheral device as appropriate.

COMMAND STRUCTURE

Figure 5C:
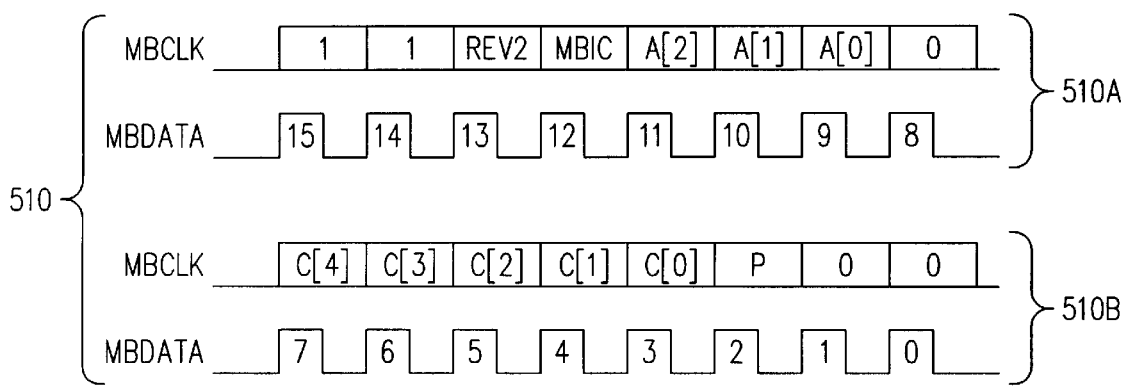
FIGS. 5C show the structures for one embodiment of a command according to the principles of this invention.

In this embodiment, commands are transmitted over IDCS bus 150 in two 8-bit (byte) packets (FIG. 5C). Each two-byte command 510 contains thirteen bits of data, plus a parity bit. First command byte 510A contains control bits plus the address of the peripheral device for which the command is destined. Second command byte 510B contains the command code itself, plus a parity bit.

In first command byte 510A the first two bits are command detection bits. The command detection bits are set to logic one to identify first command byte 510A as part of a command to a MBIC. The command detection bits are used to resynchronize the MBIC, as described below.

Third bit REV2 in first command byte 510A is a revision bit. This bit is a reserved bit and is used to indicate the revision of the SPI protocol. For revision one of the SPI protocol, bit REV2 must be a logic zero, for example.

Fourth bit MBI of byte 510A is a bus-interface-circuit bit. If bus-interface-circuit bit MBI is set to a value of a logic zero, a MBIC allows the contents of second command byte 510B to pass through to the microcontroller. Conversely, when bus-interface circuit bit MBI is set to a value of logic one, the command is intended only for a MBIC and so second command byte 510B is not passed through to the associated microcontroller.

Bits five through seven i.e., bits A2–A0 of first command byte 510A, contain the address of the peripheral device for which the command is intended. The address starts with the most significant bit A2 in bit five and the least significant bit A0 is in bit seven of first command byte 510A. The eighth bit of first command byte 510A is reserved in this embodiment and should be a logic zero. However, the eighth bit could be used as a fourth address bit and thereby expand the capacity of IDCS bus 150.

In this embodiment, peripheral device addresses are 3-bit codes that uniquely identify each currently attached peripheral device and designate relative downstream/upstream positions of peripheral devices to each other. Peripheral devices 410, 420 and 430 are each assigned a unique peripheral address by bus dispatch 305 when first attached to IDCS bus 150 in bus initialization sequence 620. This address remains unchanged until either peripheral device(s) 410, 420 and/or 430 are disconnected from bus IDCS 150 or reset. In one embodiment, addresses are assigned as given in Table I.

TABLE I

| ADDRESS ASSIGNMENTS | |
| --- | --- |
| Address 7: | designates a message broadcast to all peripheral devices by bus dispatch 305. |
| Address N: | (1 ≦ N < 7) designates the (7-N)th peripheral device on IDCS bus 150. |
| Address 0: | reserved |

In sum, first command byte 510A contains seven bits of data that (a) identify a command data structure, (b) indicate the revision level of the command, (c) instruct whether the following byte is intended for a microcontroller or only a MBIC, and (d) also identify the address of the peripheral device for which command 510 is intended.

The first five bits C[4] to C[0] of second command byte 510B are command code bits that contain the command operation code (op code) itself (See also Table IV). Sixth bit PAR of second command byte 510B is a parity bit that is used to guarantee the integrity of the information in command bytes 510A and 510B. In this embodiment, even parity is used to determine whether to set bit PAR. Even parity signifies that parity bit PAR is set to a logic value such that the sum of the total number of bits having a value of logic one is an even number. For example, if the preceding thirteen bits of the command bytes 510A, 510B have an odd number of logic one bits, parity bit PAR is set by bus dispatch 305 to logic one, so as to make the total number of logic one bits even. Conversely, if the first thirteen bits of the command bytes 510A, 510B have an even number of logic one bits, then parity bit PAR is set to logic zero.

The last two bits of second command byte 510B must always be logic zero. A MBIC always checks the parity of a received command with parity bit PAR at the end of every command to determine whether the command has been received without transmission errors. If the MBIC detects a parity error, the MBIC immediately terminates any further communications, sends an interrupt to bus dispatch 305 and issues a reset signal to the microcontroller. Specifically, the MBIC and the associated microcontroller return to same state as when the peripheral device containing the MBIC and microcontroller was first added to IDCS bus 150 and an interrupt is sent by the MBIC to bus dispatch 305. When bus dispatch 305 detects the interrupt and determines that the cause of the interrupt was an error, bus dispatch 305 resets IDCS 150 and initiates bus initialization sequence 620.

BUS COMMANDS

In this embodiment, commands are subdivided into software commands and hardware commands. Software commands are passed by a MBIC to the microcontroller to which it is connected, e.g., from MBIC 415 to microcontroller 416. In this embodiment, the software commands are given in Table II.

TABLE II

SOFTWARE COMMANDS

1. Power-Warning
2. Soft-Reset
3. Verify
4. Send-xxx
5. Get-xxx
6. Reserved

A MBIC passes only the second byte of the software command to microcontroller 416 of peripheral device 410. Only two types of software commands, Send-xxx and Get-xxx, involve data transactions in addition to the two command bytes. Herein, -xxx is used in commands Send and Get to indicate that more than one command is envisioned. Command Send-xxx involves a transfer of data from base station 100 to a peripheral device, while command Get-xxx involves the transfer of data from a peripheral device to base station 100.

In this embodiment, hardware commands intended only for a MBIC are given in Table III.

TABLE III

HARDWARE COMMANDS

1. Clear-Error-Flag
2. Assign Address
3. Assign Mid/Last-Peripheral
4. Error-Poll
5. Interrupt-Poll
6. Set/Clear-Hardware Reset
7. Set/Clear-Peripheral Power-on
8. Start/End-of-Data-Transmission (SOT/EOT)

Hardware commands are either addressed to a particular MBIC, or addressed globally, e.g., broadcast to all MBICs 415, 425 and 435 on IDCS bus 150.

A command cycle begins with the issuance of a command by bus dispatch 305. The command defines the peripheral device or peripheral devices that must respond(s) and the action to be taken by the peripheral device or devices. Here, a peripheral device should be understood to mean the MBIC in the peripheral device if the command is a hardware command and the microcontroller in the peripheral device if the command is a software command. In this embodiment, as explained above, first command byte 510A contains the address of the destination peripheral and second command byte 510B a command operation code (op code). The op code defines the particular action to be performed.

Table IV lists the assignment of various commands to the five bit command op-code field for one embodiment of this invention.

TABLE IV

| Op-Code | Command | Global |
|---------|---------|--------|
| 00h | Power-Warning | No |
| 01h | Soft-Reset | No |
| 02h | Verify | No |
| 03h | IRQ-Get | No |
| 04h–06h | Get-xxx | No |
| 07h–0Ah | Send-xxx | No |
| 0Bh | Request ID | No |
| 0Ch | Get Peripheral Info | No |
| 0Dh | Get Driver | No |
| 0Eh–13h | Reserved | No |
| 14h | Clear Error Flag | No |
| 15h | Assign Address | No |
| 16h | Assign Mid-Peripheral | No |
| 17h | Assign Last-Peripheral | No |
| 18h | Error-Poll | Yes |
| 19h | Interrupt-Poll (IRQ-Poll) | Yes |
| 1Ah | Set-Hardware-Reset | Yes |
| 1Bh | Clear-Hardware-Reset | Yes |
| 1Ch | Set-Peripheral-Power-On | Yes |
| 1Dh | Clear-Peripheral-Power-On | Yes |
| 1Eh | Start-of-Transmission (SOT) | No |
| 1Fh | End-of-Transmission (EOT) | No |

The first twenty op-code values, i.e., 00h through 13h, are reserved for software commands and the next twelve op-code values, i.e., 14h through 1Fh, are reserved for hardware commands. The op-code values are listed in the first column of Table IV with the corresponding command type listed in the second column of the table.

The third column of table IV indicates whether the command can be addressed globally to all peripheral devices 410, 420 and 430 on IDCS bus 150, or whether the command is intended only for a specific peripheral device identified in the address field of first command byte 510A. Both software commands Get-xxx and Send-xxx are each assigned four op-code values, 03h to 06h and 07h to 0Ah, respectively. Software commands Get-xxx include command IRQ-Get. Reserved commands, corresponding to op-code values 0Eh to 13h, are ignored by a MBIC, but are passed on by the MBIC to the addressed microcontroller if bit REV2 and bit MBI are both set to a logic zero.

Each of the various commands is described briefly followed by a detailed description of one specific implementation of a MBIC. The various states of a state machine within a MBIC, that are referred to in the following description, are discussed in greater detail below. Briefly, in this embodiment, a MBIC can be in any one of a plurality of states. The states include: power-on, no-address, mid-idle, last-idle, pre-pass-up, pass-up, pre-get, get, post-get, and send. Further, any one of MBICs 415, 425, and 435 can be in a state different from the state of the other two MBICs at any instant in time.

Command Power-Warning is transmitted to the peripheral device addressed in the first byte of the command. Command Power-Warning notifies the peripheral device microcontroller that IDCS bus power supply voltage MBVCC is about to fall out of the specified operating range, i.e., the IDCS bus power supply voltage is about to shut down. In response to command Power-Warning, the microcontroller assumes a disconnected state, and ignores all subsequent activity on IDCS bus 150.

Software command Soft-Reset is transmitted to a microcontroller of a particular peripheral device, e.g., microcontroller 416 in peripheral device 410. Command Soft-Reset instructs the microcontroller to reset itself to a known state, typically, state No-Address. When the reset is complete, an interrupt is sent to bus dispatch 305.

Command Verify is addressed to a particular peripheral device, e.g., peripheral device 410, and indicates to microcontroller 416 that peripheral device 410 should perform a self diagnostic routine and generate an interrupt to bus dispatch 305 when the self diagnostic routine is completed. Bus dispatch 305 sends out a command Interrupt-Poll (IRQ-Poll) as described more completely below, in response to the interrupt sent by microcontroller 416. When bus dispatch 305 determines that microcontroller 416 issued the interrupt, bus dispatch 305 issues command IRQ-Get. In response to command IRQ-Get, the addressed peripheral device transmits a two-byte packet, in this embodiment, to bus dispatch 305. The specific information in the packet is determined by the driver for the peripheral device, because bus dispatch 305 simply passes the information in the packet to the driver. After bus dispatch 305 has received the response to command IRQ-Get, bus dispatch 305 sends an end of transmission command EOT.

As discussed above, command Get-xxx requests information from a particular peripheral device while command Send-xxx sends information to a particular peripheral device or devices. Both commands Get-xxx and Send-xxx rely on the presence of adequate data buffering resources at the receiving end, i.e., at a receiving device or at bus dispatch 305. Bus dispatch 305 transmits an end of transmission command EOT at the end of the data stream in either case.

Software commands Request ID, Get Peripheral Info, and Get Driver are status commands. These commands inform the addressed microcontroller of the information that is to be transmitted in response to the next command get that is addressed to that microcontroller.

Hardware command Clear Error Flag clears an error flag in a MBIC that is set upon detection of a parity error. In response to command Clear Error Flag, the addressed MBIC clears the error flag.

Hardware command Assign-Address is recognized by the MBIC closest to base station 100 that has not been assigned an address. When a new peripheral device is connected to IDCS bus 150, the peripheral device must complete the power up sequence within a certain time period, e.g. 100 msec, after connection to IDCS bus 150 so that the MBIC in the peripheral device is ready to receive command Assign-Address from bus dispatch 305. The MBIC in the newly attached peripheral device takes the address in the first byte of this command as the identify (ID) address and assumes normal operation in a Last-Idle state.

Command Assign Mid-Peripheral is specifically addressed to a particular bus interface circuit, e.g. in this embodiment, either MBIC 415 or 425, and causes one of MBIC 415 or 425 to enter a state Mid-Idle, i.e. peripheral device 410 or 420 functions as a mid-peripheral device.

Command Assign Last-Peripheral directs a specific MEIC to re-configure itself as the last peripheral device. This command can be used by bus dispatch 305 to reconfigure IDCS bus 150 when a peripheral device is removed from IDCS bus 150.

Command Error-Poll is sent to a specific peripheral device, e.g. peripheral device 420, and allows bus dispatch 305 to determine whether MBIC 425 detected a parity error in transmission of a command to peripheral device 420. Command Error-Poll is identical with command Interrupt-Poll, with the exception that when peripheral device 420 is error polled, MBIC 425 disables both peripheral device 420 and downstream interrupt channels and so interrupt line MBINT is driven only by MBIC 425. Peripheral device(s) upstream or downstream from device 420, i.e. devices 410 or 430, respectively, receive the command Error-Poll and behave as if they received command Interrupt-Poll.

Command Interrupt-Poll (IRQ-Poll) allows bus dispatch 305 to determine which peripheral device is the source of an interrupt. Bus dispatch 305 sequentially transmits command IRQ-Poll to each peripheral device on IDCS bus 150. When command Interrupt-Poll is sent to a particular peripheral device, e.g. peripheral device 420, MBIC 425 enables its peripheral device interrupt line, but disables the downstream interrupt lines. Peripheral devices, upstream from device 420, e.g., peripheral device 410, disable the respective peripheral device interrupt lines and enable the respective downstream interrupt line. Peripheral devices downstream, e.g. device 430, from polled peripheral device 420, enable both their respective peripheral and downstream interrupt channels.

Thus, if an interrupt is detected when peripheral device 420 is polled and peripheral device 420 is connected to IDCS bus 150, the only possible source of the interrupt is peripheral device 420 because MBIC 425 disabled the downstream interrupt line and MBIC 415 disabled the peripheral interrupt line. Consequently, if either peripheral device 420 or MBIC 425 generated the interrupt, the interrupt signal is active at bus dispatch 305 after bus dispatch 305 transmits command IRQ-Poll to MBIC 425. After receiving command IRQ-Poll, peripheral device 420 responds by removing the interrupt from line MBINT, if peripheral device 420 was the source of the interrupt. If an interrupt is not detected when peripheral device 420 is polled, the polling continues until the peripheral device that generated the interrupt is detected.

If command IRQ-Poll is sent with the address field set to a global address, i.e., an address of seven, interrupts are enabled for all peripheral devices 410, 420 and 430. If command IRQ-Poll is set with an address of zero, peripheral device generated interrupts are disabled, but the downstream interrupt lines on all peripheral devices 410, 420 and 430 are enabled, i.e. devices 410, 420 and 430 are able to propagate interrupts in an upstream direction.

Command Set Hardware Reset and command Clear Hardware Reset respectively allow bus dispatch 305 to reset the microcontroller in a particular peripheral device and to clear a reset signal to a particular peripheral device. For example, when a MBIC detects a error, the MBIC generates a reset signal to the microcontroller. Consequently, bus dispatch 305 can use command Clear Hardware Reset to remove the reset signal to the peripheral device. In response to command Set Hardware Reset, the MBIC and the microcontroller assume the power-on state, which is described more completely below.

Commands Set Peripheral Power-on and Clear Peripheral Power-on are part of the IDCS bus power protocol that is explained more completely below. Bus dispatch 305 issues command Set Peripheral Power-on and Clear Peripheral Power-on to power up and power down, respectively, a peripheral device containing the addressed MBIC respectively. In this embodiment, the support for the two commands is optional.

Hardware Start-of-Transmission command SOT and End-of-Transmission command EOT are used by both dispatch 305 and peripheral devices 410, 420, 430 as part of the IDCS bus protocol, to identify the beginning and the end, respectively, of a data transmission.

In this embodiment, command SOT has an address of seven and bit MBI set. Similarly, command EOT also has bit MBI set. However, the address of command EOT varies depending on whether bus dispatch 305 or a peripheral device issues command EOT.

When command EOT is issued by bus dispatch 305, command byte 510A has the address bits set to the address of the peripheral device involved in the data transaction. Conversely, when command EOT is issued by a peripheral device command EOT has the address bits set to seven. Bit MBI is set to guarantee that commands SOT and EOT are never passed through to a microcontroller. An address of seven in either a command SOT or command EOT prevents generation of peripheral command EOT by any of peripheral devices 410, 420 and 430. Bus dispatch 305 must send a command EOT with a particular peripheral device's address to assert that peripheral device's end of transmission signal.

A FIRST DETAILED EMBODIMENT OF A MBIC

Prior to considering the operation of each MBIC in further detail, an embodiment MBIC 700 (FIG. 7A) of MBICs 415, 425, and 435 is considered. Line MBDATA (FIG. 4) is coupled to terminal UPMBDATA on upstream side 700A (FIG. 7A) of MBIC 700 and to terminal DNMBDATA on down stream side 700B. Herein, for convenience signal lines between bus dispatch 305 and the first peripheral device and signal lines between peripheral devices are all referred to as lines MBDATA, MBCLK and MBINT and a similar convention applies to the bus power supply and ground lines. The particular location of a line in the bus will be apparent from the context of the disclosure.

Any signal on terminal UPMBDATA drives buffer 706 which in turn drives line UPDATA. Any signal on line UPDATA drives a first input line of multiplexer 718, a first input line of multiplexer 723, a first input line of multiplexer 735 and a first input line of multiplexer 756. A second input line of multiplexer 718 is grounded. Control line 719 of multiplexer 718 is driven by bus state control logic circuit 760. The output line of multiplexer 718 is connected to the input terminal of three-state buffer 717, which has an output terminal connected to terminal DNMBDATA. Control line 720 to three-state buffer 717 is driven by bus state control logic circuit 760.

Any signal on terminal DNMBDATA drives buffer 716 which in turn drives line DNDATA. Any signal on line DNDATA drives a first input line of multiplexer 708 and a first input line of multiplexer 756. Control line 709 of multiplexer 708 is driven by bus state control logic circuit 760. The output line of multiplexer 708 is connected to an input terminal a three-state buffer 707 which in turn has an output terminal connected to terminal UPMBDATA. Control line 710 to three-state buffer 707 is driven by bus state control logic circuit 760.

Line MBCLK (FIG. 4) is coupled to terminal UPMBCLK on upstream side 700A of MBIC 700 (FIG. 7A) and to terminal DNMBCLK on down stream side 700B. Any signal on terminal UPMBCLK drives buffer 701 which in turn drives line UPCLK. Any signal on line UPCLK drives a first input line of multiplexer 713, a second input line of multiplexer 723, a second input line of multiplexer 735, and a first input line of multiplexer 755. A second input line of multiplexer 713, a third input line of multiplexer 723, and a third input line of multiplexer 735 are grounded. Control lines 714, 724, and 736 of multiplexers 713, 723, and 735, respectively are driven by bus state control logic circuit 760. A signal on the output line of multiplexer 713 drives a three-state buffer 712, which in turn drives terminal DNMBCLK. Control line 715 to three-state buffer 712 is driven by bus state control logic circuit 760.

Any signal on terminal DNMBCLK drives buffer 711 which in turn drives line DNCLK. The signal on line DNCLK drives a first input line of multiplexer 703 and a second input line of multiplexer 755. Control line 704 of multiplexer 703 is driven by bus state control logic circuit 760. Any signal on the output line of multiplexer 703 drives a three-state buffer 702 which in turn drives terminal UPMBCLK. Control line 705 to three-state buffer 702 is driven by bus state control logic circuit 760.

Peripheral device data line terminal PMBDATA to and from a peripheral device is connected to an input terminal of buffer 721, which in turn is connected to line PDATA. Any signal on line PDATA drives a second input terminal of multiplexer 703, a second input terminal of multiplexer 708, and a third input terminal of multiplexer 755. Line SEL from bus state control logic circuit 760 carries the signal that controls the output signal on line CMDDATA from multiplexer 755 to command logic circuit 780 and the output signal on line /CMDCLK from multiplexer 756 to command logic circuit 780.

The output signal from multiplexer 723 drives three-state buffer 722 which in turn drives peripheral device data line terminal PMBDATA. Control line 725 to three-state buffer 722 is driven by bus state control logic circuit 760.

A signal on peripheral device clock line terminal PMBCLK drives buffer 731, which in turn drives a first input terminal of exclusive OR gate 733. A signal on peripheral device I/O line terminal PSIOP drives buffer 741, which in turn drives a second input terminal of exclusive OR gate 733. The output signal from exclusive OR gate 733 drives line PCLK which in turn drives a third input line of multiplexer 703, a third input line of multiplexer 708, and a third input line of multiplexer 756.

The output signal from multiplexer 735, which is selected by the signal on line 736 from bus state control logic circuit 760, drives a first input terminal of exclusive OR gate 734. A second input terminal of exclusive OR gate 734 is driven by the signal from buffer 741. The output signal of exclusive OR gate 734 drives three-state buffer 732 which in turn drives peripheral device clock line terminal PMBCLK under control of the signal on line 737 from bus state control logic circuit 760.

Hence, when the input signal on terminal PSIOP is asserted, exclusive OR gate 733 inverts the signal on terminal PMBCLK, while exclusive OR gate 734 inverts the signal from multiplexer 735 to terminal PMBCLK. Thus, when the signal on terminal PSIOP is asserted and the microcontroller is the master of the bus, the signal on terminal PMBCLK is inverted before being presented on terminal UPMBCLK to upstream peripheral devices. Conversely, when the signal on terminal PSIOP is asserted and the signal on terminal UPMBCLK is the bus clock, the signal on terminal UPMBCLK is inverted before being presented on terminal PMBCLK to the microcontroller.

Thus, terminal PSIOP allows a system designer to tailor MBIC 700 to match the type of serial port in the microcontroller. When the signal on terminal SIOP is asserted, MBIC 700 can interface with microcontrollers containing serial I/O ports. When the signal on terminal PSIOP is negated, MBIC 700 can interface with microcontrollers containing serial peripheral interface modules compatible with the SPI protocol of this invention.

Line MEINT (FIG. 4) is coupled to terminal UPINTOUT on upstream side 700A of MBIC 700 (FIG. 7A) and to downstream interrupt in terminal DNINTIN, hereinafter terminal DNINTIN, on down stream side 700B of MBIC 700. The signal on upstream interrupt out terminal UPINTOUT, hereinafter, terminal UPINTOUT, is a function of the signals on downstream interrupt terminal DNINTIN and peripheral device interrupt in terminal PINTIN. Downstream interrupt in terminal DNINTIN drives an input line to interrupt logic circuit 770. An output line from interrupt logic circuit 770 is connected to an input terminal of buffer 742. An output terminal of buffer 742 is connected to upstream interrupt line terminal UPINTOUT.

A signal on peripheral power-on line terminal /PON, which is active low, drives inverting buffer 751 which in turn drives power-on line PON. The power-on signal on line PON is an input signal to bus state control logic circuit 760, interrupt logic circuit 770, and command logic circuit 780. The signal on peripheral power-on line PON is used to provide a power-on reset signal for MBIC 700. When signal PON is asserted, internal MBIC registers are initialized to state power-on. Signal PON should be asserted by the microcontroller for a minimum of 100 microseconds after the power supply voltage on line MBVCC to MBIC 700 is asserted.

Peripheral interrupt line terminal PINTIN is connected to interrupt logic circuit 770 and to a drain of field effect transistor (FET) 752. The source of FET 752 is grounded. Terminal SWAP, which is driven by the peripheral device microcontroller, drives an input line of command logic circuit 780 and a drain of FET 753. The source of FET 753 is grounded. A pulse is generated by the microcontroller on line SWAP prior to sending either command SOT or command EOT so that the function of signals on terminals PMBDATA and PMBCLK are swapped. A power down signal from a peripheral device on peripheral device power down line terminal PPWRDWN drives buffer 754 which in turn drives the gates of FETs 752 and 753 and an input line of command logic circuit 780.

The input signal on line PPWRDWN, when asserted, drives the signals on terminals PMBCLK, PMBDATA, PINTIN, SWAP, PRESET, TOMBIC, and PEOT to a logic zero value. Signal PPWRDWN is asserted by external logic when that logic detects that the peripheral device's power supply voltage level is no longer adequate to support operations. Preferably, the signal on line PPWRDWN is qualified with the signal on line MBVCC so that signal PPWRDWN is not asserted when the power-on line MBVCC is turned off.

Command logic circuit 780 has a first output line connected to three-state buffer 743, a second output line connected to three-state buffer 744, a third output line connected to buffer 745 and a fourth output line connected to buffer 746. The signal on line 747 from command logic circuit 780 drives the control terminal of three-state buffers 743 and 744. The signal from three-state buffer 743 drives terminal PEOT to the peripheral device while the signal from three-state buffer 744 drives peripheral device reset line terminal PRESET. The signal from buffer 745 drives peripheral device power-on line terminal PPWRON and the signal from buffer 746 drives terminal TOMBIC.

The signal on terminal PEOT is pulsed when command logic circuit 780 decodes command EOT to its peripheral device. Since the signal on terminal PEOT is pulsed, the microcontroller should be edge sensitive. The signal on terminal PEOT is also taken low when the signal on line PPWRDWN is asserted.

The signal on terminal PRESET is the reset signal for the microcontroller. Preferably, terminal PRESET drives an open collector invertor that is in turn connected to the microcontroller's reset terminal. MBIC 700 always checks parity bit PAR at the end of every command to determine whether the command has been successfully received by MBIC 700, i.e., received error-free. If MBIC 700 detects a parity error, MBIC 700 immediately terminates any further communications by asserting terminal PRESET, and by executing a branch back to a state power-on, that is described more completely below.

Figure 14:
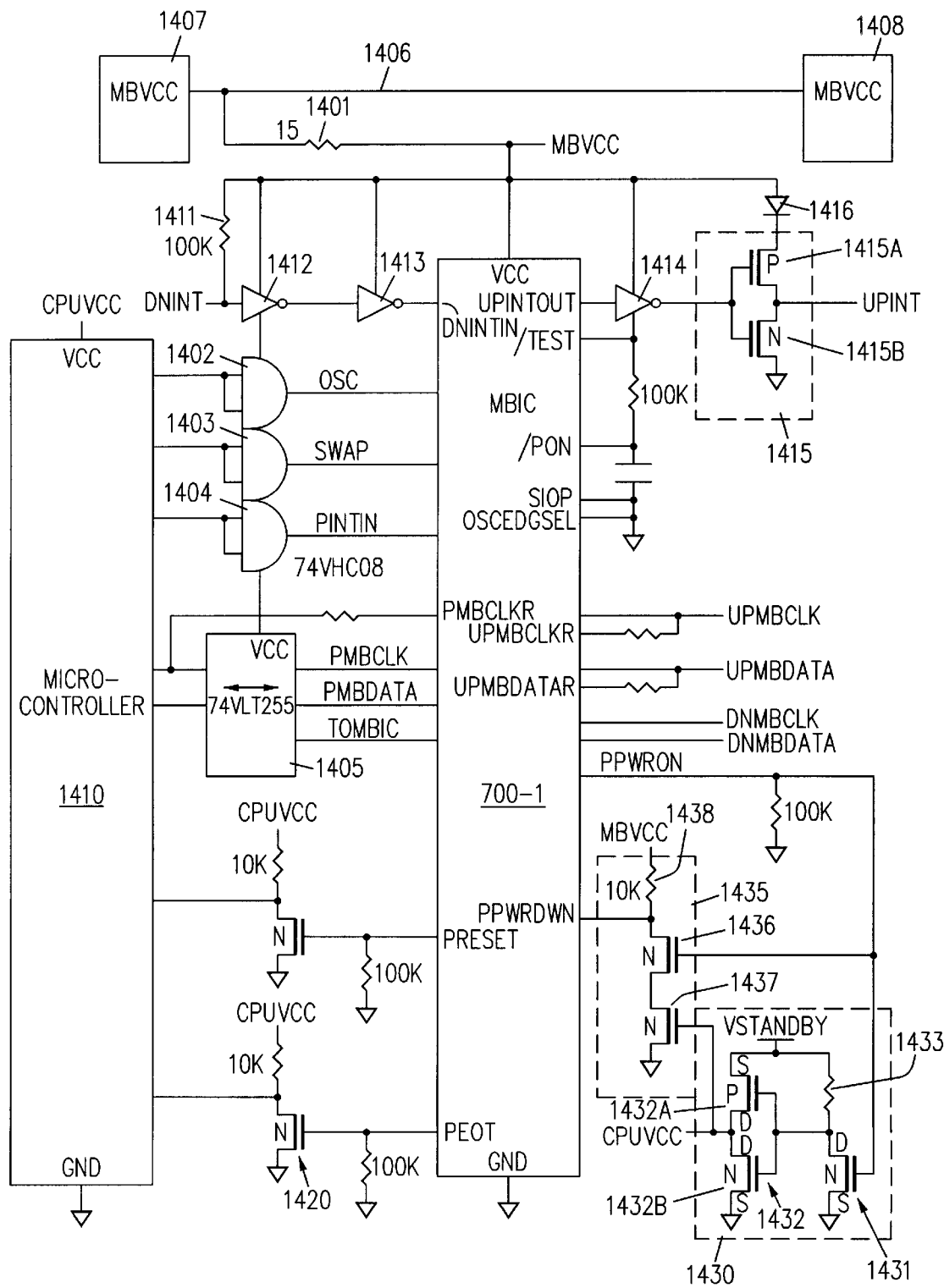
FIG. 14 illustrates one configuration of the integrated circuit of FIG. 7B within a peripheral device.

The signal on terminal PPWRON is an optional power-on signal to the power supply of the peripheral device that instructs the power supply to power up and power down. In one embodiment, if the signal on line PPWRON is used, the signal drives a first input terminal of an open collector NAND gate with a second input terminal driven by power supply line VCC of the peripheral device. The output signal of the NAND gate is pulled up to the voltage of a continuous source of power through a resistor and is connected to terminal PPWRDWN. Another embodiment is illustrated in FIG. 14.

The signal on terminal TOMBIC is an optional control signal to allow use of a five volt microcontroller in place of the normal three volt microcontroller. The signal on terminal TOMBIC controls the direction of an external buffer that level translates the signals from the five volt microcontroller to three volts signals required by MBIC 700. The external buffer must be able to accept five volt level signals on one side and three volt level signals on the other side without incurring latchup.

The signal on terminal /TRIBUFF is a test signal to generate test vectors and in normal operation is driven with a logic one level. When the signal on terminal /TRIBUFF is asserted, the signal is used to tri-state buffers 702, 707, 712, 717, 722, and 732.

Thus, each MBIC 700 has three sets of signal lines. The first set of signals on terminals UPMECLK, UPMBDATA, and UPINTOUT, is for connecting upstream, the second set of signals on terminals PMBCLK, PMBDATA, and PINTIN, is for connecting internally to a microcontroller and the third set of signals on terminals DNMBCLK, DNMBDATA, DNINTIN, is for connecting to the downstream peripheral device(s) if any. All three sets of the signal lines are connected to and are controlled by MBIC 700. Further, MBIC 700 swaps the signals on the various clock and data lines as necessary for the transmission of commands and data.

A SECOND EMBODIMENT OF A MBIC

Figure 7A:
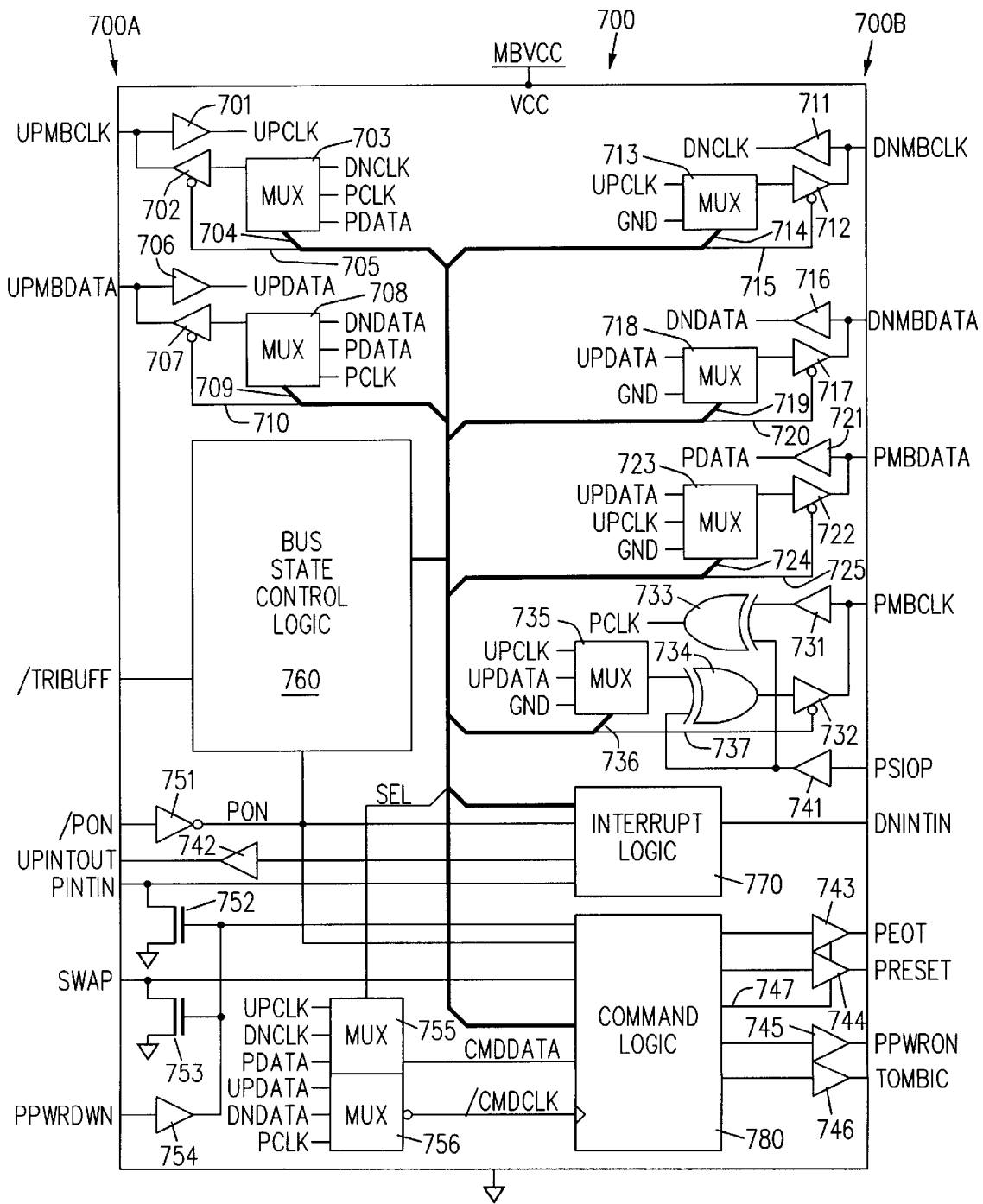
FIGS. 7A and 7B are detailed block diagrams of a first embodiment and a second embodiment, respectively of an integrated circuit that supports the protocols for the intelligent daisy chain serial bus of this invention.
Figure 7B:
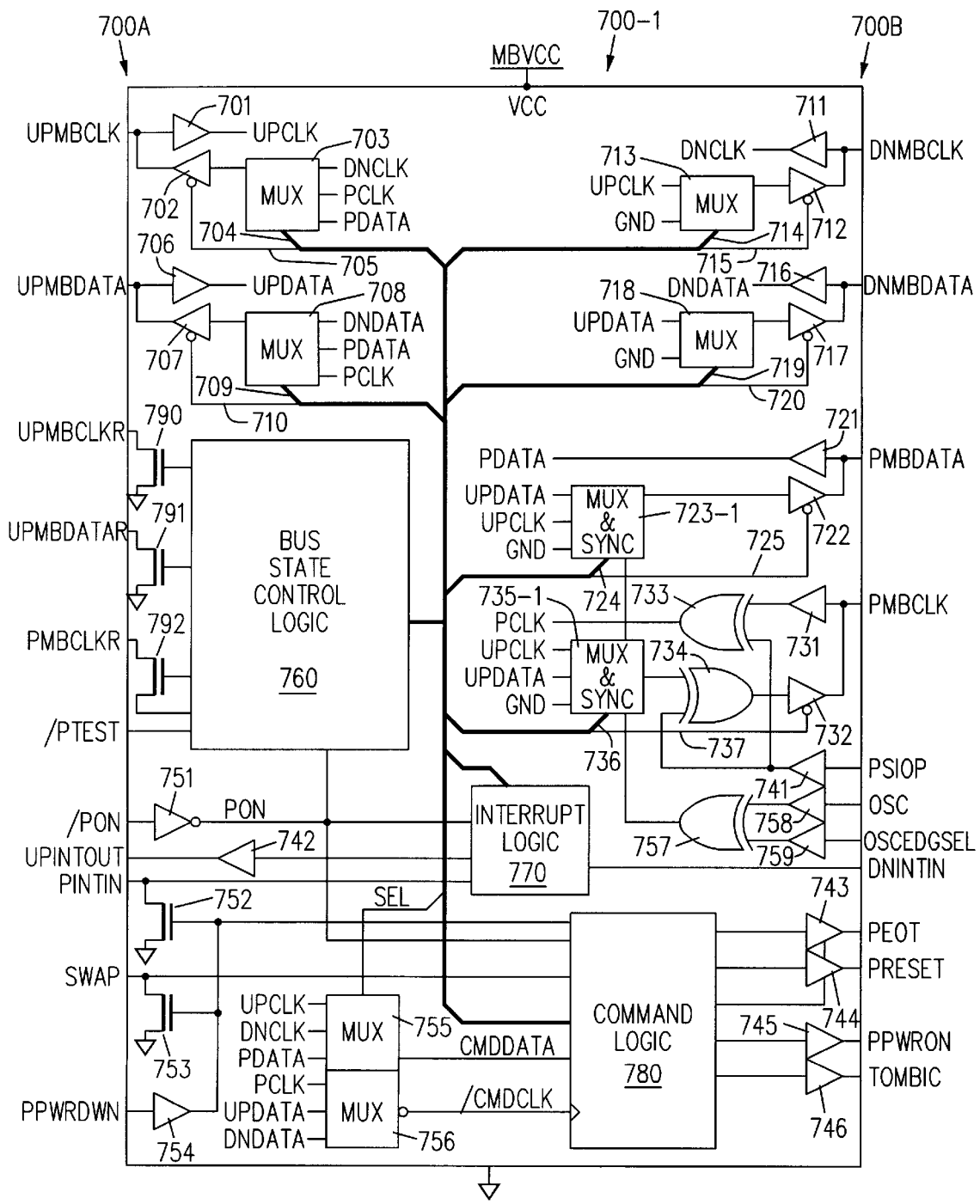

Another embodiment MBIC 700-1 of MEICs 415, 425, and 435 is presented in FIG. 7B. In MBICs 700 and 700-1, identical parts have the same reference numeral. Since MBIC 700-1 is similar to MBIC 700, herein only the features that are different in MBIC 700-1 from those described above for MBIC 700 are considered.

Multiplexers 723 and 735 of MBIC 700 have been replaced in MEIC 700-1 with multiplexer and synchronization circuits 723-1 and 735-1, respectively. Specifically, a synchronization circuit, that is described more completely below, is inserted in the output line of multiplexer 723 to obtain multiplexer and synchronization circuit 723-1 and in the output line of multiplexer 735 to obtain multiplexer and synchronization circuit 735-1. The output signal from exclusive OR gate 757 is provided to both of the synchronization circuits. A first input terminal of exclusive OR gate 757 is driven by the output signal of buffer 758, which in turn is driven by the signal on line OSC. A second input terminal of exclusive OR gate 757 is driven by the output signal of buffer 759, which in turn is driven by the signal on line OSCEDGSEL.

Signal OSCEDGSEL is used to select an edge of a signal on line OSC to which the signals on lines PMBCLK and PMBDATA to the microcontroller are synchronized. Thus, the signal on line OSC is a clock that is used to synchronize signals PMBCLK and PMBDATA to the signal on line OSC. The synchronization of these signals is important for some microcontrollers such as the microcontroller sold by Motorola Corp. of Phoenix, Ariz. 85036 under Model No. MC68HC05. After power up, a transition from a logic zero to a logic one on line OSC enables each of the synchronization circuits. Hence, connecting line OSC to ground disables the synchronization circuits and so signals PMBCLK and PMBDATA are not synchronized to signal OSC, i.e., the function of multiplexers 723 and 735 is reproduced in MBIC 700-1.

Terminal UPMBCLKR is connected to a drain of field effect FET 790. The source of FET 790 is grounded. Bus state control logic circuit 760 drives gate of FET 790. Control logic circuit 760 drives the gate of FET 790 in states Pre-Get and Pre-Pass-Up, that are described more completely below, and so forces the signal on terminal UPMBCLKR low. Terminal UPMBCLKR is connected to terminal UPMBCLK, external to MBIC 700-1, by a resistor, that in one embodiment is a 100 Kohm resistor.

Terminal UPMBDATAR is connected to a drain of field effect transistor (FET) 791. The source of FET 791 is grounded. Bus state control logic circuit 760 drives gate of FET 791. Control logic circuit 760 drives the gate of FET 791 in state Post-Get, that is described more completely below, and so forces the signal on terminal UPMBDATAR low. Terminal UPMBDATAR is connected to terminal UPMBDATA, external to MBIC 700-1, by a resistor, that in one embodiment is a 100 Kohm resistor.

Terminal PMBCLKR is connected to a drain of field effect FET 792. The source of FET 792 is grounded. Bus state control logic circuit 760 drives gate of FET 792. Control logic circuit 760 drives the gate of FET 792 in state Pre-get, that is described more completely below, and so forces the signal on terminal PMBCLKR low. Terminal PMBCLKR is connected to terminal PMBCLK, external to MBIC 700-1, by a resistor that in one embodiment is a 100 Kohm resistor. Terminals UPMBCLKR, UPMBDATAR, and PMBCLKR are used for noise suppression.

Terminal /TEST is the same as terminal /TRIBUFF. All other features of MBIC 700-1 are equivalent to those of MBIC 700.

OPERATION OF A MBIC

Figure 8:
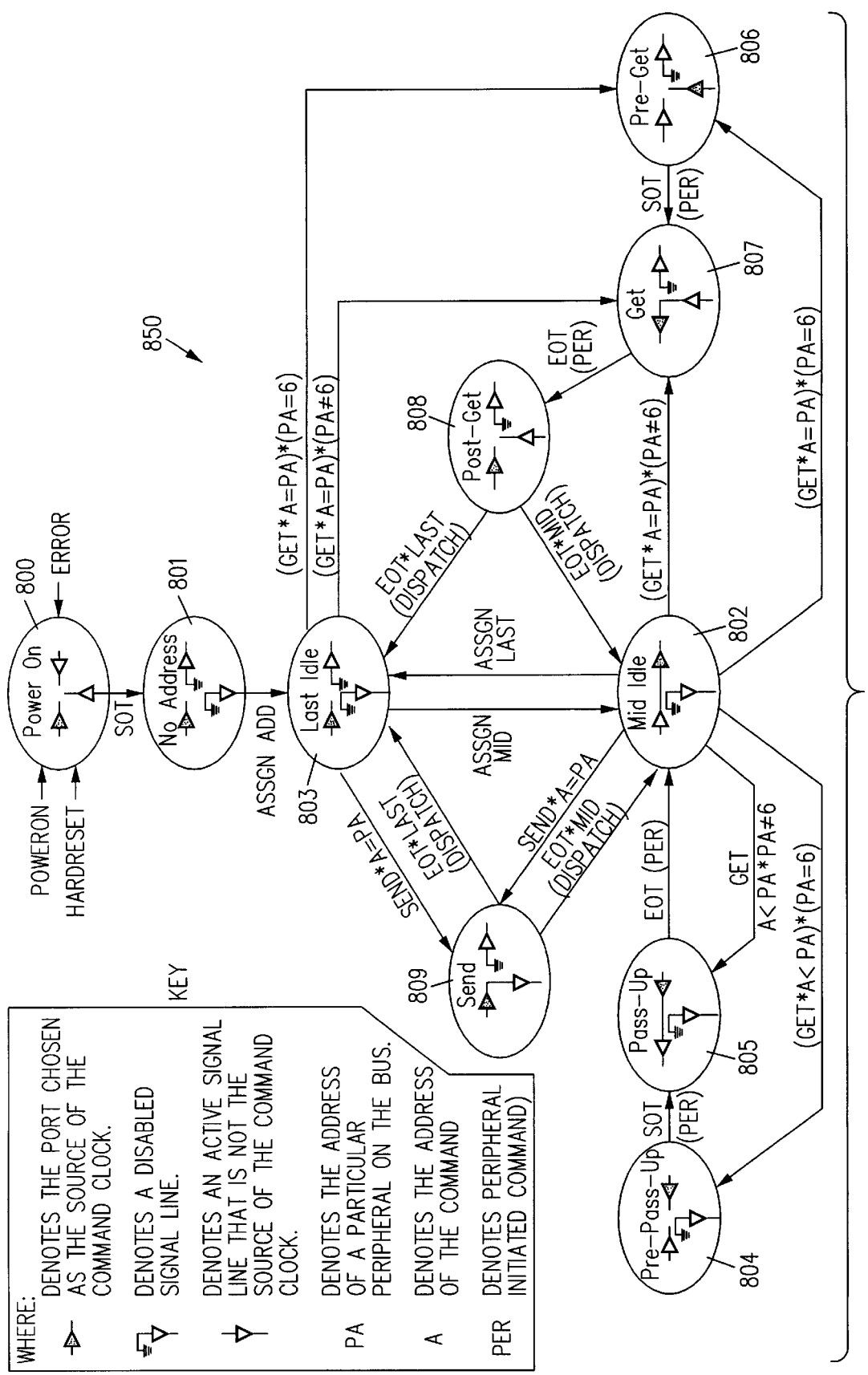
FIG. 8 is a state diagram for a state machine within the bus state control logic circuit shown in FIGS. 7A and 7B.

MBIC 700 and MBIC 700-1 each include a state machine, in bus state control logic circuit 760, which supports the IDCS bus protocol as shown in the state diagram 850 of FIG. 8. For each state, buffers on the left hand side are the upstream buffers, i.e., the upstream port, as shown in FIGS. 4, 7A and 7B; the buffers on the right hand side are the downstream buffers, i.e., the downstream port; and the buffers in the middle are the peripheral device buffers, i.e., the peripheral device port. The buffers indicate the direction of information flow and so designate which buffers in FIGS. 7A and 7B are active. Specifically, a shaded buffer in FIG. 8 denotes the port chosen as the source of the command clock signal. An unshaded buffer denotes an active signal line that is not the source of command clock. An unshaded buffer that is grounded denotes a disabled signal line. The reference numeral PA denotes the address of a particular MBIC on IDCS bus 150, while reference numeral A denotes the address in the command. Reference numeral PER denotes a peripheral device initiated command.

The state machine has a total of ten states, state #0 through state #9, which have reference numerals 800 to 809, respectively. Power-On state 800 (State #0) is entered in response (i) to a signal Power-On-Reset, e.g., the signal on terminal /PON is asserted, (ii) to command Set-Hardware-Reset, and (iii) to MBIC 700 detecting a Parity-Error. In power-on state 800, the signal driven on terminal UPINTOUT by interrupt logic 770 depends on the manner in which power-on state 800 was reached. In response to signal power-on-reset or command Set-Hardware-Reset, bus state control logic circuit 760 sends a signal to interrupt logic 770 that in turn forces terminal UPINTOUT to a logic zero level. Alternatively, if MBIC 700 detects a Parity-Error, bus state control logic circuit 760 sends a signal to interrupt logic 770 that in turn forces terminal UPINTOUT to a logic one level. Both peripheral and downstream interrupts are disabled in state power-on 800 by interrupt logic 770.

The transition from power-on state 800 to No-Address state 801 (State #1) occurs when bus dispatch 305 senses the interrupt signal from terminal UPINTOUT and issues a start of transmission command SOT to initiate assign address sequence 604. In no-address state 801, bus state control logic circuit 760 generates a signal to interrupt logic 770 that in turn forces the signal on terminal UPINTOUT to a logic one level. Bus state control logic circuit 760 also generates signals on lines 714, 719, 724, and 736 to multiplexers 713, 718, 723, and 735 so that the grounded line is connected to the corresponding three-state buffer 712, 717, 722, and 732 respectively.

After bus dispatch 305 issues command SOT, bus dispatch 305 issues command Assign-Address. In response to command Assign-Address, MBIC 700 clears the interrupt and takes on the address in the command. The state machine transitions from no-address state 801 to last-idle state 803 (State #3). In last-idle state 803, interrupts from downstream peripheral devices are enabled and inverted, but interrupts from the peripheral device on terminal PINTIN are enabled only after bus dispatch 305 issues a command Interrupt-Poll to the peripheral device containing MBIC 700 at the newly assigned address. MBIC 700 does not pass the second byte of any command to the peripheral device until the peripheral device has asserted an interrupt on terminal PINTIN and a command has been issued by bus dispatch 305. This protocol prevents an erroneous partial pass through of the command byte to the microcontroller. In state last-idle 803, the downstream buffers remain grounded, i.e., terminated, thereby ensuring proper termination of IDCS bus 150.

If another peripheral device is connected to IDCS bus 150 downstream from the peripheral device containing MBIC 700, bus dispatch 305, upon detecting the interrupt from the newly connected peripheral device, performs a process in which command Assign Mid-Peripheral is issued to MBIC 700. In response to command Assign Mid-Peripheral, MBIC 700 transitions from last-idle state 803 to mid-idle state 802. Bus state control logic circuit 760 changes the signals on lines 714 and 719, to multiplexers 713 and 718 so that the signals on lines UPCLK an UPDATA respectively are passed therethrough to three-state buffers 712 and 716 respectively. The newly connected peripheral device comes up in last-idle state 803, as described above. In one embodiment, when the newly connected peripheral device is removed from IDCS bus 150, bus dispatch 305 transmits command Assign-Last Peripheral to MBIC 700 and MBIC 700 transitions from mid-idle state 802 to last-idle state 803.

Prior to issuance of commands Send or Get by bus dispatch 305, IDCS bus 150 is in a quiescent state which means that each MBIC in IDCS bus 150 is either in last-idle state 803 or mid-idle state 802 (State #2). Notice that in state diagram 850, the direction of the information flow for all states except those associated with command Get is pointing downstream. There is only one state 809 (State #9) associated with command Send. This sole send state 809 contributes to the simplicity of the overall IDCS bus command structure, and is possible because with IDCS bus 150, directional turn-around of the buffers in MBIC 700 is not required since the buffers of all daisy-chained peripheral devices are already pointing in the correct (default downstream) direction for sending data downstream upon receiving command Send.

In contrast, the implementation of a command Get-xxx (Get) requires five related states, Pre-Pass-Up state 804, Pass-Up state 805, Pre-Get state 806, Get state 807, and Post-Get state 808, i.e., states #4, #5, #6, #7, and #8, respectively. The relative complexity associated with command Get arises from the need to turn the direction of IDCS bus 150 around (upstream) before a transfer of data from a peripheral device to bus dispatch 305 can take place. These command Get related states are described in greater detail below.

Prior to considering the operation of the state machine in response to command Send. The sequence of operations in executing command Send are described. Initially, bus dispatch 305 transmits command Send with the structure in FIG. 5C, as described above, that includes peripheral device address A. Next, bus dispatch 305 transmits the data. Finally, bus dispatch 305 transmits an end of transmission command EOT to indicate that all data has been sent.

Command logic circuit 780, as described more completely below, processes the information from bus dispatch 305 and determines both the command op code and peripheral device address A transmitted by bus dispatch 305. Command logic circuit 780 sends address A and peripheral address PA to bus state control logic circuit 760 along with the command op code. Bus state control logic circuit 760 compares address A and peripheral address PA to determine the relationship between the two addresses. Upon bus state control logic circuit 760 detecting command Send with address A equal to address PA, the state machine transitions from the idle state, either last-idle state 803 or mid-idle state 802 to send state 809. In send state 809, bus state control logic circuit 760 generates signals that in turn pass the signals on terminals UPMBCLK and UPMBDATA to terminals PMBCLK and PMBDATA respectively, i.e, appropriate control signals are generated to multiplexers 723 and 735 and to three-state buffers 722 and 732. The downstream data and clock lines are connected to ground, as described above for last-idle state 803.

The state machine remains in state send 809 until command logic circuit 780 detects end-of-transmission command EOT. Upon detection of command EOT, bus state control logic circuit 760 transitions back to the appropriate idle state, as determined by the position of MBIC 700 on IDCS bus 150.

The basic execution of command Get is similar to that for command Send when the reversal of data travel is considered. Initially, bus dispatch 305 transmits command Get with the structure described above that includes the peripheral device address A. The actions taken by MBIC 700 in response to command Get depends on whether address PA of MBIC 700 matches address A in the command.

If the addresses do not match and address A is less than address PA, MBIC 700 must configure itself to transmit data to bus dispatch 700. If address A is greater than address PA, MBIC 700 remains in the idle state. If address A equals address PA, the peripheral device containing MBIC 700 acknowledges command Get with command SOT. The peripheral device then transmits the data followed by a command EOT. Finally, bus dispatch 305 acknowledges with a command EOT.

Upon issuance of command Get by bus dispatch 305, if address A in the command is not for the peripheral device closest to bus dispatch, 305, i.e., the first peripheral device on IDCS bus 150, all MBICs upstream from the MBIC with address A, with the exception of the MBIC in the peripheral device closest to dispatch 305, i.e, the MBIC with address six, transition from mid-idle state 802 to pass-up state 805. Specifically, assuming MBIC 700 is in such a position, in response to signals from command logic circuit 780, bus state control logic circuit 760 determines that a command Get has been received and that address PA of MBIC 700 is greater than address A in command Get. In state pass up 805, three-state buffers 712 and 717 are tri-stated while buffers 702 and 707 are enabled and multiplexers 703 and 708 are provided control signals that pass the downstream signals therethrough. Control signals are applied to multiplexers 723 and 735 to select the grounded line.

The MBIC in the peripheral device closest to dispatch 305, i.e, the MBIC with address six, transitions from mid-idle state 802 to pre-pass-up state 804. Specifically, assuming MBIC 700 is in such a position, in response to signals from command logic circuit 780, bus state control logic circuit 760 determines that a command Get has been received and that address PA of MBIC 700 is greater than address A in command Get. In state pre-pass-up 804, three-state buffers 702, 707, 712, and 717 are tri-stated so that any contention with bus dispatch 305 is blocked. Control signals are applied to multiplexers 723 and 735 to select the grounded line and three-state buffers 722 and 732 are enabled.

In response to command Get, the MBIC with address PA equal to address A transitions from the appropriate idle state, i.e, either state mid-idle 802 or state last-idle 803 depending on the position of the MBIC, to state get 807. In state get 807 for MBIC 700, bus state control logic circuit 760 sends signals on lines 714 and 719 to multiplexers 713 and 718 respectively to select the grounded lines and enables three-state buffers 712 and 717. Bus state control logic circuit 760 also sends control signals to enable buffers 702 and 707, to select peripheral device signal PCLK from multiplexer 703 and peripheral device signal PDATA from multiplexer 708, and to open buffers 722 and 732. The microcontroller coupled to MBIC 700 generates a start of transmission signal SOT to indicate that data transmission is starting.

In response to the start of transmission command SOT by the peripheral device, the MBIC with an address of 6, i.e., the MBIC in the peripheral device closest to base station 100, transitions from pre-pass up state 804 to pass up state 805, that was described above. Thus, a complete data path is established from the addressed peripheral device to bus dispatch 305.

When the data transmission is complete, the addressed peripheral device generates an end of transmission command EOT to bus dispatch 305. In response to the end of transmission command EOT from the peripheral device, each of the upstream peripheral devices transitions from pass-up state 805 to mid-idle state 802, i.e, the data and clock line buffers and multiplexers directions are reversed so that the data and clock directions are pointing downstream from bus dispatch 305.

The MBIC in the addressed peripheral device transitions from get state 807 to post-get state 808 upon generation of the end of transmission command EOT by the peripheral device. In state post-get 808, the direction of upstream buffers 702 and 707 are open. Buffers 722 and 741 driving the peripheral data and clock terminals PMBDATA and PMBCLK are tri-stated so as to avoid a bus contention while the MBIC is still in a bus master mode. Downstream buffers 712 and 717 remain enabled and connected to ground. In response to end of transmission command EOT from the peripheral device, bus dispatch 305 acknowledges the end of transmission by echoing back an end of transmission command EOT. In response to end of transmission EOT, the MBIC in the addressed peripheral device for command Get transitions to the appropriate idle state, i.e., either last-idle state 803 or mid-idle state 802.

The above process for command Get is followed for all MBIC's except when the command is addressed to the MBIC in the peripheral device attached directly to bus dispatch 305. In this situation, in response to command Get, the MBIC with address 6 transitions from the appropriate idle, i.e., mid-idle state 802 or last-idle state 803 to pre-get state 806. In pre-get state 806, the upstream buffers i.e., buffers 702 and 707, are tri-stated so as to avoid a bus contention. The downstream buffers 712 and 717 are sent a signal to enable the buffers and a select signal is supplied to multiplexers 713 and 718 so that the grounded line is selected. Buffers 732 and 722 are tri-stated so that the clock and data lines connected to the peripheral device are set to receive the clock and data signals. When the peripheral device issues a start of transmission command SOT, command SOT is detected by command logic circuit 780 in MBIC 700 and in response thereto, bus state control logic circuit 760 transitions from pre-get state 806 to get state 807 that was previously described.

INTERRUPT LOGIC CIRCUIT

Interrupt logic 770 (FIGS. 7A and 7B) was described above in general terms with respect to the operation of the MBICs in FIG. 4 and also with more specificity in the description of state diagram 850 (FIG. 8). As explained previously, interrupt logic 770 generates hardware interrupts to bus dispatch 305 in three situations. The first is when a peripheral device is first attached to IDCS 150. The second is when MBIC 700 makes a transition from a Power-On state to a No-Address state as described above. The third is when MBIC 700 detects a Parity-Error. In addition, interrupt logic 770 passes upstream interrupts from downstream peripheral devices.

Interrupts from a downstream peripheral device, drive downstream-interrupt-in terminal DNINTIN which is processed by interrupt logic circuit 770. Interrupt logic circuit 770 also receives an interrupt signal from peripheral-interrupt-in terminal PINTIN that is driven by a bi-directional peripheral interrupt line. In this embodiment, during normal operation, an interrupt signal at bus dispatch 305 of base station 100 is active high.

Interrupt logic circuit 770 provides the following functions:

1) In state power-on, the signal on upstream-interrupt-out (UPINTOUT) terminal of MBIC 700 is negated, i.e., the signal on terminal UPINTOUT is set to a logic zero level, and peripheral device and downstream interrupts are masked;

2) In state No-Address, i.e., before bus dispatch 305 has assigned an address to MBIC 700, the signal on terminal UPINTOUT is set to a logic one level and downstream interrupts are enabled, but peripheral device interrupts remain masked;

3) If MBIC 700 has not been assigned Last-Peripheral status, the signal on terminal UPINTOUT is the logical OR function of any signal on terminal PINTIN and any signal on the downstream-interrupt-line terminal DNINTIN, i.e., signal UPINTOUT=(signal PINTIN) OR (signal DNINTIN); and 4) If MBIC 700 has been assigned Last-Peripheral status, any signal from terminal DNINTIN is inverted before being ORed with the signal on terminal PINTIN, i.e. signal UPINTOUT=(signal PINTIN) OR (signal /DNINTIN).

A fifth and final requirement for the interrupt protocol for this invention is when MBIC 700 is in state last-idle 803, the signal on terminal DNINTIN is pulled high. As explained more completely below, in one embodiment, this final requirement is accomplished with circuitry external to MBIC 700.

The initial default state generated by interrupt logic circuit 770 when MBIC is in state power-on, i.e., the first function above, assures that the signal on terminal DNINTIN of the peripheral device immediately upstream of the peripheral device containing MBIC 700 goes low when the peripheral device containing MBIC 700 is docked to that upstream peripheral device. The fourth function described above assures that the upstream peripheral device, which is the last peripheral device, inverts the signal received on terminal DNINTIN. Consequently, the first and fourth functions combined guarantee that the interrupt signal is generated on terminal UPINTOUT of the last peripheral device when a new peripheral device is docked onto IDCS bus 150.

Similarly, the third and fifth functions guarantee that when a peripheral device is disconnected from IDCS bus 150, terminal DNINTIN of the MBIC in the last peripheral device on IDCS bus 150 after the disconnect is pulled to IDCS bus voltage supply MBVCC. The result is the generation of an upstream interrupt toward dispatch 305 when a peripheral device is removed, since mid-peripheral devices do not invert any downstream interrupts. Hence, the resulting interrupt informs dispatch 305 of an impending new IDCS bus configuration.

Hence, when a peripheral device is first added to IDCS bus 150, the signal on terminal UPINTOUT of newly connected peripheral device is forced to a logic zero. This logic zero value drives terminal DNINTIN of the next upstream peripheral device. As explained above, the next upstream peripheral device inverts the signal on terminal DNINTIN so that an interrupt eventually arrives at bus dispatch 305. Bus dispatch 305 then issues a start of transmission SOT signal followed by command Interrupt-Poll, that was discussed above.

Command Interrupt-Poll enables bus dispatch 305 to determine which peripheral device is the source of the IDCS bus interrupt. When an interrupting peripheral device is interrupt polled, interrupt logic 770 enables internal peripheral interrupt terminal PINTIN (FIGS. 7A and 7B) and disables downstream interrupt terminal DNINTIN (FIGS. 7A and 72). Upstream from the polled interrupting peripheral device, MBICs disable peripheral interrupt terminal PINTIN and enable downstream interrupt terminal DNINTIN. MBICs downstream from the polled interrupting peripheral device enable both peripheral interrupt terminal PINTIN and downstream interrupt terminal DNINTIN.

The response to a command Error Poll by the MBICs on IDCS bus 150 is identical to that just described for command Interrupt-Poll except interrupt circuit 770 in the MBIC being polled disables both downstream and peripheral device interrupts.

Figure 9:
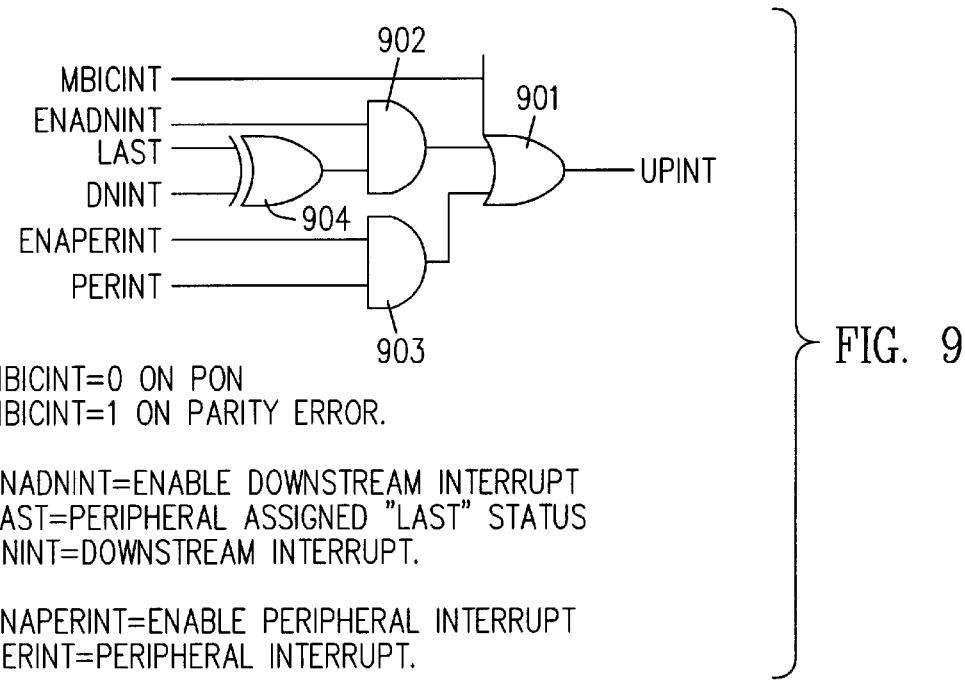
FIG. 9 is a block diagram of one embodiment of a part of the interrupt logic circuit shown in FIGS. 7A and 7B.

Circuit 900 (FIG. 9) within interrupt circuit 770 is used, in this embodiment, (i) to invert signals from terminal DNINTIN in the last peripheral device; (ii) to mask the peripheral device and downstream interrupts; (iii) to generate the low signal on terminal UPINTOUT; (iv) and to generate the parity error interrupt. MBIC interrupt line MBICINT is connected to a first input terminal of OR gate 901. When the signal on line PON to interrupt logic circuit 770 goes active, interrupt logic circuit 770 drives the signal on line MBICINT low. Interrupt logic circuit 770 in response to signals from bus state control logic circuit 760 also drives low signals on enable downstream interrupt line ENADNINT and enable peripheral device interrupt line ENPERINT to AND gate 902 and gate 903, respectively. Consequently, the output signal of AND gate 902 to a second input terminal of OR gate 901 and the output signal of AND gate 903 to a third input terminal of OR gate 901 are both low. Therefore, the output signal of OR gate 901 on line UPINT to buffer 742 is also low and so the signal on terminal UPINTOUT is low.

Exclusive OR gate 904 has a first input terminal connected to line LAST and a second input terminal connected to line DNINT that is driven by the signal on terminal DNINTIN. The signal on line LAST is low except when the peripheral device containing the MBIC is assigned last peripheral status, in which case the signal on line LAST is high. Thus, when signal LAST is low, the signal on line DNINT is passed through exclusive OR gate 904 to a second input terminal of AND gate 902. Conversely, when signal LAST is high, exclusive OR gate 904 inverts the signal on line DNINT. The signal on line ENADNINT to AND gate 902 is used to mask the signal from exclusive OR gate 904 when downstream interrupts are disabled.

Peripheral interrupt line PERINT from terminal PINTIN is connected to a second input terminal of AND gate 903. The signal on line ENPERINT to AND gate 903 is used to mask the signal on line PERINT when interrupts from the peripheral device are disabled. The signal on line MEICINT is driven high when the MBIC detects a parity error.

COMMAND LOGIC CIRCUIT

Figure 10:
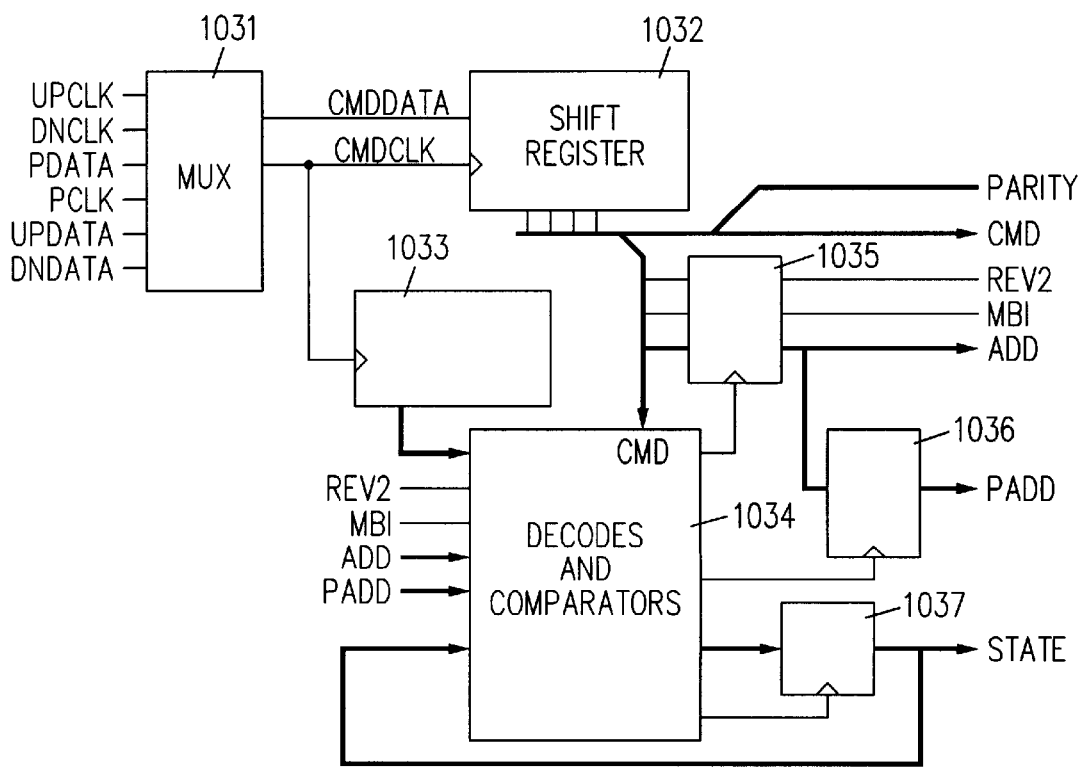
FIG. 10 is a block diagram of one embodiment of the special command logic circuit shown in FIGS. 7A and 7B.

FIG. 10 is a more detailed logic block diagram of one embodiment of the command logic circuit 780 and control logic circuit 760 (FIGS. 7A and 7B). In FIG. 10, multiplexers 755 and 756 (FIGS. 7A and 7B) are combined and shown as multiplexer 1031. Clock signal CMDCLK from multiplexer 1031 to the clock terminal of shift register 1032 is one of input signals UPDATA, DNDATA, and PDATA to multiplexer 1031. Clock signal CMDCLK also drives a four-bit message bit counter 1033 that counts the sixteen clock pulses associated with a command. The output signal from message bit counter 1033 is provided to decode and comparator circuit 1034. Decode and comparator circuit 1034 and register 1037 implement state diagram 850.

Shift register 1032 loads bits REV2, MBI and A0 to A2 in the command into a REV2/MBI/ADD latch 1035. Signals from decode and comparator circuit 1034 enable the clock to latch 1035. The circuitry in MBIC 700 is synchronous and so clock enable signals are used to clock a component at the appropriate time. When message bit counter 1033 detects the end of the second byte of the command, shift register 1032 is frozen holding the command code and a parity bit PAR.

The five command bits are passed from shift register 1032 to decode and comparator circuit 1034. When decode and comparator circuit 1034 detects an assign-address command, a clock enable signal is provided to peripheral device address latch 1036 so that address signal ADD from latch 1035 in turn is clocked into peripheral device address latch 1036. Address signal ADD and peripheral address signal PADD are both provided to decode and comparator circuit 1034 so that circuit 1034 can determine when the address in a command is directed to the MBIC as well as when the address in the command is less than or greater than the address of the MBIC. Similarly, signals REV2 and MBI from latch 1035 are provided to decode and comparator circuit 1034 so that circuit 1034 can determine when to pass the second byte of a command to the micro-controller. Decode and comparator circuit 1034 generates the state of the MBIC, e.g., mid-peripheral idle or last-peripheral idle. The present state of the MBIC is loaded in state register 1037. The next state of the MBIC is on the input line to state register 1037.

Figure 11A:
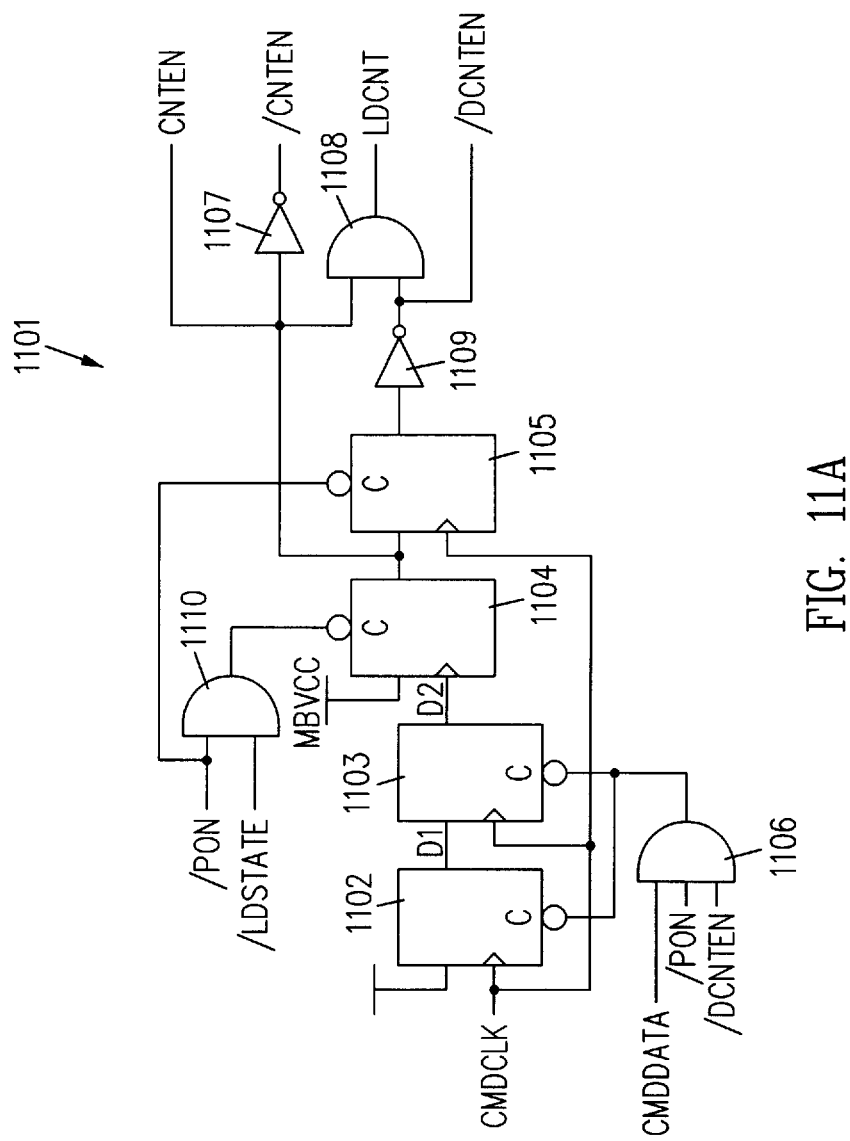
FIG. 11A is a logic circuit diagram of control circuitry for the counter of FIG. 10.
Figure 11B:
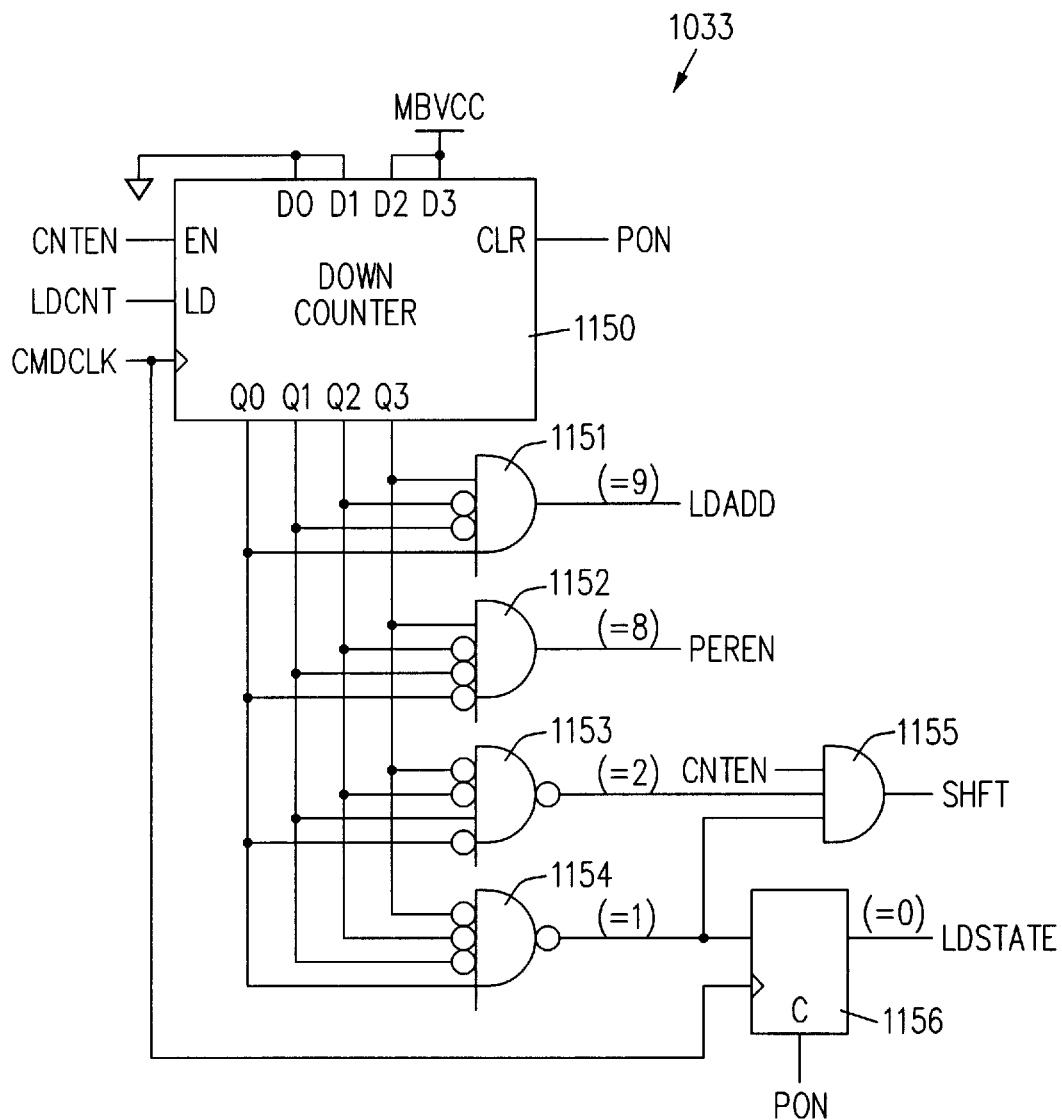
FIG. 11B is a diagram of the counter of FIG. 10 and related circuitry used to generate control signals.
Figure 12:
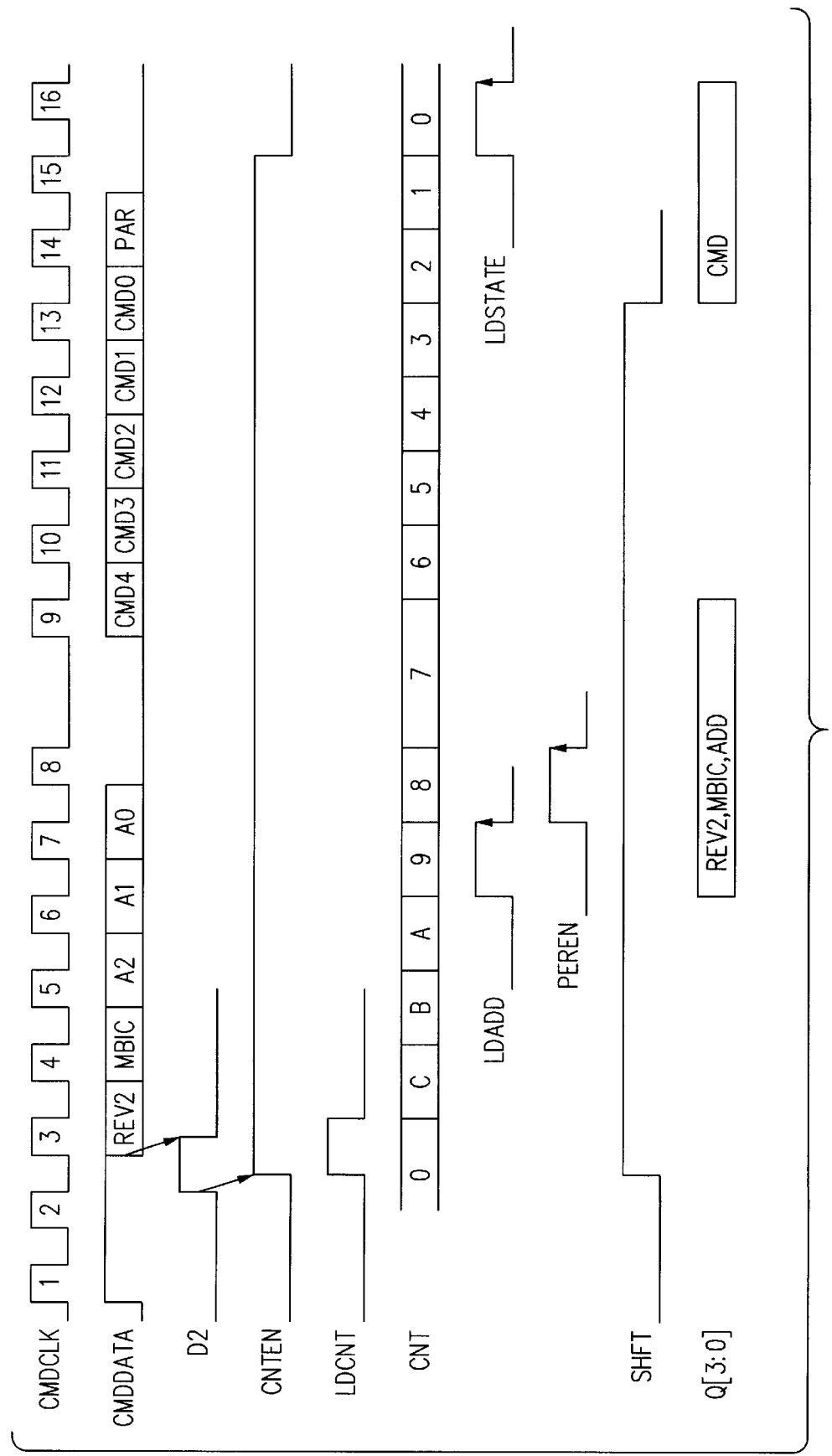
FIG. 12 is a timing diagram that illustrates the operation of the circuitry in FIGS. 10, 11A and 11B.

FIG. 11A illustrates one embodiment of a command detector 1101 within decode and comparator circuit 1034. FIG. 11B illustrates one embodiment of message bit counter 1033. Command detector 1101 detects the swapping of the clock and data signals used to transmit commands, as discussed above. FIG. 12 is a timing diagram for command transmission that includes the waveforms for the internal nodes of command detector 1101 and message bit counter 1033.

Signal CMDCLK from multiplexer 756 is driven by the signal on line UPDATA during transmission of a command while signal CMDDATA from multiplexer 755 is driven by the signal on line UPCLK. Detector 1101 operates on the principle that during normal data flow there will not be any data transitions without an equivalent clock transition, i.e., the clock transition generates the data.

In particular, in detector 1101, signal CMDCLK drives the clock terminals of negative-edge triggered, i.e., falling-edge triggered, flip-flops 1102 and 1103. The input terminal of flip-flop 1102 is connected to IDCS bus power supply voltage MBVCC and the output terminal is connected to the input terminal of flip-flop 1103. The output terminal of flip-flop 1103 drives the clock terminal of positive-edge triggered flip-flop 1104 that has its input terminal connected to IDCS bus power supply voltage MBVCC. The invertors on the clear terminals of flip-flops 1102 and 1103 are driven by the output signal of AND gate 1106. AND gate 1106 is driven by the complement of power-on signal PON, signal CMDDATA, and the complement of down count enable signal DCNTEN. During data transmission, the complement of power-on signal PON and the complement of down count enable signal DCNTEN are normally high. Consequently, the output signal of AND gate 1106 is determined by the level of signal CMDDATA.

Thus, in a normal data transmission, the clock signal on line CMDDATA clears flip-flops 1102 and 1103 so that any data signal on line CMDCLK can not clock the logic one value through flip-flop 1103. However, when the command is transmitted, as shown in FIG. 12, the signal on line CMDDATA is held high for two clock periods. Consequently, the first falling edge on line CMDCLK clocks a logic one through flip-flop 1102 to flip-flop 1103. The next falling edge on line CMDCLK clocks a logic one on line D2 as shown in FIG. 12. Thus, flip-flops 1102 and 1103 are configured to detect two consecutive falling edges on line CMDCLK without any low going pulses on line CMDDATA. Hence, to ensure proper command detection, the first two bits of every command are always set to a logic one. The rising edge on line D2 clocks flip-flop 1104 so that a logic one is driven onto the output terminal of flip-flop 1104. The signal on the output terminal of flip-flop 1104 drives the input terminal of flip-flop 1105, counter enable line CNTEN, an input terminal of AND gate 1108 and invertor 1107 that in turn drives counter enable complement line /CNTEN. The second input terminal of AND gate 1108 is driven by the output signal of invertor 1109. The input terminal of invertor 1109 is driven by the output terminal of flip-flop 1105. The invertor on the clear terminal of flip-flop 1105 is driven by the complement of the signal on power-on line PON. The complement of the signal on power-on line PON also drives a first input terminal of AND gate 1110 and a second input terminal of AND gate 1110 is driven by the complement of load state signal on line LDSTATE. A signal on the output terminal of AND gate 1110 drives an inventor on the clear terminal of flip-flop 1104.

Hence, each time the signal goes active on load state line LDSTATE, the resulting low signal from AND gate 1110 clears flip-flop 1104. The clock terminal of flip-flop 1105 is driven by the signal on line CMDCLK. Thus, a logic zero value is clocked through flip-flop 1105 by each falling edge on line CMDCLK after flip-flop 1104 is cleared. Consequently, when the logic one signal on line D2 is applied to line CNTEN and the first input terminal of AND gate 1108, the signal on the second input terminal of AND gate 1108 is also high so that AND gate 1108 drives the signal high on load count line LDCNT, as shown in FIG. 12. The active signals on lines CNTEN and LDCNT drive enable terminal EN and load terminal LD, respectively of four bit down counter 1150 (FIG. 11B).

The active signal on line CNTEN also drives an input terminal of AND gate 1155. A second input terminal of AND gate 1155 is driven by the output signal of NAND gate 1153 and a third input terminal of AND gate 1155 is driven by the output signal of NAND gate 1154. As shown in FIG. 12, when the signal on count enable line CNTEN is inactive, the output signal of counter 1150 on terminals Q[3:0] is zero and so the output signals of NAND gates 1153 and 1154 are both high. Consequently, the active signal on line CNTEN drives the output signal of AND gate 1155 on shift line SHFT active. The active signal on shift line SHFT enables shift register 1032 (FIG. 10).

The third falling edge on line CMDCLK clocks a logic one value into flip-flop 1105 and so invertor 1109 drives the output signal on load count line LDCNT low. The resulting pulse on load count line LDCNT, in this embodiment, loads a value of 0Ch in four-bit down counter 1150 because least significant bit terminals D0 and D1 are grounded and most significant bits D2 and D3 are tied to IDCS bus power supply voltage MBVCC. The value of counter 1150 is shown on line CNT in FIG. 12.

After counter 1150 is loaded, each subsequent falling edge on line CMDCLK decrements counter 1150. A load peripheral device address signal LDADD is issued to latch 1035 when counter 1150 reaches a value of nine. Signal LDADD enables the clock to latch 1035 so that latch 1035 is loaded with the contents of five-bit command shift register 1032.

When counter 1150 reaches a value of eight the signal on line PEREN is driven active, and the decode and comparator circuit 1034 compares the address stored in latch 1035 with the address stored in latch 1036 to determine whether the command is directed to the peripheral device containing this MBIC. When counter 1150 reaches a value of seven, the signal on peripheral enable line PEREN is driven inactive, and the microcontroller is informed whether the command is intended for this peripheral device. If the address matches and bit MBI is not set, the second byte of the command is passed through to the microcontroller.

When counter 1150 reaches a value of two, the signal on line SHFT to shift register 1032 is driven low so that the op code for the command is captured in shift register 1032. When counter 1150 has a value of zero, the signal on load state line LDSTATE is driven active. Consequently, the output signal from AND gate 1110 goes low and flip-flop 1104 is cleared and the signal on counter enable line CNTEN goes low.

SYNCHRONIZATION CIRCUIT

Figure 13:
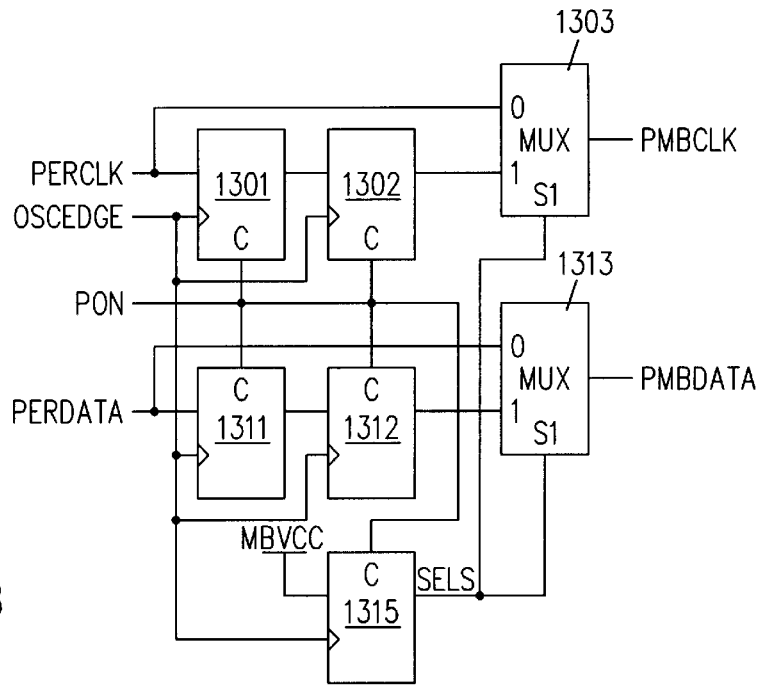
FIG. 13 is a schematic diagram of the synchronization circuit of this invention.

FIG. 13 is a more detailed schematic diagram of the synchronization circuits inserted in the output line of multiplexer 723 (FIG. 7A) to obtain multiplexer and synchronization circuit 723-1 (FIG. 7B) and in the output line of multiplexer 735 (FIG. 7A) to obtain multiplexer and synchronization circuit 735-1 (FIG. 7B). Line PERCLK is the output line from multiplexer 735 and line PERDATA is the output line from multiplexer 723. Flip-flops 1301 and 1302 and multiplexer 1303 are in multiplexer and synchronization circuit 735-1. Flip-flops 1311 and 1312 and multiplexer 1313 are in multiplexer and synchronization circuit 723-1. Flip-flop 1315 is shared by multiplexer and synchronization circuits 723-1 and 735-1.

The signal on line PERCLK drives the input terminal of flip-flop 1301 and a first input terminal of multiplexer 1303. The signal on the input terminal of flip-flop 1301 is clocked through flip-flop 1301 to an input terminal of flip-flop 1302 by a rising edge on line OSCEDGE that is driven by the output signal of exclusive OR gate 757, (FIG. 7B) that was described above. The signal on the input terminal of flip-flop 1302 is clocked through flip-flop 1302 to a second input terminal of multiplexer 1303 by a second rising edge on line OSCEDGE.

Similarly, the signal on line PERDATA drives the input terminal of flip-flop 1311 and a first input terminal of multiplexer 1313. The signal on the input terminal of flip-flop 1311 is clocked through flip-flop 1311 to an input terminal of flip-flop 1312 by a rising edge on line OSCEDGE that is driven by the output signal of exclusive OR gate 757, that was described above. The signal on the input terminal of flip-flop 1312 is clocked through flip-flop 1312 to a second input terminal of multiplexer 1313 by a second rising edge on line OSCEDGE.

The signal passed through multiplexer 1303 to line PMB-CLK and the signal passed through multiplexer 1313 to line PMBDATA is determined by signal level on line SELS from flip-flop 1315. Initially, when the signal on power-on line PON is driven active, flip-flops 1301, 1302, 1311, 1312 and 1315 are cleared. Hence, the signal level on line SEL is low so that multiplexers 1303 and 1313 pass the unsynchronized signals on lines PERCLK and PERDATA, respectively therethrough.

The input terminal of flip-flop 1315 is connected to IDCS bus power supply voltage MBVCC and the clock terminal receives the signal on line OSCEDGE. Consequently, the first rising edge on line OSCEDGE clocks a logic one through flip-flop 1315 and thereafter, the synchronized signal is passed through multiplexers 1303 and 1313. Grounding terminal OSC of MBIC 700-1 (FIG. 7B) forces the synchronization logic of FIG. 13 to always select the unsynchronized signals.

The two flip-flop shift registers 1301, 1302 and 1311, 1312 perform the signal synchronization. First flip-flop 1301, 1311 performs the actual synchronization function, while second flip-flop 1302, 1312 removes any metastability introduced by first flip-flop 1301, 1311. The signal on line OSCEDGE must have a frequency which is at least four times the frequency expected for signal on either line PMBCLK or line PMBDATA. The frequency of the signal on line OSCEDGE must be low enough to guarantee that second flip-flop 1302, 1312 is able to resolve any metastabilities generated by first flip-flop 1301, 1311.

As explained above, the signal on line OSCEDGE that is driven by the output signal of exclusive OR gate 757 in response to signals on terminals OSCEDGSEL and OSC. Thus, grounding terminal OSCEDGSEL causes synchronization to occur at the positive edge of a signal on terminal OSC. Conversely if terminal OSCEDGSEL is hardwired to a logic one, synchronization occurs at the negative edge of a signal on terminal OSC.

As explained above, the IDCS bus power protocol of this invention includes three different features, i.e, (1) MBIC 700 is powered by bus dispatch 305, (2) a new peripheral device is plugged into MBIC 700 while power is supplied to MBIC 700 by base station 100, and (3) bus dispatch 305 may power-up or power-down the peripheral device containing MBIC 700. Preferably, the first two IDCS bus power protocol features are always supported while support of the third feature is optional. Each of these power protocols are considered in more detail below in the considerations of implementation of MBIC 700 and MBIC 700-1 in a peripheral device. When only a single reference number for an MBIC is used, in view of the similarities of MBIC 700 and MBIC 700-1, those skilled in the art will appreciate that the description is applicable to both embodiments.

IMPLEMENTATION OF A MBIC IN A PERIPHERAL DEVICE

FIG. 14 illustrates one configuration of MBIC 700-1 (FIG. 7B) in a peripheral device that supports each of the IDCS bus power protocols. As shown in FIG. 14, line 1406 connects pins 1407 and 1408 in the connectors used to interconnect peripheral devices on IDCS bus 150. MBIC 700-1 is powered by IDCS bus power supply voltage MBVCC from line 1406, while microcontroller 416 is powered from by peripheral device power supply voltage CPUVCC. Peripheral device power supply voltage CPUVCC is preferably supplied from a separate power source, such as a battery or an external transformer. Depending on their function, some types of peripheral devices maintain power supply voltage CPUVCC asserted, while other peripheral devices switch power supply voltage CPUVCC off when IDCS bus power supply voltage MBVCC is powered-down.

A resistor 1401 is connected between line 1406 carrying IDCS bus power supply voltage MBVCC and input terminal VCC of MBIC 700-1. Thus, when either the peripheral device containing MBIC 700-1 is hot-plugged to IDCS bus 150, or IDCS bus power supply voltage MBVCC is turned on by bus dispatch 305, resistor 1401, which, in one embodiment, has a resistance of fifteen ohms, prevents current surges into MBIC 700-1 and the peripheral device. Further, resistor 1401 limits the current that can be drawn by MBIC 700-1 and the peripheral device so that the power supply in base station 100 can respond to the current requirements without causing an excessive voltage sag on line MBVCC, e.g., the voltage on line MBVCC stays with ±10% of its nominal value.

Thus, resistor 1401, in this embodiment, permits hot-plugging of a peripheral device containing MBIC 700-1. However, use of a resistor is illustrative only and is not intended to limit the invention to this particular embodiment. In view of this disclosure, those skilled in the art can utilize a variety of techniques to limit the current requirements on power-up of a MBIC.

A variety of features are used to support power-down of IDCS bus supply voltage MBVCC by bus dispatch 305. In this embodiment, all signals from microcontroller 1410 to MBIC 700-1 are routed through buffers that are powered by IDCS bus power supply voltage MBVCC, and that do not have diodes connected to the power supply voltage. For example, signals OSC, SWAP and PINTIN from microcontroller 1410 to MBIC 700-1 are buffered by AND gates 1402, 1403, and 1404, which do not have diodes coupled to the IDCS bus power supply voltage MBVCC. In one embodiment, AND gates 1402 to 1404 are in an integrated circuit that is commonly sold as part number 74VHC08. The important aspect is to isolate the CMOS circuitry of MBIC 700-1 using appropriate buffers so that if a peripheral device asserts a signal to MBIC 700-1 while IDCS bus power supply voltage MBVCC is powered-down, latch-up does not occur when IDCS bus power supply voltage MBVCC is powered-up.

POWER-DOWN PROTOCOL

In a normal power-down of IDCS bus power supply voltage MBVCC, bus dispatch 305 informs all peripheral devices on IDCS bus 150 of the intention to power-down IDCS bus power supply voltage MBVCC via command Power-Warning. See Table IV above. If microcontroller 1410 detects that IDCS bus power supply voltage MBVCC is off, microcontroller 1410 configures its I/O pins to conserve power.

If IDCS bus power supply voltage MBVCC shut-down occurred only in an orderly fashion in response to a command from bus dispatch 305, buffering between microcontroller 1410 and MBIC 700-1 would not be required. However, power to MBIC 700-1 can also be lost by removal of the peripheral device from IDCS bus 150 while IDCS bus power supply voltage MBVCC is on. When the peripheral device is removed from IDCS bus 150 in such a manner, there is no time for an orderly shut-down of MBIC 700-1, and therefore buffering is essential.

As explained above, buffers 1402 to 1404 do not have diodes coupled to IDCS bus power supply voltage MBVCC and hence do not cause latch-up if an input signal is left at a logic one when IDCS bus power supply voltage MBVCC is re-powered. Bi-directional buffer 1405, which, in this embodiment, is an integrated circuit sold as part number 74VLT255, also does not have any diodes coupled to IDCS bus power supply voltage MBVCC.

The final power protocol that must be considered is the powering-down of the peripheral device containing microcontroller 1410 and MBIC 700-1 by turning off power supply voltage CPUVCC while MBIC 700-1 is powered. To configure MBIC 700-1 properly, the signal on line PPWRDWN to MBIC 700-1 must be driven active before powering down microcontroller 1410. When signal PPWRDWN is asserted, MBIC 700-1 either tri-states or drives to logic zero lines between MBIC 700-1 and microcontroller 1410. An example of a power down is when a user inadvertently disconnects the power source of the peripheral device. Specifically, in one embodiment, to prevent latch-up, MBIC 700-1, upon detecting the assertion of the signal PPWRDWN, forces all output terminals connected to microcontroller 1410 to a logic zero. Moreover, to minimize power losses due to floating inputs, MBIC 700-1 forces all input terminals from microcontroller 1410 to a logic zero.

PERIPHERAL DEVICE POWER UP

MBIC 700-1 also offers a means of powering up peripheral device power supply voltage CPUVCC by furnishing a signal on output line PPWRON. Bus dispatch 305 issues commands Set Peripheral Power-on and Clear Peripheral Power-on, respectively, to MBIC 700-1 to assert and deassert a signal on line PPWRON. If signal PPWRON is asserted, power typically is supplied to microcontroller 1410 only when IDCS bus power supply voltage MBVCC is powered on. If microcontroller 1410 needs to be powered when IDCS bus power supply voltage MBVCC is not powered on, additional circuitry is provided to allow peripheral device power supply voltage CPUVCC to be turned on while IDCS bus power supply voltage MBVCC is off. In such a case, peripheral power supply voltage CPUVCC may still be powered off by using signal PPWRON.

In the embodiment illustrated in FIG. 14, signal PPWRON provides a control signal for generating peripheral power supply voltage CPUVCC from standby voltage source VSTANDBY. Standby voltage source VSTANDBY is a continuous power source such as batteries. When bus dispatch sends command Set Peripheral Power-on to MBIC 700-1, MBIC 700-1 drives the signal on line PPWRON active. The signal on line PPWRON is a first input signal to NAND gate 1435, i.e., to the gate of N-channel MOSFET 1436 that has a drain connected to IDCS bus power supply voltage MBVCC through resistor 1438 and to power down terminal PPWRDWN of MBIC 700-1, and a source connected to a drain of N-channel MOSFET 1437. The signal on line PPWRON is also an input signal to peripheral power supply control circuit 1430, i.e, the signal drives the gate of N channel MOSFET 1431.

The drain of MOSFET 1431 is connected through resistor 1433 to voltage source VSTANDBY and to the input of invertor 1432, i.e., to the gates of P-channel power MOSFET 1432A and of N-channel MOSFET 1432B. The source of MOSFET 1431 is grounded. Hence, when signal PPWRON is active, MOSFET 1431 conducts and so a logic zero value is input to invertor 1432. Consequently, the output of invertor 1432 on line CPUVCC is a logic one. Thus, N-channel MOSFET 1431 is one embodiment of a switch for turning the peripheral device on and off. The drain is a first terminal of the switch and the source is a second terminal that is connected to a reference voltage. The gate is the switch selector.

The signal on line CPUVCC drives the gate of MOSFET 1437 so that when signals on lines CPUVCC and PPWRON are both high, the signal on terminal PPWRDWN of MBIC 700-1 is low. Conversely, when the signal on line PPWRON is low, the signal on terminal PPWRDWN is high and the signal on line CPUVCC is clamped to ground by circuit 1430.

BUS WAKE-UP PROTOCOL

IDCS bus 150 is asleep whenever IDCS bus power supply voltage MBVCC is powered down by bus dispatch 305. To conserve power, bus dispatch 305 turns off IDCS bus power supply voltage MBVCC to all the MBICs connected to IDCS bus 150. However, before dispatch 305 shut downs IDCS bus power supply voltage MBVCC, bus dispatch 305 broadcasts command Power-Down as described above. When IDCS bus power supply voltage MBVCC is on, IDCS bus 150 supplies +3.3 volts on line MBVCC. Conversely, when IDCS bus power supply voltage MBVCC is off, the voltage level on line MBVCC is clamped to ground, i.e., no current should flow onto line MBVCC from any peripheral device.

Docking of a peripheral device to a sleeping IDCS bus 150 may go unnoticed, unless the peripheral device is able to generate a Wake-Up interrupt. Further, each peripheral device upstream of the newly docked peripheral device must be capable of passing upstream the wake-up interrupt from the newly docked peripheral device. Alternatively, a peripheral device on IDCS bus 150 can generate a wake-up interrupt to request that bus dispatch 305 re-energize IDCS bus power supply line MBVCC.

Figure 15:
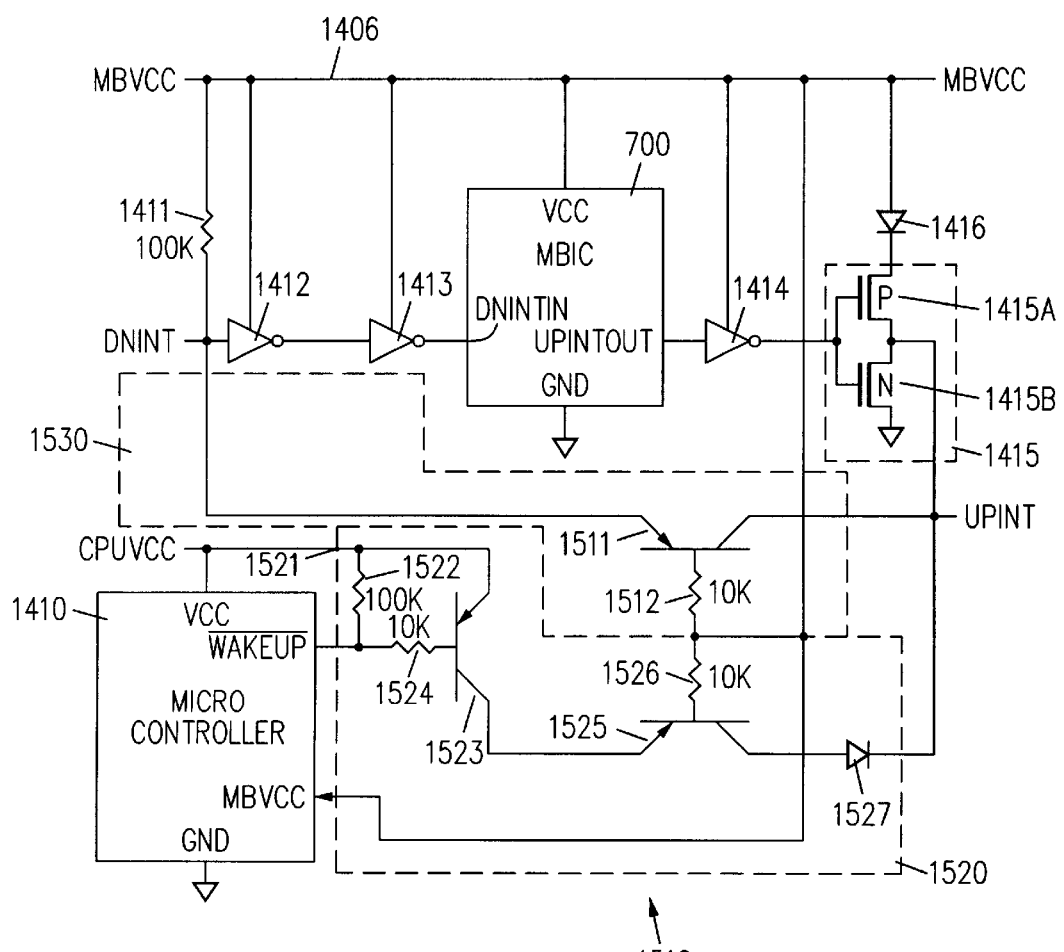
FIG. 15 is one embodiment of a wake-up circuit as well as latch-up protection and interrupt propagation circuitry according to the principles of this invention.

The generation of the wake-up interrupt in the absence of IDCS bus power supply voltage MBVCC necessitates a separate power source in the newly docked peripheral device or in the peripheral device asserting the wake-up interrupt. FIG. 15 shows one embodiment of circuitry for generating and propagating wake-up interrupts. The wake-up interrupt is generated by forcing signal on terminal UPINT to a logic one, e.g., +3 volts in this embodiment. All upstream peripheral devices propagate upstream the wake-up interrupt. Bus dispatch 305 upon sensing the interrupt powers up IDCS bus power supply voltage MBVCC using the process described more completely below. When the peripheral device, which issued the wake-up interrupt senses the IDCS bus power supply voltage MBVCC is asserted, the wake-up interrupt signal is immediately released.

A first embodiment of MBIC 700 interrupt support circuit 1510 can drive an interrupt signal on output terminal UPINT active based on an interrupt signal from one of three sources, an interrupt signal on input terminal DNINT, an interrupt signal on output terminal UPINTOUT of MBIC 700, or an interrupt signal from wake-up terminal /WAKEUP of microcontroller 1410.

The signal on output terminal UPINTOUT of MBIC 700 drives an input terminal of invertor 1414 which is powered by IDCS bus power supply voltage MBVCC. In one embodiment, invertor 1414 is an invertor that does not have a diode connected to the power supply terminal, such as Part No. 74VHC04 sold by Toshiba. The output signal of invertor 1414 drives the input terminal of a discrete invertor 1415.

In one embodiment, discrete invertor 1415 is formed from a P-channel MOSFET 1415A, such as that sold by Siliconix under Part No. TP0202, and an N-channel MOSFET 1415B, such as that sold by Siliconix under Part No. TN0201. The power terminal of MOSFET 1415A is connected to IDCS bus power supply voltage MBVCC through a Schottky diode 1416 such as that sold by Philips under Part No. BAS85.

Invertor 1415 protects MBIC 700 from latch-up when a wake-up interrupt signal is asserted on output terminal UPINT. Schottky diode 1416, that is connected in series with the power terminal of invertor 1415, prevents output terminal UPINT from being clamped to ground through the inherent diode in MOSFET 1415A to line MBVCC from the output terminal of invertor 1415.

A wake-up interrupt generation circuit 1520 generates a wake-up interrupt on terminal UPINT when microcontroller 1410 wants IDCS bus power supply voltage MBVCC asserted. As explained more completely below, circuit 1520 includes a driver for driving the wake-up interrupt onto IDCS bus 150 and a gate to prevent spurious generation of wake-up interrupts by a malfunctioning microcontroller.

In this embodiment, circuit 1520 has a power supply terminal 1521 that is connected to peripheral device power supply voltage CPUVCC. Power supply terminal 1521 supplies a voltage to the emitter of a PNP transistor 1523. The base of PNP transistor 1523 is connected to terminal /WAKEUP of micro-controller 1410 through a resistor 1524, which in one embodiment is a 10 Kohm resistor. Terminal /WAKEUP is an I/O port of microcontroller 1410. The signal level on terminal 1521 is also connected to terminal /WAKEUP through resistor 1522, which in this embodiment is a 100 Kohm resistor. The voltage level provided through resistor 1522 to terminal /WAKEUP prevents the input signal to circuit 1520 from floating when microcontroller 1410 first powers up because all I/O ports are by default input ports when first powered up. The collector of transistor 1523 is connected to the emitter of a PNP transistor 1525. The base of transistor 1525 is connected to IDCS bus power supply voltage MBVCC through resistor 1526, which in this embodiment is a 10 Kohm resistor. A collector of transistor 1525 is connected through Schottky diode 1527 to output terminal UPINT. In this embodiment, transistors 1523 and 1525 and resistors 1524 and 1526 are contained in a dual PNP 10 Kohm base resistor package sold by Panasonic as Part No. XN4115.

When microcontroller 1410 determines that IDCS bus power supply voltage MBVCC is off by sensing the signal level on the I/O port to which voltage MBVCC is supplied and microcontroller 1410 needs to communicate with bus dispatch 305, microcontroller drives the signal on terminal /WAKEUP low. In response to this signal, transistor 1523 provides the required current to generate a wake-up interrupt. Transistor 1525, which is gated by the voltage level on line MBVCC in a manner identical to that described below for transistor 1511, prevents microcontroller 1410 from generating a wake-up interrupt when IDCS bus power supply voltage MBVCC is on. That is, the wake-up interrupt from microcontroller 1410 is a first input signal to the gate and the signal on IDCS bus power supply line MBVCC is a second input signal to the gate. The gate passes the wake-up interrupt, i.e., the first input signal, to the output line of the gate that is connected to terminal UPINT only when the second input signal is inactive. Since the voltage on IDCS bus power supply line MBVCC is off, i.e., inactive, transistor 1511 passes the wake-up interrupt upstream to upstream interrupt terminal UPINT. Conversely, when IDCS bus power supply voltage MBVCC is on, i.e., active, the gate blocks transmission of the wake-up interrupt to upstream interrupt terminal UPINT.

Schottky diode 1527, which in this embodiment is a diode that is sold by Phillips under Part No. BAS85, prevents current drain when a downstream peripheral device issues a wake-up interrupt, i.e, drives terminal DNINT to a logic one. Without diode 1527, both transistors 1523 and 1525 would operate in their reverse mode when the signal level on terminal UPINT is forced to a logic one with power supply voltages CPUVCC and MBVCC both off, which in turn would result in current flowing onto line CPUVCC.

When a downstream peripheral device generates a wake-up interrupt, the signal on terminal DNINT is forced to a logic one. Invertors 1412, 1413 protect MBIC 700 from latch-up caused by the wake-up interrupt on terminal DNINT from a downstream peripheral device when IDCS bus power supply voltage MBVCC is off. Invertors 1412, 1413, which in one embodiment are circuits sold by Toshiba under Part No. 74VHC04, cannot have diodes coupled to the power supply voltage input terminal.

The active signal on terminal DNINT drives the emitter of a PNP transistor 1511 in wake-up interrupt pass-through circuit 1530. The collector of PNP transistor 1511 is connected to output terminal UPINT. The base of PNP transistor 1511 is connected by a resistor 1512, which in this embodiment is a 10 Kohm resistor, to line MBVCC. In one embodiment, transistor 1511 and resistor 1512 are one-half of a dual PNP 10 Kohm base resistor package sold by Panasonic as Part No. XN4115. Thus, the signal on input terminal DNINT, sometimes called downstream interrupt terminal DNINT, is gated by the voltage level on IDCS bus power supply line MBVCC to output terminal UPINT. That is, the signal on input terminal DNINT is a first input signal to the gate and the signal on IDCS bus power supply line MBVCC is a second input signal to the gate. The gate passes the first input signal to output line of the gate that is connected to terminal UPINT only when the second input signal is inactive. Since the voltage on IDCS bus power supply line is off, transistor 1511 passes the wake-up interrupt upstream to upstream interrupt terminal UPINT.

Under normal conditions, i.e., when IDCS bus power supply voltage MBVCC is on, an active signal on terminal DNINT is passed through invertors 1412 and 1413 to terminal DNINTIN of MBIC 700, and is prevented from by-passing MBIC 700 by transistor 1511 which in this embodiment is the gate. As explained above, MBIC 700 combines the signal on terminal DNINT with the interrupt signal from microcontroller 1410 to generate a signal on terminal UPINTOUT.

Pull-up resistor 1411 ensures conformance with IDCS bus interrupt protocols that were described above. If no peripheral device exists downstream, the newly docked peripheral device is the last peripheral device and so MBIC inverts the signal on terminal DNINTIN. Thus, the logic one signal provided through pull-up resistor 1411 does not result in generation of an upstream interrupt. However, when a new peripheral device is connected to terminal DNINT, the signal on terminal DNINT is pulled low, and consequently MBIC 700 generates an upstream interrupt.

SYSTEM LEVEL ARCHITECTURE

Figure 16:
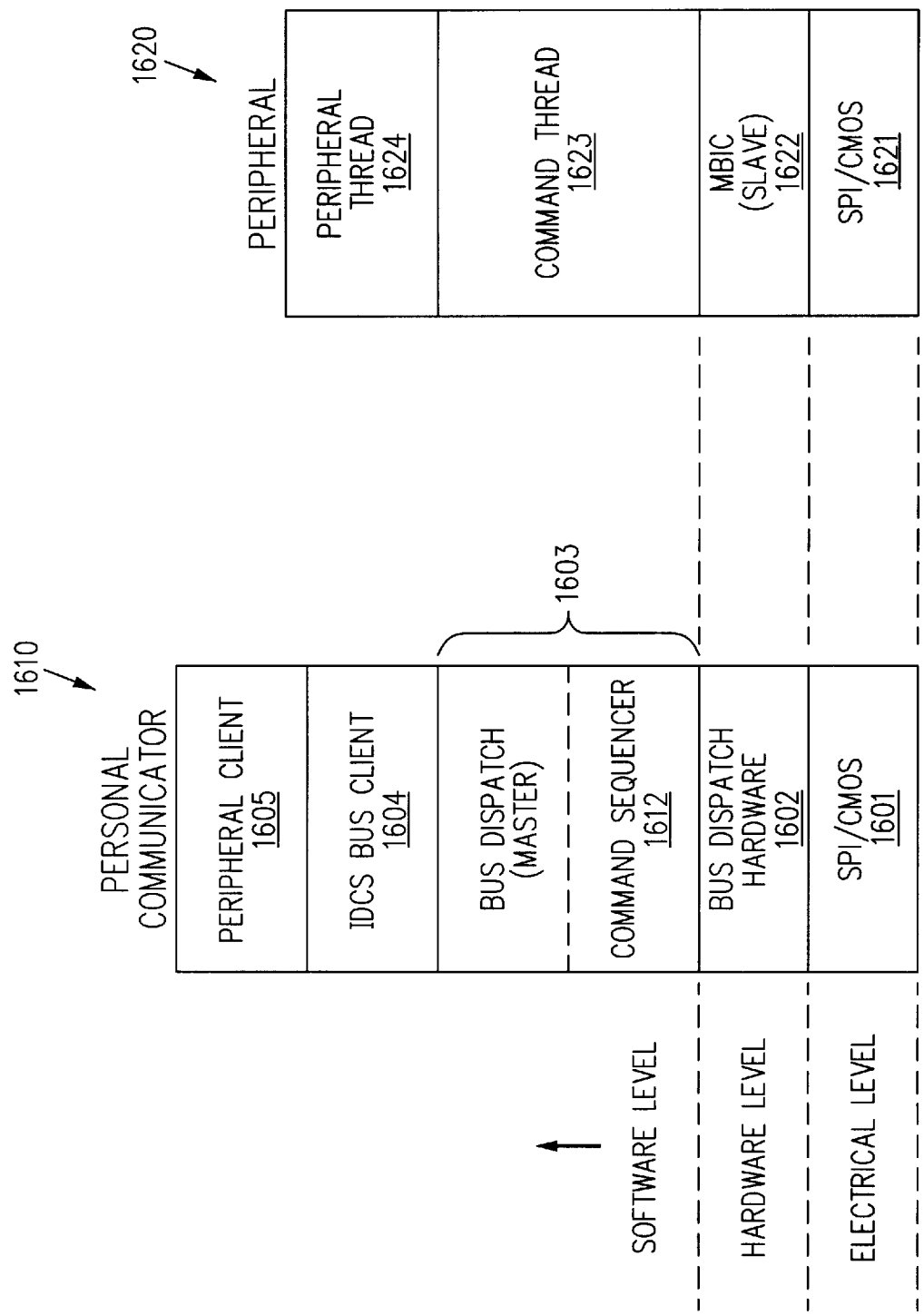
FIG. 16 is a block diagram illustrating the software and hardware structure for the IDCS bus of this invention.

FIG. 16 is a block diagram illustrating IDCS bus 150 system level architecture. Stack 1610 represents the hardware and software in bus dispatch 305, while stack 1620 represents the hardware and software that is needed in each peripheral device to use IDCS bus 150. Each component in a stack communicates with its neighbors in the stack. To support IDCS bus 150, base station 100 includes bus dispatch hardware 1602 of bus dispatch 305 that interfaces with CMOS circuitry 1601 that drives electrical signals on IDCS bus 150 and receives electrical signals from IDCS bus 150 in base station 100. Bus dispatch hardware 1602 includes a circuit for generating a plurality of clock rates; a first-in-first-out memory circuit that in one embodiment includes a 16-bit FIFO memory; a DMA engine; a register set for control of DMA transfers; a register set for control of command transfers; and a status register set. In this embodiment, the 16-bit FIFO memory is treated as a 2-bit FIFO and a 14-bit FIFO. Commands IRQ-Get and IRQ-Poll are posted to the 2-bit FIFO, i.e., the high priority slot, while all other commands are posted in the 14-bit FIFO, i.e., the low priority slot. Bus dispatch hardware 1602 interfaces with CMOS circuitry 1601 that physically implements the SPI protocol, as described above.

Bus dispatch 305 also includes bus dispatch master 1603 that includes command sequencer 1612 that implements the IDCS bus command protocol described above and communicates with command thread 1623 via CMOS circuitry 1601 and 1621 and bus dispatch hardware 1602 and MBIC 1622. One embodiment of bus dispatch master 1603 is presented in Microfiche Appendix A and is incorporated herein by reference. In the embodiment of Microfiche Appendix A, the software is written in the C programming language. The software can be compiled and linked using MacIntosh Programmer's Workshop C Complier Version 3.3 on an Apple MacIntosh computer. The resulting executable module is preferably included in a read-only memory within base station 100. The particular computer and programming language are illustrative only and are not intended to limit the invention to the particular implementation described. In view of this disclosure, the invention can be implemented using any computer and computer language that is compatible with base station 100 and the peripheral devices on IDCS bus 150.

Bus dispatch master 1603 is the master of IDCS bus 150 and the source of all bus commands that result in data transfer. Bus dispatch master 1603 triggers the creation of command sequences by command sequencer 1612 in response to requests from IDCS bus client 1604 and peripheral client 1605, that are described below. In addition, bus dispatch master 1603 constantly monitors IDCS bus 150 and initiates command sequences to handle peripheral attachment and removal and interrupt requests (IRQs) from peripheral devices on IDCS bus 150. Bus dispatch master 1603 also senses and adjusts data rates to peripheral devices and enforces isochronous data transfer when required.

Command sequencer 1612 is responsible for packaging command words into the appropriate sequences and queuing the command words in the FIFO circuit for transmission over IDCS bus 150. In the embodiment described above, there are four types of command sequences, hardware commands, software commands, command Send and command Get. Command sequencer 1612 builds command words with the appropriate addresses and command codes based on instructions from bus dispatch master 1603. Command sequencer 1612 strings together these command words with data packets in specific combinations and sequences such that they are intelligible to MBICs on IDCS bus 150 and command thread 1622 in the addressed peripheral device.

Communication with bus dispatch 305 by a peripheral client 1605 are through IDCS bus client 1604 that is an object of the operating system of base station 100. While the particular operating system used in base station 100 is not a feature of this invention, in one embodiment, the operating system is the Magic Cap operating system that is available from General Magic of Mountain View, California. An embodiment of the IDCS bus client 1604 suitable for use with the Magic Cap operating system is also included in Microfiche Appendix A. IDCS bus client 1604 transfers information to peripheral client 1605 and receives information from peripheral client 1605 concerning data transfer, interrupt servicing, error sequencing, and peripheral device attachment and removal.

Bus dispatch master 1603 only transmits information over IDCS bus 150 in response to directions from IDCS bus client 1604 that in turn is acting in response to directions from peripheral client 1605. IDCS bus client 1604 also communicates information to peripheral client 1605 in response to communication from bus dispatch master 1603. For example, when bus dispatch master 1603 determines that a particular peripheral device transmitted an interrupt, bus dispatch master 1603 can take no action on the interrupt. Rather bus dispatch master 1603 notifies IDCS bus client 1604 which in turn notifies peripheral client 1605 that an interrupt has been received. It is the responsibility of peripheral client 1605 to provide directions to bus dispatch master 1603 via IDCS bus client 1604 concerning any further transactions that are required over IDCS bus 150. Peripheral client 1605 is a subclass of IDCS bus client 1604, in this embodiment. This object is typically stored in a peripheral ROM or can be downloaded off a network. The location of peripheral client 1605 must be specified for bus dispatch master 1603.

Within each peripheral device on IDCS bus 150, a command thread 1623 in a peripheral device read-only memory controls the IDCS bus protocol for that peripheral device. Command thread 1623 provides a uniform interface for data transfer, interrupt requests, and the IDCS command protocol. Command thread 1623 communicates with a peripheral thread 1624 that is the driver within the peripheral device and so handles all peripheral device I/O functions and transfers data to and from command thread 1623. Command thread 1623 is fully interrupt driven and takes priority over peripheral thread 1624 for use of microcontroller resources. Peripheral thread 1624, as described more completely below, must be able to provide a four-byte peripheral identification and a peripheral information block when commanded to do so by bus dispatch 305.

POWER-ON/WAKE-UP SEQUENCES

Power-on of bus dispatch 305 refers to bus dispatch 305 powering line MBVCC. Power-on occurs either as a result of base station 100 powering on and in the process, bus dispatch 305 turning on IDCS bus power supply voltage MBVCC or a self-powered peripheral waking up, as described above, a sleeping bus dispatch 305 and thereby triggering the power-on sequence. Any self-powered peripheral, i.e., one powered by a battery or external power source, can be programmed to wake-up bus dispatch 305 with or without user involvement. A peripheral device such as a keyboard could be programmed to wake-up bus dispatch 305 when the user presses one of the keys. A pager might be programmed to wake-up bus dispatch 305 and alert the user when a message is received. In each case, a circuit similar to that illustrated in FIG. 15 is used with the microcontroller in the peripheral device to issue a wake-up interrupt to bus dispatch 305.

WAKE-UP SEQUENCE

Figures 17, 18:
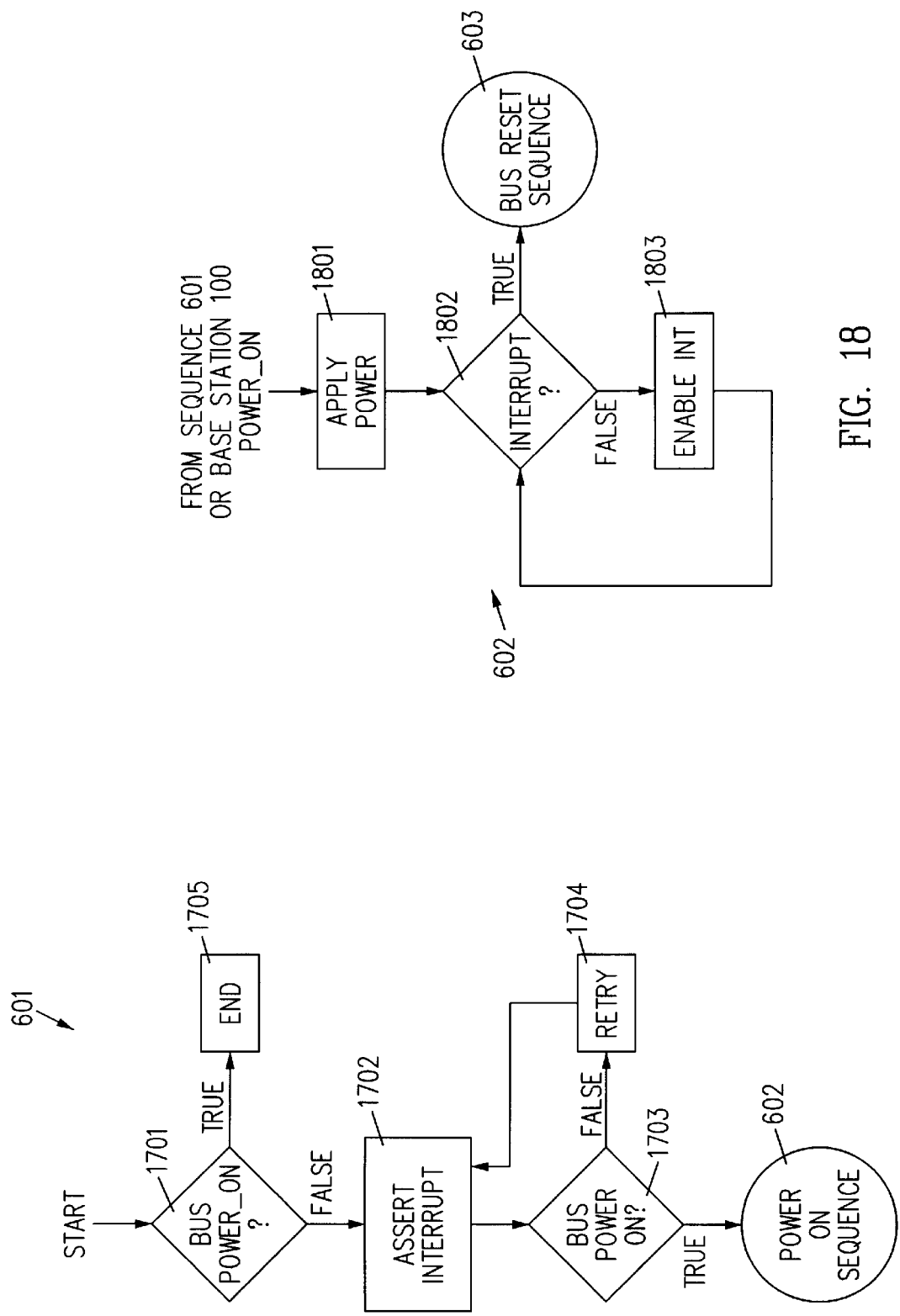
FIG. 17 is a process flow diagram for one embodiment of the wake-up sequence of this invention.
FIG. 18 is a process flow diagram for one embodiment of the power on sequence of this invention.

One embodiment of wake-up sequence 601 is illustrated in FIG. 17. In bus powered step 1701, a peripheral device samples IDCS bus power supply voltage MBVCC. If IDCS bus power supply voltage MBVCC is active, wake-up sequence 601 terminates in end step 1705. Conversely, if IDCS bus power supply voltage MBVCC is inactive, processing transfers from step 1701 to assert interrupt step 1702.

In step 1702, microcontroller 1410 asserts an interrupt on terminal PINTIN of MBIC 700 for a minimum of 100 nanoseconds (ns) and then deasserts the interrupt. After deassertion of the interrupt, processing transfers from step 1702 to step 1703.

If the interrupt is detected by bus dispatch 305, bus dispatch 305 powers up IDCS bus power supply voltage MBVCC. Consequently, in step 1703, microcontroller 1410 (FIG. 14) again samples IDCS bus power supply voltage MBVCC. If IDCS bus power supply voltage MBVCC is turned on, wake-up sequence 601 (FIG. 17) completed successfully and so processing transfers from MBVCC test step 1703 to power-on sequence 602. In this embodiment, if IDCS bus power supply voltage MBVCC is not turned on, processing transfers from step 1703 to step 1704. Retry step 1704 is a predetermined time delay. After the time delay expires, processing transfers from step 1704 to step 1702. Thus, wake-up sequence 601 is performed by a self-powered peripheral device on IDCS bus 150.

POWER-ON SEQUENCE

One embodiment of power-on sequence 602 is illustrated in FIG. 18. When IDCS bus power supply voltage MBVCC is off, the signal level on interrupt line MBINT is low. In apply power step 1801, bus dispatch 305 turns on IDCS bus power supply voltage MBVCC and waits a minimum of five hundred milliseconds, i.e., a sufficient time for any peripheral devices on IDCS bus 150 to power up, before proceeding to interrupt check step 1802. In apply power step 1801, the interrupt signal on line MBINT in bus dispatch 305 is set to a predetermined state, e.g., high. Recall that when a MBIC is powered-up, i.e, voltage MBVCC is applied to the MBIC, the signal on terminal UPINTOUT is pulled low.

Thus, in interrupt check step 1802, bus dispatch 305 polls line MBINT. If the signal level on line MBINT is low, indicating that at least one peripheral device is connected to base station 100, processing transfers from step 1802 to bus reset sequence 603 in bus initialization sequence 620. If the signal level on line MBINT is high, no peripheral devices are connected to base station 100 and processing transfers to step 1803.

In enable interrupt step 1803, bus dispatch 305 configures step 1802 to detect a falling edge and then returns processing to step 1802. Specifically, bus dispatch 305 enables detection of a negative edge, i.e., a transition from a logic one to a logic zero, on line MBINT in step 1802. Detection of a negative edge on line MBINT is only enabled before attachment of a peripheral device occurs. Once the first peripheral device or devices are attached, detection of a signal edge on line MBINT in bus dispatch 305 is disabled until address assign sequence 604 and peripheral configuration sequence 605 are completed for all peripheral devices on IDCS bus 150. At that time, bus dispatch 305 enables detection of a positive edge, i.e., a transition from logic zero to logic one, on line MBINT.

Processing remains in step 1802 until a peripheral device is connected, e.g., a negative edge is detected on line MBINT, or a predetermined time interval has passed, in which case, bus dispatch 305 returns to a sleep-mode.

BUS RESET SEQUENCE

Figure 19:
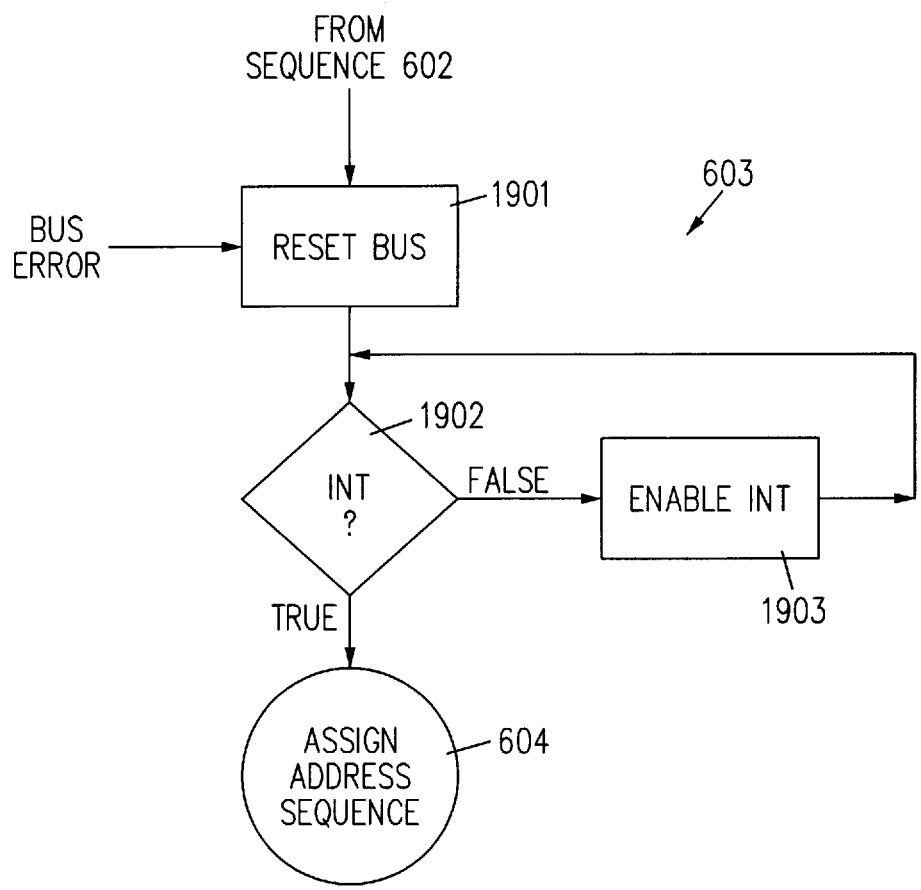
FIG. 19 is a process flow diagram for one embodiment of the bus reset sequence of this invention.

FIG. 19 is a process flow diagram for bus reset sequence 603. Bus reset sequence 603 is performed by bus dispatch 305 in response to four different events: (i) at least one peripheral device is connected to bus dispatch 305 when bus dispatch 305 performs power-on sequence 602; (ii) no peripheral devices are connected to bus dispatch 305 when bus dispatch performs power-on sequence 602, but at least one peripheral device is attached to bus dispatch 305 after line MBVCC is powered in power-on sequence 602; (iii) a peripheral device performs wake-up sequence 601; and (iv) IDCS bus 150 is reset with at least one peripheral device attached after an error is detected, or a peripheral device detachment occurs.

In reset bus step 1901, bus dispatch 305 toggles the voltage on line MBVCC. In this embodiment, bus dispatch 305 turns the voltage off for 250 milliseconds and then turns the voltage on for 500 milliseconds. Toggling IDCS bus power supply voltage MBVCC resets IDCS bus 150 and initializes each peripheral device to its power-on state. Specially step 1901 brings each MBIC in an attached peripheral device to power-on state 800. Processing transfers from reset bus step 1901 to interrupt check step 1902.

In interrupt check step 1902, bus dispatch 305 polls line MBINT to determine the signal level on line MBINT and not a transition on line MBINT. Initially, if the signal level on line MBINT is low indicating that at least one peripheral device is connected to base station 100, processing transfers from step 1902 to assign address sequence 604. If the signal level on line MBINT is high, no peripheral devices are connected to base station 100 and processing transfers to step 1903.

In enable interrupt step 1903, bus dispatch configures step 1902 to detect a falling edge and then returns processing to step 1902. Specifically, bus dispatch 305 enables detection of a negative edge, i.e., a transition from a logic one to a logic zero, on line MBINT in step 1902. Processing remains in step 1902 until a peripheral device is connected, e.g., a negative edge is detected on line MBINT.

ADDRESS ASSIGN SEQUENCE

Address assign sequence 604 is triggered upon completion of bus reset sequence 603 or upon attachment of one or more downstream peripheral devices after the peripheral devices on IDCS bus 150 have been configured. During this sequence, bus dispatch 305 assigns addresses to all peripheral devices on IDCS bus 150 and ensures the MBICs in these peripheral devices are responding properly. Peripheral device addresses are extremely important to proper functioning of IDCS bus 150. Since the MBICs are the traffic controllers on IDCS bus 150, regenerating, gating, and controlling the flow of commands and data along IDCS bus 150, it is important for each MBIC to know its relative position on IDCS bus 150, as explained above. The relative positioning information allows a MBIC to determine how to configure the buffer circuits described above when a command with a particular address is transmitted over IDCS bus 150.

Figure 20:
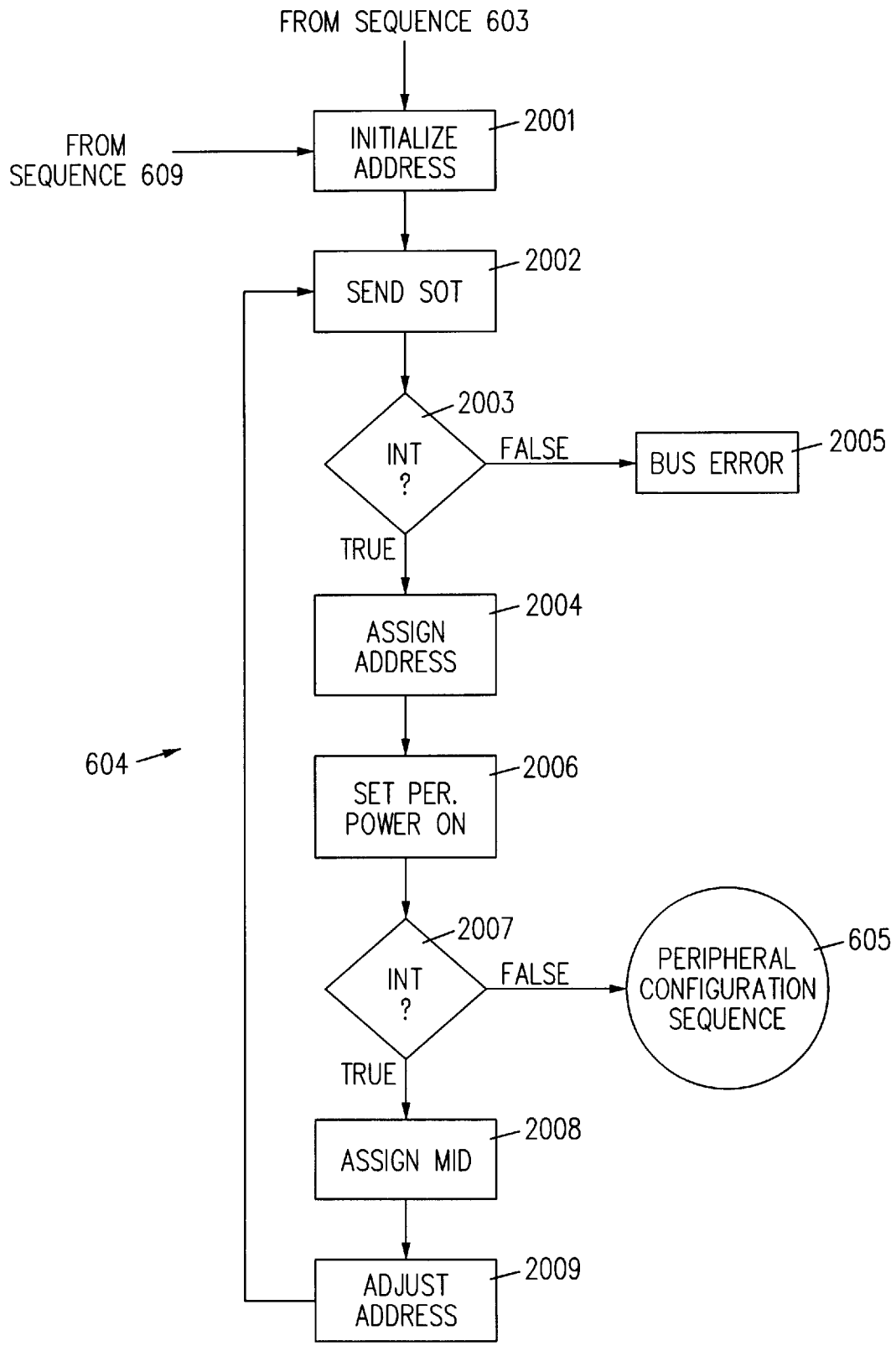
FIG. 20 is a process flow diagram for one embodiment of the address assign sequence of this invention.

In initialize address step 2001 (FIG. 20) of address assign sequence 604, bus dispatch 305 loads a counter with starting address n for address assign sequence 604. The address loaded in the counter in initialize address step 2001 depends on the event that triggered address assign sequence 604. When address assign sequence 604 is entered from bus reset sequence 603, the counter is loaded with a value of six, in this embodiment. When address assign sequence is entered following attachment of a new peripheral device to IDCS bus 150 after the other peripheral devices have been configured, i.e., from peripheral attachment sequence 609, the counter is set to the address of the new peripheral device, i.e., the address of the last peripheral device on IDCS bus 150 minus one. After the counter is loaded in step 2001, processing transfers to step 2002.

In send SOT step 2002, bus dispatch 305 transmits start of transmission command SOT with the address set to seven, i.e., a global command, over IDCS bus 150. As explained above for state diagram 850, command SOT brings the first unaddressed peripheral device on bus 150 from power-on state 800 to no-address state 801. As explained above, when a MBIC transitions from power-on state 800 to no-address state 801, the MBIC drives the signal on line MBINT to a logic one, i.e., high. Processing transfers from step 2002 to step 2003.

In interrupt check step 2003, bus dispatch 305 checks the signal level on line MBINT. This is an important check because if a peripheral device is not attached to base station 100, the bus connector of base station 100 is not properly terminated. Consequently, in the absence of an attached peripheral device, an electrostatic discharge could have triggered the initial interrupt signal on line MBINT. Since the bus connector is not properly terminated, bus dispatch 305 is designed to ensure that no commands are sent out unless at least one peripheral device is attached. Thus, if the signal level on line MBINT is high, processing transfers from interrupt check step 2003 to assign address step 2004. If the signal level on line MBINT is low, a bus error has occurred and so processing transfers to bus error step 2005. In bus error step 2005, IDCS bus 150 is reset and an error condition is returned.

In assign address step 2004, bus dispatch 305 builds and sends command Assign Address with an address of n. As explained above, in response to command Assign Address, the state machine in MBIC 700 that is in no-address state 801 transitions from no-address state 801 to last-idle state 803 and the interrupt is removed from line MBINT. As explained above, when MBIC 700 is in last-idle state 803, bus dispatch 305 has terminated IDCS bus 150 so that no signals are transmitted downstream from that peripheral device until bus dispatch 305 confirms that another peripheral device is connected downstream. Processing transfers from assign address step 2004 to set peripheral power-on step 2006.

In set peripheral power-on step 2006, bus dispatch 305 builds and sends command Power-on with an address n. The response of MBIC 700 to command Power-on was described above. Step 2006 could be eliminated from address assign sequence 604, but inclusion of step 2006 assures that the peripheral device at address n is powered-up and able to respond to commands from bus dispatch 305. It is possible that the peripheral device could be off, even though IDCS bus 150 is powered-up. MBIC 700 supports this command and so it is up to the developer of the peripheral device to decide whether to implement a response to the power-on command.

Step 2006 completes the address assign sequence for peripheral device at address n, but there may be additional peripheral devices attached to IDCS bus 150 that are in power-on state 800. Consequently, upon completion of step 2006, check interrupt step 2007 polls line MBINT to determine the state of the signal on that line. If the signal on line MBINT is low, all peripheral devices on IDCS bus 150 have been assigned addresses and so processing transfers to peripheral configuration sequence 605 after a 500 millisecond delay. Conversely, it the signal on line MBINT is high, one or more peripheral devices are attached to IDCS bus 150 that have not been assigned addresses and so processing transfers from step 2007 to step 2008.

In assign mid-peripheral step 2008, bus dispatch 305 builds and sends command Assign Mid-Peripheral with an address n. In response to command Assign Mid-Peripheral, MBIC 700 transitions from last-idle state 803 to mid-idle state 802. As explained above, in mid-idle state 802, MBIC 700 enables the downstream bus drivers and configures interrupt circuit 770 so that interrupts from downstream peripheral devices are no longer inverted. Thus, step 2008 configures MBIC 700 so that bus dispatch 305 can communicate with the downstream peripheral device. Upon completion of step 2008, processing transfers to adjust address step 2009.

In adjust address step 2009, the value of the counter in decremented so that the counter has the address for the next peripheral device on IDCS bus 150. Adjust address step 2009 checks the new address to determine if the address is less than one. If the address is less than one, a bus error is generated. After the address for the next peripheral device on IDCS bus 150 is generated and checked in step 2009, processing returns to step 2002.

Steps 2002 through 2007 are then repeated. If check interrupt step 2007 detects that the signal on line MBINT is still high, steps 2008 and 2009 are repeated and processing returns to step 2002. This sequence continues until the signal on line MBINT is low in step 2007 and the processing transfers to peripheral configuration sequence 605 after a 500 millisecond delay. Thus, each peripheral device on IDCS bus 150 is assigned an address before any peripheral device is configured for operation on IDCS bus 150.

PERIPHERAL CONFIGURATION SEQUENCE

Figure 21:
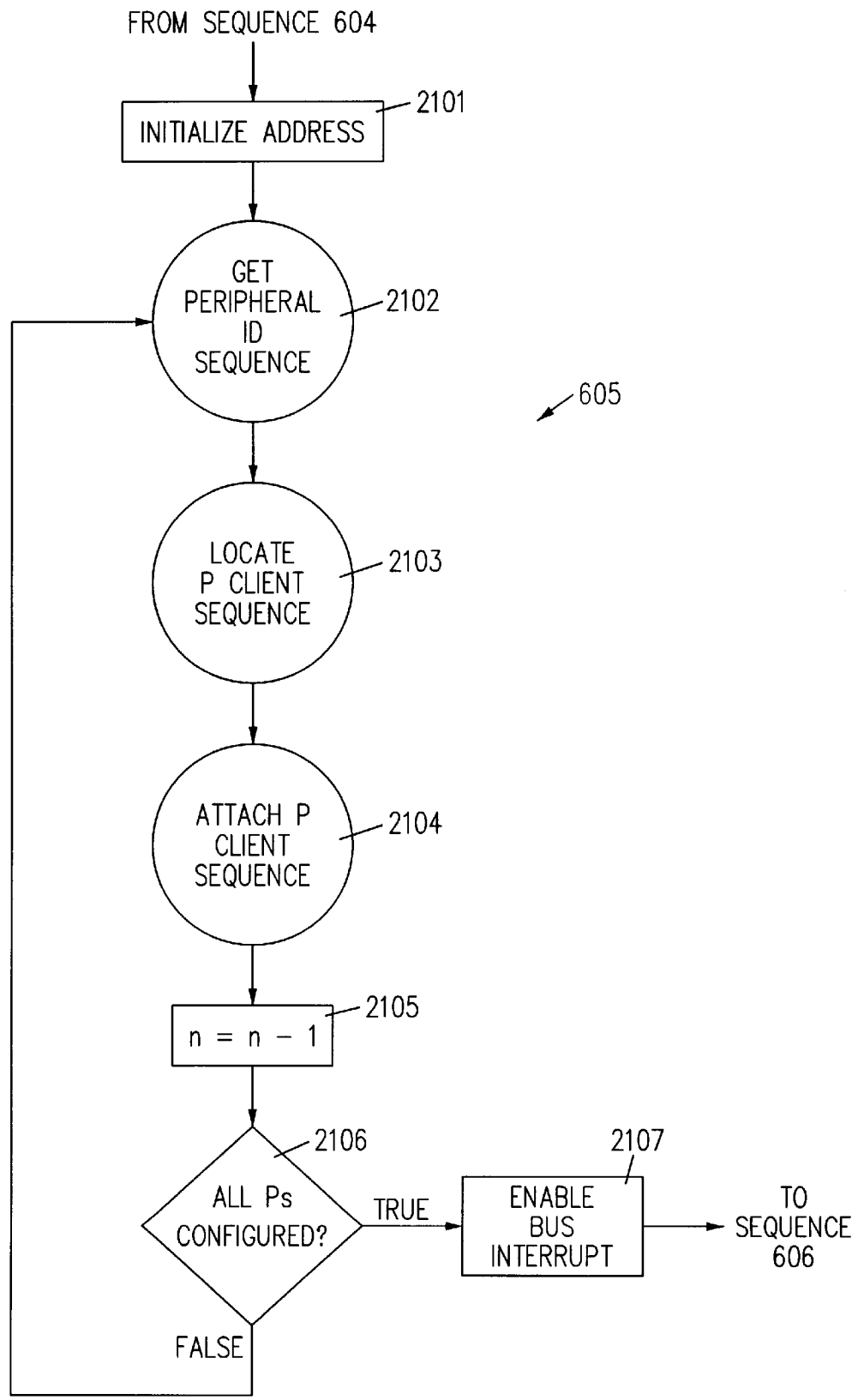
FIG. 21 is a process flow diagram for one embodiment of the peripheral configuration sequence of this invention.

FIG. 21 is a process flow diagram for peripheral configuration sequence 605. Peripheral configuration sequence 605 includes three sub-sequences, get peripheral ID sequence 2102, locate peripheral client sequence 2103, and attach peripheral client sequence 2104, that are performed sequentially by bus dispatch 305 for each addressed peripheral device on IDCS bus 150 during bus initialization sequence 620. During sequence 605, bus dispatch 305 requests identification and peripheral information from for each newly addressed peripheral device on IDCS bus 150. Bus dispatch 305 also locates and attaches a peripheral client for each of the newly addressed peripheral devices. The information procured tells bus dispatch 305 how to refer to the peripheral device and the speeds at which bus dispatch 305 can send commands and data to the peripheral device as well as important peripheral device requirements like the frequency of interrupt servicing required during isochronous data transfers.

Prior to considering these sub-sequences in further detail, the content of a peripheral information block that is utilized in peripheral configuration sequence 605 is considered. A peripheral information block is stored in non-volatile memory on-board each peripheral device. The command thread in the peripheral device in response to commands discussed in the following sequences retrieves information from the peripheral information block and sends that information to bus dispatch 305.

The peripheral information block contains basic information about the peripheral device and may include one or more peripheral clients that can service the peripheral device. Multiple peripheral clients may be included to enable peripheral device operation on different platforms, operating systems, etc. Bus dispatch 305 uses the information in the peripheral information block to set data rates and command rates to the peripheral device. The peripheral information block also tells bus dispatch 305 the percentage of bus bandwidth and the frequency of interrupt servicing the peripheral device requires in real-time and/or isochronous data transfer mode. In addition, the peripheral information block tells bus dispatch 305 how much power the peripheral device draws from IDCS bus power supply voltage MBVCC, enabling proper gauging of the power requirements of peripheral devices on IDCS bus 150.

One embodiment of the information in peripheral information block is presented in TABLE V.

TABLE V

Peripheral Information Block

| ATTRIBUTE BYTE LENGTH | DESCRIPTION |
|---|---|
| PInfo Length 2 bytes, MSB first | Length of Peripheral Information Block not |

TABLE V-continued

Peripheral Information Block

| ATTRIBUTE BYTE LENGTH | DESCRIPTION |
|---|---|
| | including PInfo Length bytes but including PInfo Checksum bytes. |
| Peripheral ID 4 bytes, zero fill | Peripheral client identification. Used for finding client that can service the peripheral device. |
| Magicbus Version 1 byte | Minimum version of ICDS bus 150 required by peripheral device. |
| Peripheral Hardware Version 1 byte | For manufacturer use. |
| Peripheral Software Version 1 byte | For manufacturer use. |
| Peripheral Flags 1 byte: Bits 0 thru 4 = reserved Bit 5 = Peripheral may be powered by external power. Bit 6 = Peripheral may be powered by battery. Bit 7 = Peripheral may be powered by IDCS bus power. | Used to convey peripheral power source information: powered by external power, battery, or ICDS bus 150 for everything except the MBIC which is powered by IDCS bus power at all times. |
| Maximum Send Frequency Command 4 bytes (hertz), MSB first | Highest command byte clocking frequency that the peripheral device can handle when receiving commands. |
| Minimum Send Delay Per Command Word 4 bytes (nanoseconds) | Minimum time from the end of the second byte of the command word to the start of the following command or first data byte (for sends). |
| Maximum Send Frequency Data 4 bytes (nanoseconds), MSB first | Highest data byte clocking frequency that the peripheral device can handle when receiving data (may be different from commands since data may go to a FIFO rather than a microprocessor port). |
| Minimum Send Delay Per Data Byte 4 bytes (nanoseconds), MSB first | Packet service rate -- time peripheral device needs between bytes in a data transfer. |
| Minimum Get Frequency Data 4 bytes (nanoseconds), MSB first | Minimum data byte clocking frequency that the peripheral device uses to send commands and data to base station 100. This helps bus dispatch 305 determine maximum time required for the peripheral device to make a transfer. |
| Maximum Get Delay Per Data Byte 4 bytes (nanoseconds), MSB first | Maximum time peripheral device delays between bytes in a data transfer. |
| Maximum IRQ Latency 4 bytes (nanoseconds), MSB first | Maximum time delay between interrupt assertion and servicing such that peripheral device does not lose data when in real-time mode. For peripheral devices operating in real time mode, the value should be as long as the peripheral device can tolerate to allow for operation of other peripheral devices. |
| Maximum Transaction Time 4 bytes (nanoseconds) | The longest time required to complete a bus transaction (SEND, GET packet size) for a peripheral device. The value is calculated based on nine bit times per byte plus inter character delay to compensate for possible variances between actual versus requested transmission rates. This time is the greater of: a) For the largest GET DATA block (not including PInfo Block or Peripheral Client download): Command GET DATA+bytes and delay for two SOT commands and two EOT commands+each data byte with delay+other peripheral device overhead+EOT command from bus dispatch 305 (100 $\mu s$) ; OR b) For largest SEND DATA block: Command Send Data+each data byte with delay+one EOT command byte from bus dispatch 305. The actual transaction may take longer due to bus dispatch overhead. |
| Maximum Bus Utilization Interval 4 bytes (nanoseconds), MSB first | Maximum time within each Maximum Bus Utilization Period utilized by the peripheral device. This is the total of all the transactions that may be done by the peripheral device within the Maximum Bus Utilization Period. An overhead of 500 $\mu s$ per bus dispatch command and 500 $\mu s$ for command IRQ Poll must be included or added by the client. Nine bit times instead of eight bit times is used in calculating the time for transmitting data to the peripheral device at the maximum rate specified by the peripheral device (assuming 14.7456 MHz overall maximum clocking). This interval is always greater than or equal to Maximum Transaction Time. |
| Maximum Bus Utilization Period 4 bytes (nanoseconds), MSB first | The frequency period of the bus utilization by the peripheral device. The longest time period in nanoseconds within which the peripheral device can utilize no more than the Maximum Bus Utilization Interval worth of time for bus transactions. This period is always greater than or equal to Maximum Bus Utilization Interval. |
| Maximum MBVCC Current 4 bytes (in $\mu A$) | Maximum IDCS bus Vcc Current Drawn by the peripheral device. |
| Typical MBVCC Current 4 bytes (in $\mu A$) | Average IDCS bus Vcc Current Drawn by the peripheral device. |
| Quiescent MBVCC Current 4 bytes (in $\mu A$) | Idle IDCS bus Vcc Current Drawn by the peripheral device when in its quiescent state. |
| Reserved 16 bytes (zeroed) | Reserved for future use. |

TABLE V-continued

Peripheral Information Block

| ATTRIBUTE BYTE LENGTH | DESCRIPTION |
| --- | --- |
| Peripheral Name Pascal string | Name of the peripheral device. |
| Peripheral Type Pascal string | Type or function of the device (printer, scanner, etc.) |
| Peripheral Manufacturer Pascal string | Company name. |
| CLIENT PACKAGES Any number (including zero) of the following Client Package Groups: | Specifies client packages that can be uploaded to base station 100 for handling the peripheral device. Presumes client software is not located on base station 100. |
| Client Info Length | Number of bytes not including this byte used to describe this client package. (Number of bytes to skip to the next package.) |
| Client Package Code Type 1 byte (Magic Cap = 1) | Type of Client (e.g. Magic Cap, Intel,...) |
| Client Package Code Sub Type 1 byte (68000 = 1) | Sub-type of Client (e.g. 68000, MIPS, Script, ...). |
| Client Package Version 1 byte | Revision number of peripheral driver software to be up-loaded to bus dispatch 305. |
| Client Package Size 4 bytes, MSB first | Size of Peripheral Client driver for peripheral device |
| Client Package Name Pascal string | Name of the client class. |
| PInfo Checksum 2 bytes, MSB first | All bytes of Peripheral Packet added together + 1 (not including checksum) |

Bus dispatch 305 begins peripheral configuration sequence 605 in initialize address step 2101 (FIG. 21) by setting an address counter to the address for the first unconfigured peripheral device on IDCS bus 150. Again, the address is different depending on how assign address sequence 604 was triggered. After step 2101 is completed, processing transfers to get peripheral ID sequence 2102 that is illustrated in more detail in FIG. 22.

In Request ID step 2201 of get peripheral ID sequence 2102, bus dispatch 305 forms and transmits command Request ID to the peripheral device having an address equal to the value of the address counter. Recall that command Request ID instructs the command thread in the peripheral device to send back the four byte peripheral ID in response to the next command Get. Upon completion of step 2201, processing transfers step 2202.

In get data step 2202, bus dispatch 305 forms and transmits command Get to the peripheral device having an address equal to the value of the address counter. In response to command Get, the peripheral device sends back the information in field peripheral ID of the peripheral information block. (See Table V).

The information is received by bus dispatch 305 in receive ID step 2203. The four bytes received are a unique identification for the driver, sometimes called a peripheral client, of the peripheral device. When end of transmission command EOT is received from the peripheral device indicating that the data transmission is complete, bus dispatch 305 responds with an end of transmission command EOT and processing transfers from step 2203 to locate peripheral client sequence 2103.

In locate client sequence 2103, which is illustrated in more detail in FIG. 23, bus dispatch 305 uses the peripheral ID information to find the client that can service the peripheral device. In sequence 2103, bus dispatch 305 tries to locate an installed client in memory of base station 100 and if an installed client is not found, to download the client from the peripheral device. Once a client is found, bus dispatch 305 proceeds to attach the client. If a client is not found, bus dispatch 305 alerts the user with an error message.

Specifically, in client in base station check step 2301, bus dispatch 305 performs a sequential search through a client table within a memory of base station 100 for an installed client that services peripheral devices with the peripheral ID of the peripheral device at address n. If a match is found between an entry in the client table and the peripheral ID, a client for the peripheral device has been located and so processing transfers to peripheral client attach sequence 2104 and conversely to load peripheral client sequence 2302, that is illustrated in more detail in FIG. 24.

As explained more completely below, in load peripheral client sequence 2302, bus dispatch 305 tries to download a driver from the peripheral device. Bus dispatch 305 requests and searches through the peripheral device's peripheral information block to determine whether the block contains any peripheral clients and if so, whether any of the peripheral clients are compatible with base station 100. If such a peripheral client is found, bus dispatch downloads the peripheral client from the peripheral device to base station 100. Upon completion of load peripheral client sequence 2302, processing transfers to a second client check 2303 in locate peripheral client sequence 2103.

If a driver is not found in the peripheral device, processing transfers from check step 2303 to bus error step 2304. Conversely, if a driver was found in step 2303, bus dispatch 305 confirms that the driver was successfully downloaded and that the driver can service the peripheral device. If these requirements are true, processing transfers from step 2303 to attach peripheral client sequence 2104 and otherwise to bus error step 2304. Bus error step 2304 informs the user that the peripheral device can not be used without identification of the location of a suitable driver. In such a case, the user may be able to download a driver to base station 100 from a remote location.

Figure 24:
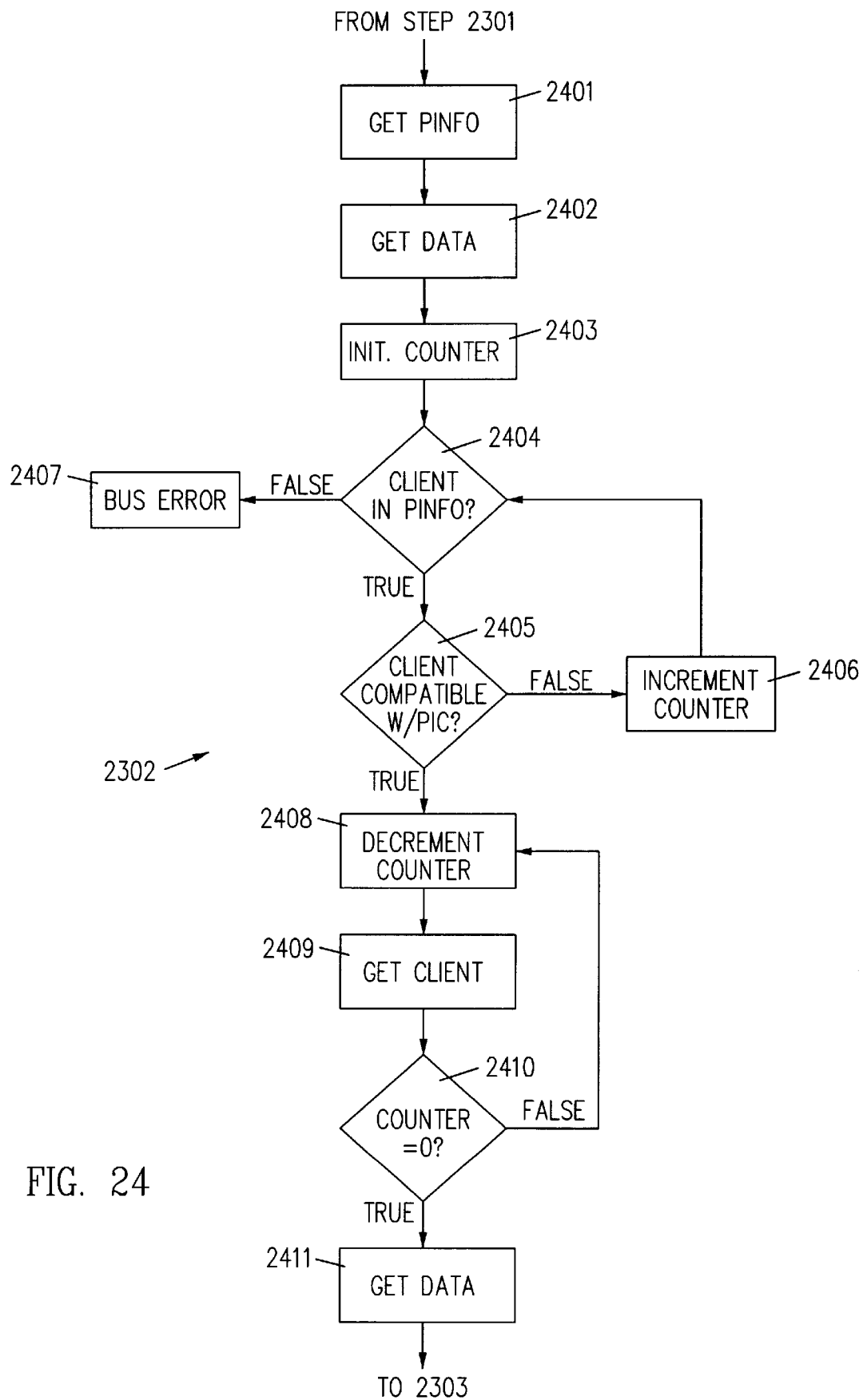
FIG. 24 is a process flow diagram for one embodiment of the load peripheral client sequence in the locate peripheral client sequence.

The specific operations performed in load peripheral client sequence 2302 are illustrated in FIG. 24. In get Pinfo step 2401, bus dispatch 305 transmits command Get Peripheral Info to the peripheral device at the address on IDCS bus 150 equal to the value of the address counter. Recall that command Get Peripheral Info instructs the peripheral device to send its peripheral information block to bus dispatch 305 upon receipt of the next command Get. Upon completion of step 2401, processing transfers to get data step 2402 in which bus dispatch 305 sends command Get to retrieve the requested data from the addressed peripheral device.

In step 2403, bus dispatch 305 initializes a client location counter to a first predetermined value, which in this embodiment is one and then processing transfers to the loop of steps defined by steps 2404 to 2406. Bus dispatch 305 in this loop performs a sequential search through the client packages (if any) in the peripheral information block to see if there is a peripheral client that is compatible with base station 100.

Specifically, in client in Pinfo check step 2404, bus dispatch 305 checks to determine whether the check sum at the end of the peripheral information block has been reached. If the check sum is detected, processing transfers from step 2404 to bus error step 2407. Bus error step 2407 informs the user that the peripheral device can not be used without identification of the location of a suitable driver. If the check sum is not detected processing transfers from step 2404 to step 2405.

In step 2405, bus dispatch 305 compares the information defining the peripheral client in the client package at the location pointed to by the client location counter with the capabilities of base station 100. If the peripheral client is compatible with base station 100 processing transfers to decrement counter step 2408 and otherwise to increment counter step 2406.

Increment counter step 2406 increments the client location counter and returns processing to step 2404 that checks to determine whether there is another client package in the peripheral information block and then to step 2405.

When processing transfers to step 2408, a compatible peripheral client has been found in the peripheral device and bus dispatch 305 must download that peripheral client. Thus, in step 2408, bus dispatch 305 decrements client location counter and transfers processing to get client step 2409.

In get client step 2409, bus dispatch 305 sends command Get Driver to the peripheral device having an address on IDCS bus 150 equal to the value of the address counter. Processing transfers from step 2409 to check counter step 2410. In step 2410, if the value of the client location counter is zero, processing transfers to step 2411 and otherwise to step 2408. Thus, if one of the clients in the peripheral information block is compatible with bus dispatch 100, bus dispatch 305 sends out a series of get driver commands where the number of commands is equal to the value of the client location counter which is just the position of the peripheral client in the group of peripheral clients. For example, if the first client in the group was compatible, the value of the client location counter would equal zero after the first get driver command was sent. If the fourth client in the group was compatible, the value of the client location counter would equal three after the first get client command was sent. In this case, bus dispatch 305 sends out three more get client commands (or a total of 4) before the client location counter reaches a value of zero.

When the value of the client location counter equals zero and processing transfers from step 2410 to 2411, bus dispatch 305 sends out command Get to retrieve the peripheral client from the peripheral device. When the peripheral client has been received by bus dispatch 305, processing returns to step 2303, that was described above.

Figure 25:
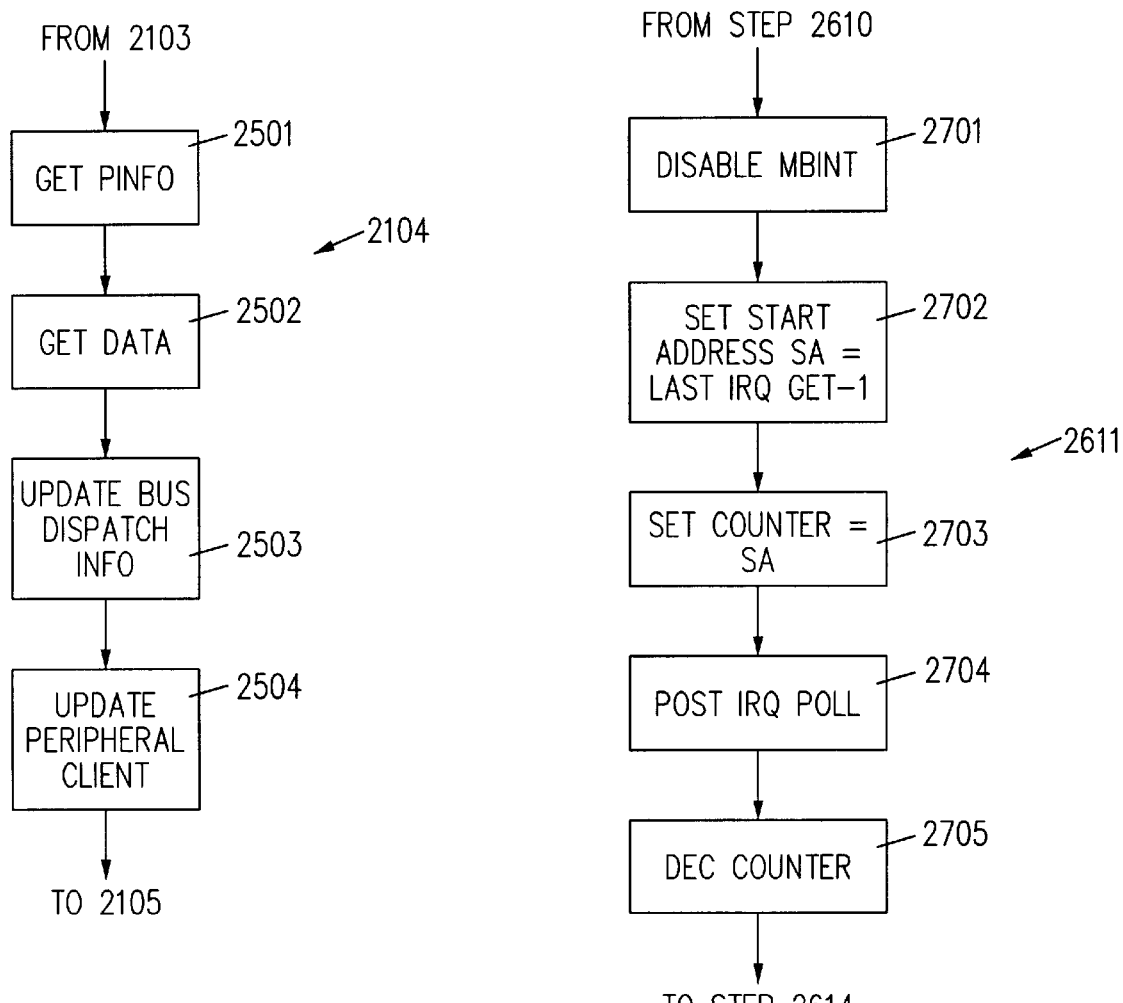
FIG. 25 is one embodiment of the attach peripheral client sequence within the peripheral configuration sequence of this invention.

If a peripheral client is located in base station 100 or down loaded from the peripheral device, bus dispatch proceeds to attach the client through attach peripheral client sequence 2104 that is illustrated in more detail in FIG. 25.

During attach peripheral client sequence 2104, bus dispatch 305 transfers control of IDCS bus 150 temporarily to the peripheral client and responds to directives from the peripheral client. The peripheral client initiates all commands in this sequence and self-configures with assistance from bus dispatch 305. As a result, FIG. 25 shows the sequence from the perspective of the peripheral client, and not bus dispatch 305 as in the other figures that illustrate the operation of bus dispatch 305.

The sequence illustrated in FIG. 25 is the minimum series of commands a peripheral client performs in attach peripheral client sequence 2104. Clients may also perform some of their own peripheral protocol sequences during sequence 2104 to initialize the peripheral device.

In step 2501, the peripheral client instructs bus dispatch 305 to retrieve the peripheral information block from the peripheral device. Thus, bus dispatch 305 sends out command Get Peripheral Info in step 2501 and then transfers to step 2502 that sends out command Get. In response to command Get, the peripheral devices transmits the peripheral information block to bus dispatch 305.

When the peripheral information block is received, the peripheral client, in update bus dispatch info step 2503, uses the information to compute and store in bus dispatch 305 command rates, data rates, maximum frequencies, block lengths, etc. Though two peripheral devices may share the same peripheral client, the capabilities of the devices may differ. Thus, the peripheral client performs these calculations to customize the peripheral client to the capabilities of a particular peripheral device or to the capabilities of a particular version of hardware in base station 100. Upon completion of step 2503, processing transfers to update info in peripheral client step 2504 where the peripheral client updates its own information. Upon completion of step 2504, processing transfers to step 2105.

In adjust address step 2105 (FIG. 21), bus dispatch 305 decrements the address counter and then checks, in all peripherals configured check step 2106, whether the value of the address counter is less than the address of the last peripheral device on IDCS bus 150. While the value of the address counter is greater than or equal to the address of the last peripheral device on IDCS bus 150, processing transfers from step 2106 to get peripheral ID sequence 2102. Sequences 2102, 2103, and 2104, and step 2105 are repeated for the next peripheral device on IDCS bus 150.

When all peripheral devices are configured, processing transfers from step 2106 (FIG. 21) to enable bus interrupt step 2107. In step 2107, bus dispatch 305 enables detection of a positive edge on line MBINT and transfers processing to service bus sequence 606.

SERVICE BUS SEQUENCE

Figure 26:
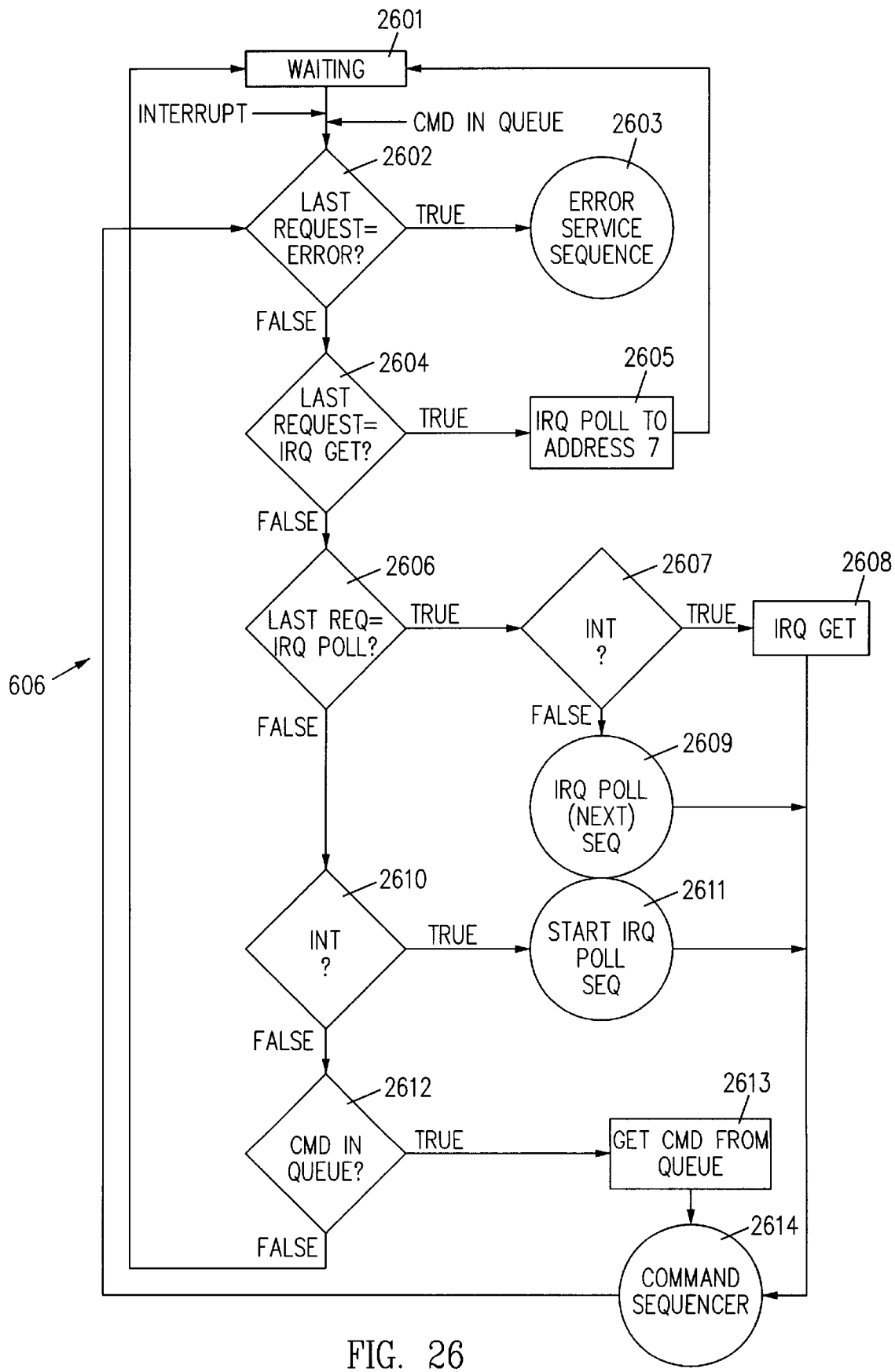
FIG. 26 is a process flow diagram of one embodiment of the service bus sequence of this invention.

Bus dispatch 305 spends most of its time cycling through service bus sequence 606 where bus dispatch 305 responds to interrupts received from peripheral devices on IDCS bus 150 and commands queued for transmission to peripheral devices or the MBICs in the peripheral devices by the peripheral and IDCS bus clients. Bus dispatch 305 remains in waiting step 2601 until a command or an interrupt is detected. Processing transfers from waiting step 2601 to a first last request check step 2602 in response to either an interrupt or a command. If an interrupt and a command are received simultaneously, interrupts take priority and are serviced first as shown in FIG. 26. If an interrupt is received, service bus sequence 606 performs the interrupt poll sequence described previously. In this embodiment the interrupt poll sequence includes steps 2602 to 2611 and command sequencer 2614 that are described more completely below.

When service bus sequence 606 is initiated, bus dispatch 305 checks in first last request check step 2602 to see if the last bus command resulted in an error. This ensures that errors are detected immediately after the command sequence in which they occur and are not compounded by continued bus activity. If an error is detected in step 2602, processing transfers to error service sequence 2603, where bus dispatch 305 processes the error, as described more completely below.

If no error is detected in step 2602, processing transfers to a second last request check step 2604. In step 2604, bus dispatch 305 checks to see if the last command was command IRQ-Get. Command IRQ-Get is used after an interrupt polling sequence when the source of the interrupt is determined in response to command IRQ-Poll. Command IRQ-Get is sent to the peripheral device that generated the interrupt to determine the nature of the interrupt.

If the last command was command IRQ-Get indicating that interrupt polling is complete, processing transfers from step 2604 to send IRQ-Poll step 2605. In send IRQ-Poll step 2605, bus dispatch 305 sends command IRQ-Poll with an address of seven to re-enable interrupts on IDCS bus 150 and transfers processing to waiting step 2601.

If the last command was not command IRQ-Get, processing transfers from step 2604 to a third request check 2606 where bus dispatch 305 checks to see if the last command was command IRQ-Poll, which indicates whether an Interrupt-Poll is in progress. If the last command was command IRQ-Poll, bus dispatch 305 transfers processing from step 2606 to interrupt active check step 2607 where bus dispatch 305 determines whether the last peripheral device polled was the source of the interrupt.

In interrupt active check step 2607, bus dispatch 305 checks to see if the signal level on line MBINT is high which indicates that the last peripheral device polled was the source of the interrupt. If the signal level on line MBINT is high, processing transfers to send IRQ-Get step 2608 and otherwise to IRQ-poll sequence 2609.

In send IRQ-Get step 2608, bus dispatch 305 posts command IRQ-Get to the peripheral device to determine the nature of the interrupt. If processing transfers to IRQ-poll sequence 2609, the last peripheral device polled was not the source of the interrupt and so bus dispatch 305 proceeds to poll the next peripheral device as explained more completely below. Upon completion of either step 2608 or step 2609, processing transfers to command sequencer 2614, that is also described more completely below.

If third request check step 2606 does not detect that the last command was command IRQ-Poll, processing transfers from step 2606 to interrupt check step 2610. In step 2610, bus dispatch 305 checks the state of interrupt line MBINT to determine if there is an interrupt on IDCS bus 150. If the signal level on line MBINT is high, there is an interrupt on IDCS bus 150 and processing transfers from step 2610 to start IRQ-poll sequence 2611. Upon completion of start IRQ-poll sequence 2611, processing transfers to command sequencer 2614.

If the signal level on line MBINT is low, there are no interrupts on IDCS bus 150 and so processing transfers from step 2610 to command in queue check step 2612 so that bus dispatch 305 can attend to any command requests that have been posted to the queue.

If no commands are in the queue, processing transfers from step 2612 to step waiting 2601, i.e., bus dispatch 305 returns to the waiting state and waits for an interrupt or command to occur. Conversely, if there is one or more commands in the queue, processing transfers from step 2612 to get command from queue step 2613. In step 2613, bus dispatch 305 takes the oldest command from the queue and transfers processing to command sequencer 2614. Upon completion of operations by command sequencer 2614, bus dispatch 305 loops back through the entire service bus sequence 606 again to catch any errors that occurred in the previous command cycle, to continue any interrupt polling in progress, and to handle any commands in the queue.

Prior to considering the operation of command sequencer 2614, start IRQ-poll sequence 2611 and IRQ-poll sequence 2609 are considered. FIG. 27 is a process flow diagram for start IRQ-poll sequence 2611.

Initially, in disable interrupt step 2701, bus dispatch 305 disables the ability to detect an edge on interrupt line MBINT. Edge detection on interrupt line MBINT remains disabled until the source of the interrupt is found and handled. Processing transfer from step 2701 to set start address step 2702.

In start address step 2702, bus dispatch 305 sets the start address to the address used in the last IRQ-Get command minus one. This results in a round robin approach to IRQ polling in which the poll begins with the peripheral device immediately downstream from the last peripheral device that signaled an interrupt. Processing transfers from step 2702 to set counter step 2703.

In set counter step 2703, bus dispatch 305 sets an Interrupt-Poll counter to the start address. However, if the start address is less than the address of the last peripheral device on IDCS bus 150, bus dispatch 305 loops back to the first peripheral device on IDCS bus 150 and sets the Interrupt-Poll counter to address six. Processing transfers from step 2703 to step 2704.

In post command step 2704, bus dispatch 305 posts command IRQ-Poll to the address specified by the value of the Interrupt-Poll counter and transfers processing to decrement counter step 2705. In decrement counter step 2705, bus dispatch 305 decrements the Interrupt-Poll counter and then transfers processing to command sequencer 2614.

Figure 28B:
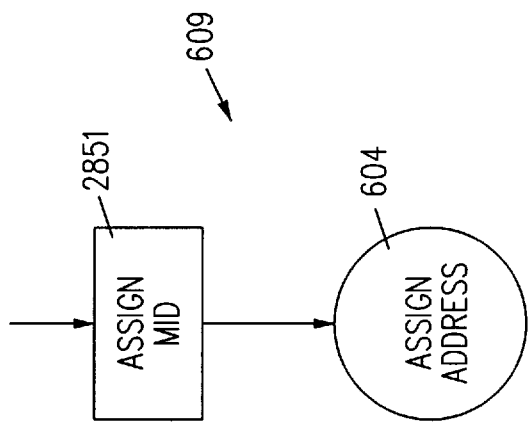
FIG. 28B is a process flow diagram of one embodiment of the peripheral attachment sequence within the service bus sequence of this invention.
Figure 28A:
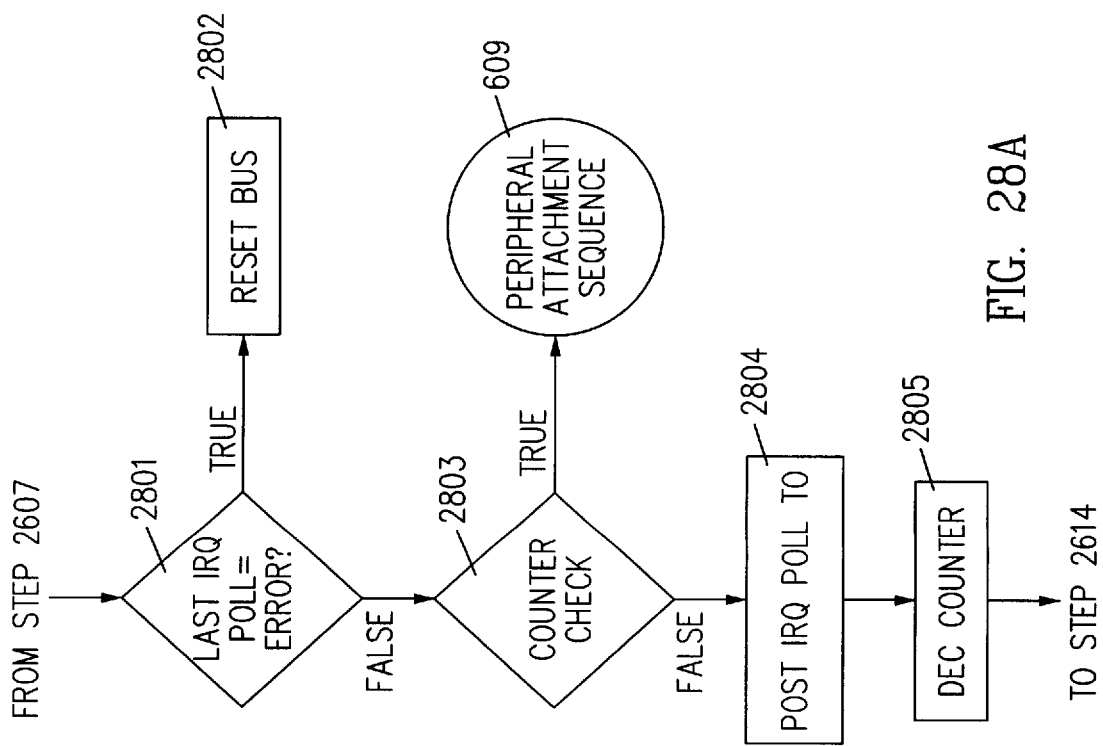
FIG. 28A is a process flow diagram of one embodiment of the IRQ Poll (Next) sequence within the service bus sequence of this invention.

As explained above, if an IRQ-poll is already in progress, step 2607 in service bus sequence 606 transfers to IRQ-poll sequence 2609 that is illustrated in more detail in FIG. 28A. At this point, bus dispatch 305 has determined that an IRQ-poll is in progress and that the last peripheral device polled was not the source of the interrupt. Before polling the next peripheral device on IDCS bus 150, bus dispatch 305 checks in last IRQ-poll error check step 2801 whether the last IRQ-poll resulted in an error.

If an error is detected in step 2801, processing transfers to reset bus step 2802 and otherwise to counter check step 2803. In reset bus step 2802, IDCS bus 150 is reset and an error message is returned. In counter check step 2803, bus dispatch 305 determines whether the current value of the Interrupt-Poll counter is equal to the start address that was set in step 2702. If the current value of the Interrupt-Poll counter is equal to the start address, bus dispatch 305 has polled each peripheral device on IDCS bus 150 without finding the source of the interrupt. This means that a new peripheral device has been attached to IDCS bus 150. Thus, bus dispatch 305 transfers processing to peripheral attachment sequence 609, that as described below, assigns an address and configures the new peripheral device. After the address is assigned and the peripheral device is configured, bus dispatch 305 enables edge detection on line MBINT.

If the current value of the Interrupt-Poll counter is not equal to the start address, processing transfers from step 2803 to post command IRQ-Poll step 2804. In post command IRQ-Poll step 2804, bus dispatch 305 posts command IRQ-Poll to the address specified by the value of the Interrupt-Poll counter and transfers processing to decrement counter step 2805. In decrement counter step 2803, bus dispatch 305 decrements the Interrupt-poll counter and then transfers processing to command sequencer 2614.

Peripheral attachment sequence 609 is illustrated in FIG. 28B. In assign mid step 2851, bus dispatch 305 sends command Assign-Mid to the former last peripheral device that instructs the MBIC in the former last peripheral device to configure itself as a mid-peripheral device. As explained above, this enables the downstream signal lines for the former last peripheral device and allows bus dispatch 305 to communicate with the newly attached peripheral device. Upon completion of assign mid step 2851, peripheral attachment sequence 609 transfers to address assign sequence 604, that was described above.

Figure 29:
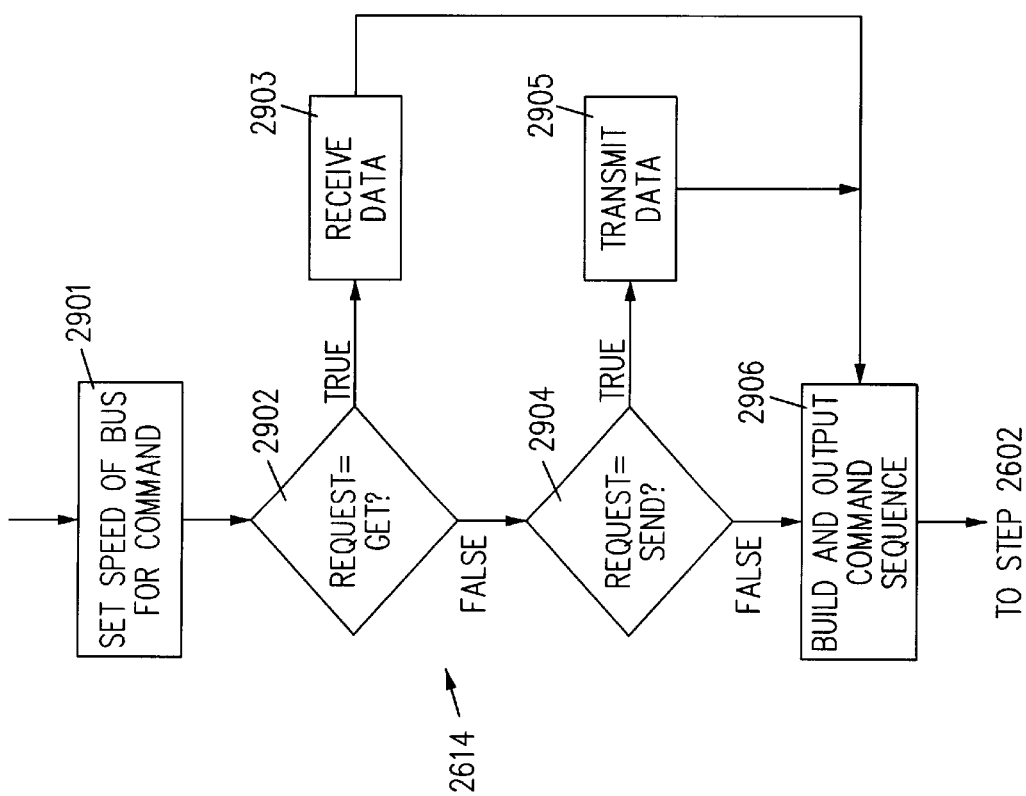
FIG. 29 is a process flow diagram for the command sequencer within the service bus sequence of this invention.

To send command IRQ-Poll, command IRQ-Get or another command to a peripheral device on IDCS bus 150, bus dispatch 305 sends the posted command request to command sequencer 2614 where the command is assembled and sent to IDCS bus 150. The process implemented by command sequencer 2614, in this embodiment of the invention, is illustrated in FIG. 29. The process illustrated in FIG. 29 is for a configuration where the processor in base station 100 is shared, i.e, the processor is running both a user interface and bus dispatch software simultaneously. Consequently, a direct memory access engine (DMA) is used in conjunction with the processor. Those skilled in the art will appreciate that the process of assembling commands for transfer over IDCS bus as well as the actual transfer can be implemented in a wide variety of ways in view of this disclosure. Therefore, this embodiment is only illustrative of the principles of the invention and is not intended to limit the invention to the particular embodiment discussed below.

Initially, in set bus speed step 2901 of command sequence 2614, bus dispatch 305 sets the speed of IDCS bus 150 based on the type of command or data being sent and the capabilities of the addressed peripheral device. Next, in a first command check step 2902, bus dispatch 305 checks to see if the command request is command Get. If the command request is command Get, processing transfers to step 2903 and otherwise to step 2904.

In receive data step 2903, bus dispatch 305 sets a timer for a time out based on the information provided in the peripheral information block for the addressed peripheral device. Bus dispatch 305 then sets the DMA engine to read from IDCS bus 150 and transfers processing to step 2906.

In a second command check step 2904, bus dispatch 305 checks to see if the command request is command Send. If the command request is command Send, processing transfers to step 2905 and otherwise to step 2906.

In transmit data step 2905, bus dispatch 305 sets the DMA engine for a write to IDCS bus 150 and transfers processing to step 2906. Build and output command sequence step 2906 builds and outputs the command sequence for the appropriate command and then returns processing to step 2602 where processing proceeds as describe above.

Figure 30:
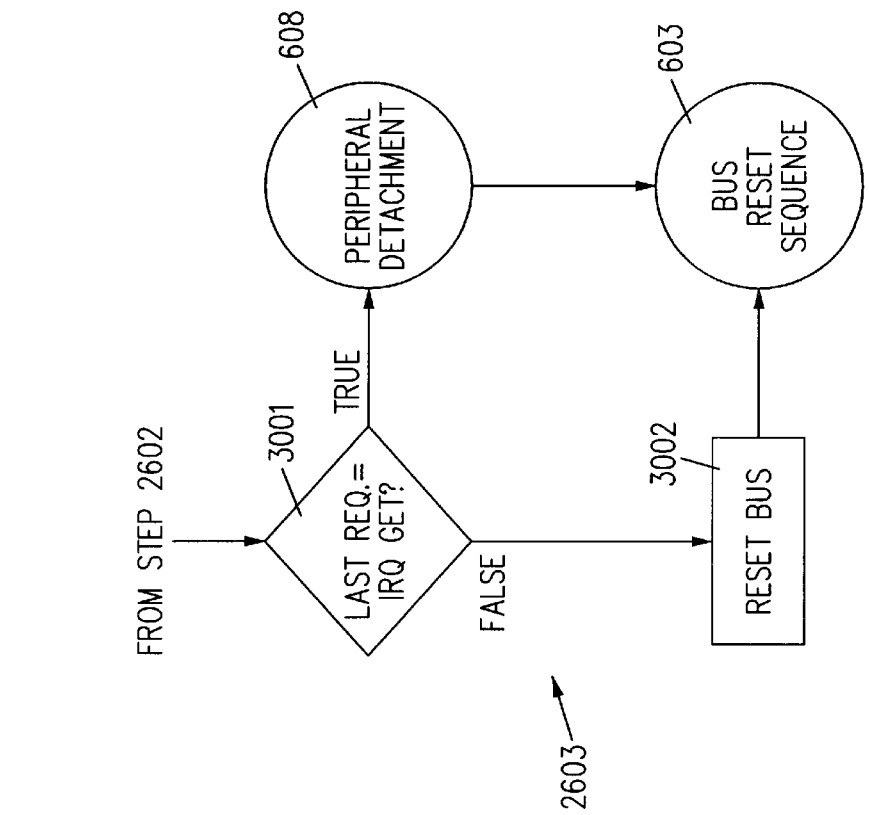
FIG. 30 is a process flow diagram of one embodiment of the error service sequence within the service bus sequence of this invention.

Error service sequence 2603 is illustrated in more detail in FIG. 30. Bus dispatch 305 distinguishes errors caused by peripheral device detachments from other types of errors, even though, in this embodiment, the response is the same. Bus dispatch 305 resets IDCS bus 150 in both cases. However, in another embodiment, a different response can be provided for a peripheral device detachment.

Specifically, in last request check step 3001, bus dispatch 305 checks to see if the last command prior to detection of the error was command IRQ-Get. If the last command prior to detection of the error was command IRQ-Get, the error indicates no response was obtained from the peripheral device in response to the command IRQ-Get. This indicates that a peripheral device was detached from IDCS bus 150 and so processing transfers from step 3001 to peripheral detachment sequence 608 which in turn passes directly to bus reset sequence 603.

If the last command prior to detection of the error was not command IRQ-Get, processing transfers from step 3001 to reset bus step 3002. In this embodiment, reset bus step 3002 simply transfers processing to bus reset sequence 603.

Thus, when a peripheral device is detached, the peripheral device immediately upstream from the disconnection generates an interrupt to bus dispatch 305. Bus dispatch 305 starts an IRQ-poll sequence as illustrated in FIGS. 26 and 27. If the start address for the IRQ-poll sequence is for a peripheral device downstream from the last peripheral device left on IDCS bus 150 after the disconnection, the disconnection is detected by the first command IRQ-Get because the interrupt signal is active after the first command IRQ-Poll.

Conversely, if the start address for the IRQ-poll sequence is for either a peripheral device upstream from the last peripheral device left on IDCS bus 150 after the disconnection or the last peripheral device left on IDCS bus 150 after the disconnection, the disconnection is detected only when command IRQ-Get is sent to the peripheral device address immediately downstream from the last peripheral device left on the bus.

IDCS BUS TIMING

Figure 31A:
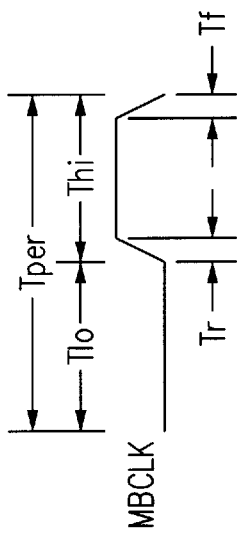
FIGS. 31A and 31B define timing relationships for transmission of signals over the IDCS bus of this invention.
Figure 31B:
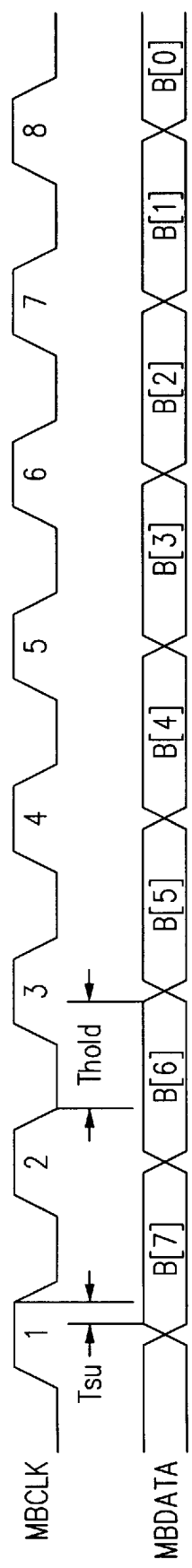

FIG. 31A shows the waveform timing that applies to signals on line MBCLK under normal data transmissions. FIG. 31B shows the waveform timing that applies between signals on lines MBCLK and MBDATA. Table VI defines the various times represented by reference numerals in FIGS. 31A and 31B.

TABLE VI

SERIAL PERIPHERAL INTERFACE TIMING

| Symbol | Parameter | Conditions | Min | Max | Unit |
|---|---|---|---|---|---|
| fmax | Maximum clock frequency | | 0.5 | 14.75 | MHz |
| Tper | Clock period | See Fig. 31A | 67.8 | 2000 | ns |
| Tlo | Clock low pulse width | See Fig. 31A | 20 | | ns |
| Thi | Clock high pulse width | See Fig. 31A | 20 | | ns |
| Tr | Rise time | See Fig. 31A | | 10 | ns |
| Tf | Fall time | See Fig. 31A | | 10 | |
| tsu | Set-up time | See Fig. 31B | 15 | | ns |
| thold | Hold time | See Fig. 31B | 15 | | ns |

The particular cables and connectors used with this invention are not critical to the invention. Nevertheless, in one embodiment, the hardware listed in Table VII is used.

TABLE VII

Honda Connectors

| Honda Part # | Part Description | Application |
|---|---|---|
| HDR-EA14LMY()G1-SL | 14-pin Male connector with Latching Pins | Base station Serial Connector, Peripheral Downstream Serial |

TABLE VII-continued

Honda Connectors

| Honda Part # | Part Description | Application |
|---|---|---|
| HDR-EA14LFY()G1-SL | 14-pin Female connector with Latching Pins | Connector Peripheral Upstream Serial Connector |
| HDR-EA14LFY()G1 | 14-pin Female connector w/o Latching Pins | Docking Peripheral Upstream Serial Connector |
| HDR-EA14M()G1 | 14-pin Male Cable connector | Cable |
| HDR-EA14F()G1 | 14-pin Female Cable connector | Cable |
| HDR-E14LPA | Cable Connector Housing with pin grips | Cable |

Each of the connectors listed in Table VII are 14-pin connectors. As described above, IDCS bus 150 requires only a five pin connector. Nevertheless, the 14-pin connector is used on base station 100 to support serial communication protocols and charging capability. Table VIII lists the pin function assignments for one embodiment. Signals are oriented with respect to each other in the connectors to minimize voltage differentials between adjacent signals and adjacent contacts, to provide suitable pairing for twisted pair cables, and to provide first-make, first-break connection of the ground line.

TABLE VIII

| PIN NUMBER | PIN NAME | FUNCTION |
|---|---|---|
| 1 | Chg2− | Charge return pin. Limited to one amp charging current return. Must not be connected to ground Pin 14 within a charger. |
| 2 | /RTS | Passive serial bus handshaking status output signal pin to serial peripheral device. |
| 3 | /CTS | Passive serial bus handshaking input status pin from serial peripheral device. |
| 4 | Chg1+ | Charge input pin. Limited to one amp charging current. Must not be connected to ground pin 14 within a charger. Nine volt trickle nominal charging voltage, and twelve volts maximum fast charging voltage. |
| 5 | TxEIA | Passive serial bus data pin to peripheral device. |
| 6 | RxEIA | Passive serial bus data pin from peripheral device. |
| 7 | Chg1− | Charge return pin. Limited to one amp charging current return. Must not be connected to ground pin 14 within a charger. |
| 8 | SP1 | Spare for future expansion. |
| 9 | MBCLK | Bidirectional bus clock pin. |
| 10 | Power | Power pin. |
| 11 | MBINT | Unidirectional bus interrupt pin. |
| 12 | Chg2+ | Charge input pin. Limited to one amp charging current. Must not be connected to ground pin 14 within a charger. Nine volt trickle nominal charging voltage, and twelve volts maximum fast charging voltage. |
| 13 | MBDATA | Bidirectional bus data pin. |
| 14 | Ground | Ground pin, passive serial bus signal ground, trickle charge ground. |

Figure 32A:
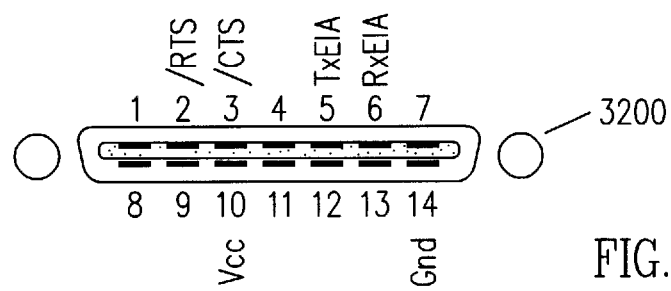
FIGS. 32A to 32C illustrate the various signal interfaces according to the principles of this invention.

Thus, as shown in FIG. 32A, five pins on the 14-pin connector are dedicated to carrying a full-duplex serial interface signal set 3200 with handshaking. By supplying the appropriate level shifters many different types of serial interfaces including RS-232 and RS-422 configurations may be implemented using these pins. The serial interface signals are accessed only at a base station 100 or a docking unit connector, as these signals are not carried through the multi connection assembly cable of this invention since serial communications are not daisy-chainable.

Power (VCC) and ground are carried on pins 10 and 14, respectively. This pin pair is used for both the RS232 and RS422 level shifters. The maximum allowable current on each terminal is 5 milliamps. Signals RxEIA and TxEIA on pin 6 and 5, respectively, are the respective input and output signal terminals for transmitting and receiving data from a serial peripheral. Signal RTS on pin 2 and signal CTS on pin 3 provide the output and input handshaking status signals to and from a serial device.

The serial interface terminals for communicating with the serial device are CMOS logic level interface pins and share the same electric characteristics as described below for the IDCS bus 150 pins. Commercially available components for RS232 and RS422 interfaces include the Maxim 231 single supply RS232 level shifter, and the National DS34C86 receiver and CS34C87 transmitter, respectively.

Figure 32B:
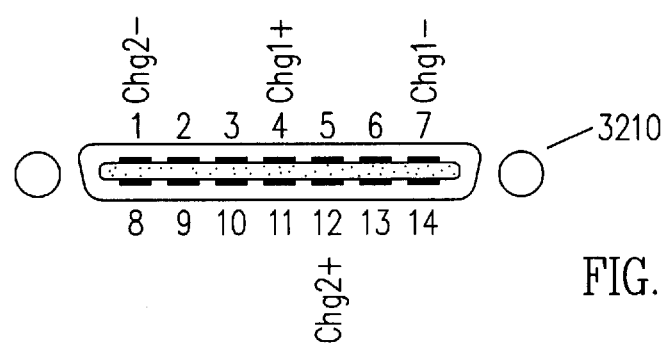

Charging pin set 3210, as illustrated in FIG. 32B, includes four pins as described in Table 4. These pins support all battery charging, both trickle and fast charge modes.

Figure 32C:
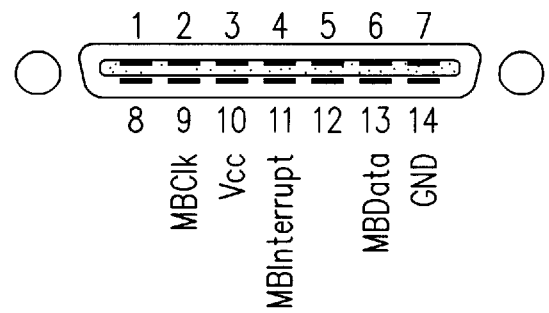

IDCS bus signals are carried by three pins, MBDATA, MBCLK, and MBINT(FIG. 32C). The IDCS bus protocol also uses pins Power and Ground. A spare pin, pin 8, is provided for future expansion and is implemented in all peripheral devices and cables, in one embodiment.

The following table indicates the DC operating range for IDCS bus 150.

TABLE IX

Magicbus Electrical Specifications (@ T = 25° C.)

| Symbol | Parameter | Conditions | Min | Max | Unit |
|---|---|---|---|---|---|
| Vih | High-level input voltage | See Note (1) | 0.7 Vcc | Vcc+0.3 | V |
| Vil | Low-level input voltage | | −0.3 | 0.3 Vcc | V |
| Voh | High- | See Note | 0.8 Vcc | Vcc | V |

TABLE IX-continued

Magicbus Electrical Specifications (@ T = 25° C.)

| Symbol | Parameter | Conditions | Min | Max | Unit |
|---|---|---|---|---|---|
| | level output voltage | (2) | | | |
| Vol | Low-level output voltage | | 0 | 0.2 Vcc | V |
| Ii | Input leakage current | Vi=Vcc or GND | −10 | 10 | μA |
| Ioz | Tri-state output current | Vo=Vcc or GND | −40 | 40 | μA |
| Icca | Supply current (active) | Vi=Vcc or GND | | 5 | mA |
| Iccs | Supply current (standby) | Vi=Vcc or GND | | 100 | μA |

(1) Input buffers are CMOS, not TTL.
(2) Output buffers should be TTL output buffers, but capable of swinging to a full Vcc and completely down to GND (all the way to both power supply rails).
(3) The source and sinking current are 2.4 mA DC for signals on lines MBCLK, MBDATA, and MBINT.

This application is related to the following commonly assigned and commonly filed U.S. patent applications: 1. Ser. No. 08/516,840 entitled: "A Method For Transmitting Bus Commands and Data Over Two Wires of A Serial Bus", Walter F. Broedner, Anthony M. Fadell, Steven G. Perlman and John E. Watkins; 2. Ser. No. 08/516,857 entitled: "A Method for Configuring An Intelligent Low Power Serial Bus", Anthony M. Fadell and Walter F. Broedner: 3. Ser. No. 08/516,850 entitled: "A Method For Transmitting Information Over An Intelligent Low Power Serial Bus", Walter F. Broedner, Anthony M. Fadell, Steve Perlman, and John Watkins, now U.S. Pat. No. 5,675,811, and of which Microfiche Appendix B is incorporated herein by reference; and 4. Ser. No. 08/516,850 entitled: "A Bus Interface Circuit For An Intelligent Low Power Serial Bus", Walter Broedner and Anthony M. Fadell.

The above embodiments of this invention are illustrative only and are not intended to limit the invention to the particular embodiments described. In view of this disclosure, those skilled in the art can utilize the IDCS bus architecture and SPI protocol in a wide variety of applications. The low power intelligent bus configuration of this invention that supports a wide variety of peripheral devices at various bus speeds provides a new capability in serial bus performance. Moreover, the uniform interface that is independent of the peripheral device type permits inclusion of low volume peripheral devices on a bus without incurring the cost of developing a peripheral device specific interface. These and the other advantages described above eliminate the complexity associated with prior art serial bus structures.

We claim:

1. In a peripheral device, a serial bus support circuit comprising:

a power supply line;

a downstream interrupt line coupled to said power supply line wherein upon connection of a downstream peripheral device to said downstream interrupt line, said downstream interrupt line has a first level, and upon disconnection of said downstream peripheral device from said downstream interrupt line, said downstream interrupt line has a second level;

an upstream interrupt line; and a bus interface circuit having a downstream interrupt in terminal coupled to said downstream interrupt line, and an upstream interrupt out terminal coupled to said upstream interrupt line wherein said bus interface circuit passes a signal on said downstream interrupt in terminal to said upstream interrupt out terminal so that upon said downstream peripheral device being disconnected from said downstream interrupt line, said second level on said downstream interrupt line is propagated to said upstream interrupt line so as to automatically generate an interrupt by said serial bus support circuit upon disconnection of said downstream peripheral device from said peripheral device.

2. In a peripheral device, a serial bus support circuit as in claim 1 further comprising a resistive element having a first lead connected to said power supply line, and a second lead connected to said downstream interrupt line so as to couple said downstream interrupt line to said power supply line.

3. In a peripheral device, a serial bus support circuit as in claim 2 wherein said resistive element is a resistor.

4. In a peripheral device, a serial bus support circuit as in claim 1 further comprising a first inverter having an input terminal connected to said downstream interrupt line; a line connected to said power supply line; and an output terminal.

5. In a peripheral device, a serial bus support circuit as in claim 4 further comprising a second inverter having an input terminal connected to said output terminal of said first inverter; a line connected to said power supply line; and an output terminal connected to said downstream interrupt in terminal of said bus interface circuit.

6. In a peripheral device, a serial bus support circuit as in claim 5 further comprising a third inverter having an input terminal connected to said upstream interrupt out terminal of said bus interface circuit; a line connected to said power supply line; and an output terminal.

7. In a peripheral device, a serial bus support circuit as in claim 6 further comprising a fourth inverter having an input terminal connected to said output terminal of said third inverter; a line coupled to said power supply line; and an output terminal connected to said upstream interrupt line.

8. In a peripheral device, a serial bus support circuit as in claim 7 wherein said fourth inverter comprises a discrete inverter.

9. In a peripheral device, a serial bus support circuit as in claim 1 further comprising:

a wake-up interrupt propagation circuit having an input line connected to said downstream interrupt line; and an output line connected to said upstream interrupt line.

10. In a peripheral device, a serial bus support circuit as in claim 9 wherein said wake-up interrupt propagation circuit further comprises:

a first gate having a first input terminal connected to said input line of said wake-up interrupt propagation circuit; a second input terminal connected to said power supply line, and an output terminal connected to said output line of said wake-up interrupt propagation circuit;

wherein upon a voltage on said power supply line having a first state, said first gate passes a signal on said downstream interrupt line through said first gate to said upstream interrupt line and so bypasses said bus interface circuit; and upon said voltage on said power supply line having a second state, said first gate blocks passage of said signal on said downstream interrupt line through said gate to said upstream interrupt line.

11. In a peripheral device, a serial bus support circuit as in claim 10 wherein said first gate comprises a transistor having a first lead connected to said first input terminal of said first gate; a second lead coupled to said second input terminal of said first gate; and a third lead connected to said output terminal of said first gate.

12. In a peripheral device, a serial bus support circuit as in claim 11 wherein said transistor comprises a PNP transistor having an emitter connected to said first lead; a base connected to said second lead; and a collector connected to said third lead.

13. In a peripheral device, a serial bus support circuit as or claim 9 further comprising:
a wake-up interrupt generation circuit having an output line connected to said upstream interrupt line.

14. In a peripheral device, a serial bus support circuit as in claim 13 wherein said wake-up interrupt generation circuit further comprises:
a microcontroller having a wake-up interrupt generation terminal;
a second gate having a first input terminal coupled to said wake-up interrupt generation terminal; a second input terminal connected to said power supply line; and an output terminal coupled to said output line of said wake-up interrupt generation circuit;
wherein upon a voltage on said power supply line having a first state, said second gate passes a signal from said wake-up interrupt generation terminal through said second gate to said upstream interrupt line; and
upon said voltage on said power supply line having a second state, said second gate blocks passage of said signal from said wake-up interrupt generation terminal through said second gate to said upstream interrupt line.

15. In a peripheral device, a serial bus support circuit as in claim 14 wherein said second gate comprises a second transistor having a first lead connected to said first input terminal of said second gate; a second lead coupled to said second input terminal of said second gate; and a third lead connected to said third terminal of said second gate.

16. In a peripheral device, a serial bus support circuit as in claim 15 wherein said second transistor comprises a second PNP transistor having an emitter connected to said first lead; a base connected to said second lead; and a collector connected to said third lead.

17. In a peripheral device, a serial bus support circuit as in claim 14 wherein said wake-up interrupt generation circuit further comprises:
a peripheral device power supply line;
a first resistive element having a first terminal connected to said peripheral device power supply line; and a second terminal connected to said wake-up interrupt generation terminal; and
a second transistor having a first lead connected to said peripheral device power supply line; a second lead coupled to said wake-up interrupt generation terminal; and a third lead connected to said first input terminal of said second gate.

18. In a peripheral device, a serial bus support circuit as in claim 17 wherein said wake-up interrupt generation circuit further comprises:
a second resistive element having a first terminal connected to said wake-up interrupt generation terminal; and a second terminal connected to second lead of said second transistor.

19. In a peripheral device, a serial bus support circuit as in claim 17 wherein said second transistor comprises a NPN transistor having an emitter connected to said first lead; a base connected to said second lead; and a collector connected to said third lead.

20. In a peripheral device, a serial bus support circuit as in claim 14 wherein said wake-up interrupt generation circuit further comprises a diode having an anode connected to said output terminal of said second gate; and a cathode connected to said output line of said wake-up interrupt generation circuit.

21. In a peripheral device, a serial bus support circuit as in claim 13 wherein said bus interface circuit further comprising:
a peripheral power on terminal;
a standby power supply line;
a switch having a first terminal coupled to said standby power supply line; a second terminal coupled to a reference voltage, and a third terminal coupled to said peripheral power on terminal wherein
upon a first voltage being applied to said peripheral power on terminal by said bus interface circuit, said first switch terminal is connected to second switch terminal by said first voltage on said third terminal; and otherwise said first switch terminal and said second switch terminal are disconnected;
an inverter having an input terminal connected to said first switch terminal and an output terminal connected to a power supply line for said peripheral device.

22. In a peripheral device, a serial bus support circuit as in claim 21 wherein said switch comprises a transistor having a first lead connected to said first switch terminal; a second lead connected to said second switch terminal; and a third lead connected to said third switch terminal.

23. In a peripheral device, a serial bus support circuit as in claim 22 wherein said transistor comprises a field effect transistor having a gate wherein said gate is connected to said third lead.

24. In a peripheral device, a serial bus support circuit as in claim 1 further comprising a first inverter having an input terminal connected to said upstream interrupt out terminal of said bus interface circuit; a line connected to said power supply line; and an output terminal.

25. In a peripheral device, a serial bus support circuit as in claim 24 further comprising a second inverter having an input terminal connected to said output terminal of said first inverter; a line coupled to said power supply line; and an output terminal connected to said upstream interrupt line.

26. In a peripheral device, a serial bus support circuit as in claim 1 further comprising:
a wake-up interrupt generation circuit having an output line connected to said upstream interrupt line.

27. In a peripheral device, a serial bus support circuit as in claim 26 wherein said wake-up interrupt generation circuit further comprises:
a microcontroller having a wake-up interrupt generation terminal;
a first gate having a first input terminal coupled to said wake-up interrupt generation terminal; a second input terminal connected to said power supply line; and an output terminal coupled to said output line of said wake-up interrupt generation circuit;
wherein upon a voltage on said power supply line having a first state, said first gate passes a signal from said wake-up interrupt generation terminal through said first gate to said upstream interrupt line; and upon said voltage on said power supply line having a second state, said first gate blocks passage of said signal from said wake-up interrupt generation terminal through said second gate to said upstream interrupt line.

28. In a peripheral device, a serial bus support circuit as in claim 27 wherein said first gate comprises a transistor having a first lead connected to said first input terminal of said first gate; a second lead coupled to said second input terminal of said first gate; and a third lead connected to said third terminal of said first gate.

29. In a peripheral device, a serial bus support circuit as in claim 28 wherein said transistor comprises a first PNP transistor having an emitter connected to said first lead; a base connected to said second lead; and a collector connected to said third lead.

30. In a peripheral device, a serial bus support circuit as in claim 27 wherein said wake-up interrupt generation circuit further comprises:
 a peripheral device power supply line;
 a first resistive element having a first terminal connected to said peripheral device power supply line; and a second terminal connected to said wake-up interrupt generation terminal; and
 a transistor having a first lead connected to said peripheral device power supply line; a second lead coupled to said wake-up interrupt generation terminal; and a third lead connected to said first input terminal of said first gate.

31. In a peripheral device, a serial bus support circuit as in claim 30 wherein said wake-up interrupt generation circuit further comprises:
 a second resistive element having a first terminal connected to said wake-up interrupt generation terminal; and a second terminal connected to second lead of said transistor.

32. In a peripheral device, a serial bus support circuit as in claim 30 wherein said transistor comprises a NPN transistor having an emitter connected to said first lead; a base connected to said second lead; and a collector connected to said third lead.

33. In a peripheral device, a serial bus support circuit as in claim 27 wherein said wake-up interrupt generation circuit further comprises a diode having an anode connected to said output terminal of said first gate; and a cathode connected to said output line of said wake-up interrupt generation circuit.

34. In a peripheral device, a serial bus support circuit as in claim 26 wherein said bus interface circuit further comprising:
 a peripheral power on terminal;
 a standby power supply line;
 a switch having a first terminal coupled to said standby power supply line; a second terminal coupled to a reference voltage, and a third terminal coupled to said peripheral power on terminal wherein
  upon a first voltage being applied to said peripheral power on terminal by said bus interface circuit, said first switch terminal is connected to second switch terminal by said first voltage on said third terminal; and otherwise said first switch terminal and said second switch terminal are disconnected;
 an inverter having an input terminal connected to said first switch terminal and an output terminal connected to a power supply line for said peripheral device.

35. In a peripheral device, a serial bus support circuit as in claim 34 wherein said switch comprises a transistor having a first lead connected to said first switch terminal; a second lead connected to said second switch terminal; and a third lead connected to said third switch terminal.

36. In a peripheral device, a serial bus support circuit as in claim 35 wherein said transistor comprises a field effect transistor having a gate wherein said gate is connected to said third lead.

37. In a peripheral device, a serial bus support circuit comprising:
 a power supply line;
 a downstream interrupt line;
 a pull-up resistive element connected to said downstream interrupt line;
 a first inverter having an input terminal connected to said downstream interrupt line; and an output terminal;
 a second inverter having an input terminal connected to said output terminal of said first inverter; and an output terminal;
 a bus interface circuit having a downstream interrupt in terminal connected to output terminal of said second inverter; and an upstream interrupt out terminal;
 a third inverter having an input terminal connected to said upstream interrupt out terminal;
 and an output terminal;
 a fourth inverter having an input terminal connected to said output terminal of said third inverter; and an output terminal;
 an upstream interrupt line connected to said output terminal of said fourth inverter;
 a wake-up interrupt propagation circuit having an input line connected to said downstream interrupt line; and an output line connected to said upstream interrupt line; and
 a wake-up interrupt generation circuit having an output line connected to said upstream interrupt line.

38. In a peripheral device, a wake-up interrupt propagation structure comprising:
 a power supply line;
 a downstream interrupt line;
 an upstream interrupt line;
 a bus interface circuit having a downstream interrupt in terminal coupled to said downstream interrupt line; and an upstream interrupt out terminal coupled to said upstream interrupt line wherein said bus interface circuit passes a signal on said downstream interrupt in terminal to said upstream interrupt out terminal; and
 a gate having a first input terminal connected to said downstream interrupt line; a second input terminal connected to said power supply line; and an output terminal connected to said upstream interrupt line
  wherein upon a voltage on said power supply line having a first state, said gate passes a signal on said downstream interrupt line through said gate to said upstream interrupt line and so bypasses said bus interface circuit; and
  upon said voltage on said power supply line having a second state, said gate blocks passage of said signal on said downstream interrupt line through said gate to said upstream interrupt line.

39. In a peripheral device, a wake-up interrupt propagation structure as in claim 38 wherein said gate comprises a transistor having a first lead connected to said first input terminal of said gate; a second lead coupled to said second input terminal of said gate; and a third lead connected to said output terminal of said gate.

40. In a peripheral device, a wake-up interrupt propagation structure as in claim 39 wherein said transistor comprises a PNP transistor having an emitter connected to said first lead; a base connected to said second lead; and a collector connected to said third lead.

41. In a peripheral device, a wake-up interrupt generation structure comprising:

a power supply line;

a downstream interrupt line;

an upstream interrupt line;

a bus interface circuit having a downstream interrupt in terminal coupled to said downstream interrupt line; and an upstream interrupt out terminal coupled to said upstream interrupt line wherein said bus interface circuit passes a signal on said downstream interrupt in terminal to said upstream interrupt out terminal; and a microcontroller having a wake-up interrupt generation terminal;

a gate having a first input terminal coupled to said wake-up interrupt generation terminal; a second input terminal connected to said power supply line; and an output line coupled to said upstream interrupt line;

wherein upon a voltage on said power supply line having a first state, said gate passes a signal from said wake-up interrupt generation terminal through said gate to said upstream interrupt line; and upon said voltage on said power supply line having a second state, said gate blocks passage of said signal from said wake-up interrupt generation terminal through said gate to said upstream interrupt line.

42. In a peripheral device, a wake-up interrupt generation structure as in claim 41 wherein said gate comprises a first transistor having a first lead connected to said first input terminal of said gate; a second lead coupled to said second input terminal of said gate; and a third lead connected to said output terminal of said gate.

43. In a peripheral device, a wake-up interrupt generation structure as in claim 42 wherein said first transistor comprises a PNP transistor having an emitter connected to said first lead; a base connected to said second lead; and a collector connected to said third lead.

44. In a peripheral device, a wake-up interrupt generation structure as in claim 41 wherein said wake-up interrupt generation structure further comprises:

a peripheral device power supply line;

a first resistive element having a first terminal connected to said peripheral device power supply line; and a second terminal connected to said wake-up interrupt generation terminal; and a transistor having a first lead connected to said peripheral device power supply line; a second lead coupled to said wake-up interrupt generation terminal; and a third lead connected to said first input terminal of said gate.

45. In a peripheral device, a wake-up interrupt generation structure as in claim 44 wherein said wake-up interrupt generation structure further comprises:

a second resistive element having a first terminal connected to said wake-up interrupt generation terminal; and a second terminal connected to second lead of said transistor.

46. In a peripheral device, a wake-up interrupt generation structure as in claim 45 wherein said transistor comprises a NPN transistor having an emitter connected to said first lead; a base connected to said second lead; and a collector connected to said third lead.

47. In a peripheral device, a wake-up interrupt generation structure as in claim 46 wherein said wake-up interrupt generation structure further comprises a diode having an anode connected to said output terminal of said gate; and a cathode connected to said output line of said wake-up interrupt generation structure.

48. In a peripheral device, a power on circuit comprising:

a bus interface circuit having a peripheral power on terminal;

a standby power supply line;

a switch having a first terminal coupled to said standby power supply line; a second terminal coupled to a reference voltage, and a third terminal coupled to said peripheral power on terminal wherein upon a first voltage being applied to said peripheral power on terminal by said bus interface circuit, said first switch terminal is connected to second switch terminal by said first voltage on said third terminal; and otherwise said first switch terminal and said second switch terminal are disconnected; an inverter having an input terminal connected to said first switch terminal; and an output terminal connected to a power supply line for said peripheral device.

49. In a peripheral device, a power on circuit as in claim 48 wherein said switch comprises a transistor having a first lead connected to said first switch terminal; a second lead connected to said second switch terminal and a third lead connected to said third switch terminal.

50. In a peripheral device, a power on circuit as in claim 49 wherein said transistor comprises a field effect transistor having a gate wherein said gate is connected to said third lead.

51. A method for powering up a peripheral device on a serial bus comprising:

connecting a terminal of a bus interface circuit to a power supply circuit of said peripheral device wherein upon application of a first voltage level on said terminal said power supply circuit is off and upon application of a second voltage level on said terminal said power supply circuit is on;

coupling said bus interface circuit to said serial bus; and issuing a power-on command over said serial bus to said bus interface circuit wherein in response to said power-on command, said bus interface circuit generates said second voltage level on said terminal.

* * * * *

UNITED STATES PATENT AND TRADEMARK OFFICE
CERTIFICATE OF CORRECTION

PATENT NO. : 5,812,796
DATED : September 22, 1998
INVENTOR(S) : Broedner, Walter F.; Fadell, Anthony M.

It is certified that error appears in the above-identified patent and that said Letters Patent is hereby corrected as shown below:

Column 65, line 42; please delete "08/516,850" and insert --08/516,849--.

Signed and Sealed this

Twenty-seventh Day of July, 1999

Attest:

Q. TODD DICKINSON

*Attesting Officer*   *Acting Commissioner of Patents and Trademarks*